US008634699B2

(12) United States Patent
Murabayashi et al.

(10) Patent No.: US 8,634,699 B2
(45) Date of Patent: Jan. 21, 2014

(54) INFORMATION SIGNAL PROCESSING METHOD AND APPARATUS, AND COMPUTER PROGRAM PRODUCT

(75) Inventors: Noboru Murabayashi, Saitama (JP); Hiroshige Okamoto, Kanagawa (JP); Masaru Miyamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1274 days.

(21) Appl. No.: 11/659,792

(22) PCT Filed: Aug. 9, 2005

(86) PCT No.: PCT/JP2005/014597
§ 371 (c)(1),
(2), (4) Date: Feb. 9, 2007

(87) PCT Pub. No.: WO2006/016590
PCT Pub. Date: Feb. 16, 2006

(65) Prior Publication Data
US 2007/0286579 A1    Dec. 13, 2007

(30) Foreign Application Priority Data

Aug. 10, 2004    (JP) ............................... P2004-233943

(51) Int. Cl.
*H04N 9/80* (2006.01)
(52) U.S. Cl.
USPC .................... 386/243; 386/241; 386/248
(58) Field of Classification Search
None
See application file for complete search history.

(56) References Cited

U.S. PATENT DOCUMENTS 5,995,095 A * 11/1999 Ratakonda .................... 715/255
6,160,950 A    12/2000 Shimazaki et al.
2002/0018637 A1    2/2002 Saito (Continued)

FOREIGN PATENT DOCUMENTS

EP    1 205 933 A2    5/2002
JP    2002-116784    4/2002

(Continued)

OTHER PUBLICATIONS

Office Action for JAP 2006-531663 dated Nov. 29, 2011.

(Continued)

*Primary Examiner* — Heather Jones
(74) *Attorney, Agent, or Firm* — Finnegan, Henderson, Farabow, Garrett & Dunner, L.L.P.

(57) ABSTRACT

An information signal processing method is provided which is to be used for special playback operations to make summary (digest) playback of image/voice data signals of a broadcast program. The method includes the steps of detecting a voice level or predetermined voice characteristic of each predetermined section from a predetermined image/voice information signal or an image/voice information signal resulted from predetermined band compression of the predetermined image/voice information signal and processing the voice signal as a predetermined segment section correspondingly to the result of detection and a predetermined set value; extracting predetermined characteristic data of each section of an image signal from the image/voice information signal and generating predetermined characteristic data indicative of an image feature of the predetermined section from the characteristic data; segmenting the image/voice information signal correspondingly to the image characteristic data, a signal resulted from segmentation of the voice and a predetermined time length or section length setting data; and recording a predetermined voice characteristic signal extracted from the voice signal on the basis of a segment of the image/voice information signal and the image feature data into a predetermined recording medium or predetermined data memory.

14 Claims, 51 Drawing Sheets

(56) References Cited

U.S. PATENT DOCUMENTS

| | | | |
|---|---|---|---|
| 2002/0197053 A1* | 12/2002 | Nakamura et al. | 386/35 |
| 2003/0034996 A1 | 2/2003 | Li et al. | |
| 2003/0081937 A1* | 5/2003 | Li | 386/52 |
| 2003/0108334 A1* | 6/2003 | Nevenka et al. | 386/95 |
| 2003/0194210 A1 | 10/2003 | Shiiyama | |
| 2004/0088723 A1 | 5/2004 | Ma et al. | |
| 2004/0088726 A1* | 5/2004 | Ma et al. | 725/46 |
| 2006/0165379 A1* | 7/2006 | Agnihotri et al. | 386/95 |

FOREIGN PATENT DOCUMENTS

| | | |
|---|---|---|
| JP | 2002-535894 | 10/2002 |
| JP | 2002-344872 | 11/2002 |
| JP | 2003-283993 | 10/2003 |
| JP | 2003-298981 | 10/2003 |
| JP | A 2003-283993 | 10/2003 |
| JP | 2005-269510 | 9/2005 |
| JP | A 2005-269510 | 9/2005 |
| WO | WO 03/012693 A2 | 2/2003 |

OTHER PUBLICATIONS

English language translation for JPA 2005-269510.
English language translation for JPA 2003-283993.
Yao Wang et al., Multimedia Content Analysis Using Both Audio and Visual Clues, *IEEE Signal Processing Magazine*, Nov. 2000, pp. 12-26.
Supplemental European Search Report for PCT/JP2005014597, May 3, 2012, 10 pages.

* cited by examiner

| Genre/News | | Definition character | a | b | c | d | e |
|---|---|---|---|---|---|---|---|
| | | Meaning definition | Scene with appearance of announcer | Scene of affair or accident | Weather forecast | Scene of program start | Scene of program end |
| Voice-attribute information | A1 | Speaker's voice | ○ | △ | ○ | ○ | ○ |
| | A2 | Music | | | | | |
| | A3 | Other | | △ | | | |
| Color feature (col) information | B1 | Area 1 | | | | | |
| | B2 | Area 2 | △ | | ○ | | |
| | B3 | Area 3 | △ | | ○ | | |
| | B4 | Area 4 | | | | | |
| Similar-image (sid) information | C1 | Appearance frequency: Highest | △ | | | | |
| | C2 | Appearance frequency: Second highest | △ | | | | |
| Person's feature (person) information | D1 | Area 1 | △ | | | | △ |
| | D2 | Area 2 | △ | | | | △ |
| | D3 | Area 3 | | | | | |
| | D4 | Area 4 | | | | | |
| | D5 | Area 5 | △ | | | | △ |
| Telop feature (tlp) information | E1 | Area 1 | | | | ○ | ○ |
| | E2 | Area 2 | | △ | | ○ | ○ |
| | E3 | Area 3 | | △ | | | |
| | E4 | Area 4 | | | | | |
| Camera feature (cam) information | F1 | Still | ○ | | | | |
| | F2 | Zoom | | | | | |
| | F3 | Pan | | | | | |
| Scene change (scn) information | G1 | | | △ | | △ | △ |

FIG.5A

| Genre/sports (sumo-wrestling match) | | Definition character | | a<br>Scene of match introduction | b<br>Scene of initial rise for fighting | c<br>Scene of fighting | d<br>Scene of program start | e<br>Scene of finish |
|---|---|---|---|---|---|---|---|---|
| | | | Meaning definition | | | | | |
| Voice-attribute information | A1 | Speaker's voice | | △ | | △ | | △ |
| | A2 | Music | | | | | △ | ○ |
| | A3 | Other (cheer and applause) | | | △ | | △ | |
| Color feature (col) information | B1 | Area 1 | | △ | △ | △ | | △ |
| | B2 | Area 2 | | △ | △ | △ | | △ |
| | B3 | Area 3 | | | | | | |
| | B4 | Area 4 | | | | | | |
| Similar-image (sid) information | C1 | Appearance frequency: Highest | | △ | △ | △ | | |
| | C2 | Appearance frequency: Second highest | | △ | △ | △ | | |
| Person's feature (person) information | D1 | Area 1 | | | △ | △ | | △ |
| | D2 | Area 2 | | | △ | △ | | △ |
| | D3 | Area 3 | | | △ | △ | | △ |
| | D4 | Area 4 | | | △ | △ | | △ |
| | D5 | Area 5 | | | △ | △ | | △ |
| Telop feature (tlp) information | E1 | Area 1 | | ○ | | | | |
| | E2 | Area 2 | | ○ | | | ○ | |
| | E3 | Area 3 | | | | | ○ | |
| | E4 | Area 4 | | ○ | | | | |
| Camera feature (cam) information | F1 | Still | | | | △ | | △ |
| | F2 | Zoom | | | | | | |
| | F3 | Pan | | | | | | |
| Scene change (scn) information | G1 | | | | △ | | △ | △ |

Example of rule 1

Example of rule 2 news
(aabb)100 –> Ps(ts,s4) , P1(t1,s4) , Pe(te,s3)
(ca)70     –> Ps(ts,s4) , P1(t1,s4) , Pe(te,s3)

FIG.6C

Example of rule 3

(news) 100 –> Ps(ts,s4) , P1(t1,s4) , Pe(te,s3)
(sports) 70 –> Ps(ts,s4) , P1(t1,s4) , Pe(te,s3)

FIG. 12A

News program

| Definition of scene series by definition characters | a | a | b | a |
|---|---|---|---|---|
| Definition of scene series by meanings | Scene with appearance of announcer | Scene with appearance of announcer | Scene of affair or accident | Scene of affair or accident | Scene with appearance of announcer |

FIG. 12B

Sumo-wrestling program

| Definition of scene series by definition characters | a | a | c | c | d |
|---|---|---|---|---|---|
| Definition of scene series by meanings | Introduction of sumo-wrestling match | Scene of initial rise for fighting | Scene of fighting | Scene of fighting | Scene of finish |

Reference pattern

Series of all scenes in broadcast program

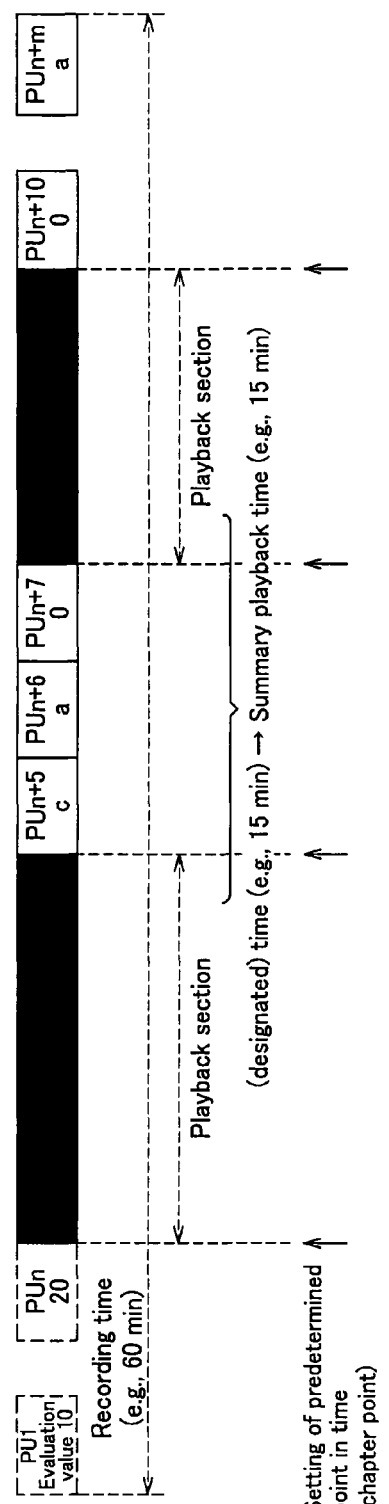
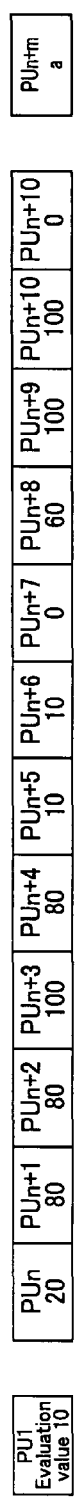
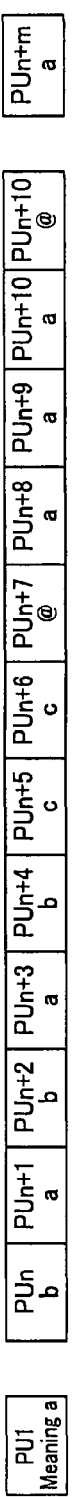
FIG.16A
FIG.16B
FIG.16C
FIG.16D

|  | (a) | (b) | (c) | (d) |
|---|---|---|---|---|
| Feature extraction data | Recorded | Not recorded | Recorded | Not recorded |
| Play list data Chapter data | Recorded | Recorded | Not recorded | Not recorded |

FIG.18

| 1 | 2 | 3 | 4 |
|---|---|---|---|
| 5 | 6 | 7 | 8 |
| 9 | 10 | 11 | 12 |
| 13 | 14 | 15 | 16 |

FIG.24

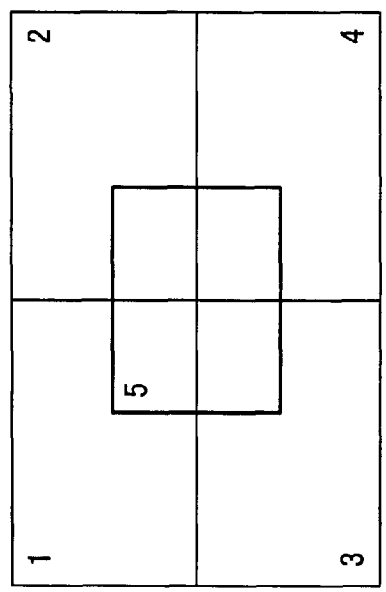
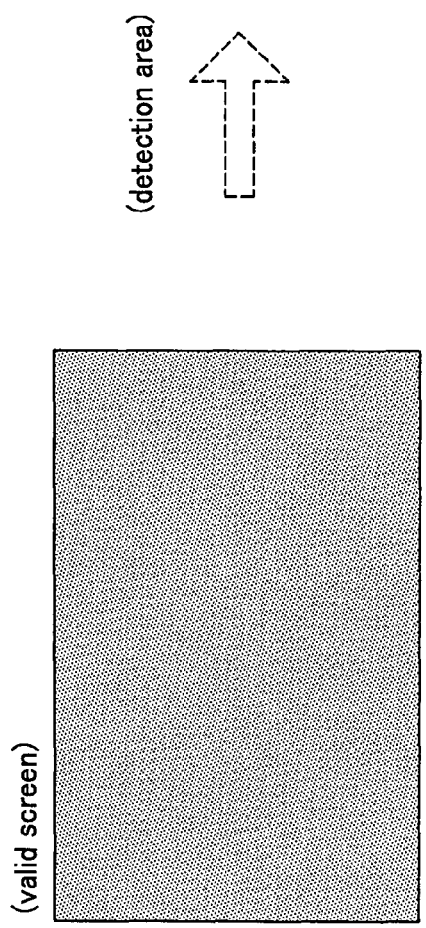
FIG.27

(voice feature data file)
Voice feature data
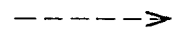
(image feature data file)
Scene change feature data
Camera feature data
Similar-scene feature data
Telop feature data
Color feature data
Person's feature data
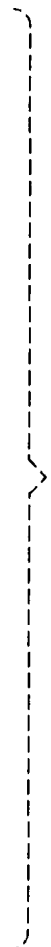
FIG.38

| (a) | (b) | (c) | (d) |
|---|---|---|---|
| 230 | 1000 | 100 | aabb |
| 1100 | 2600 | 100 | aabb |
| 3000 | 3500 | 70 | ca |
| ---- | ---- | ---- | ---- |

FIG.44A

| (a) | (b) | (c) | (d) | (d) |
|---|---|---|---|---|
| 0 | 229 | 0 | b | 0 |
| 230 | 1000 | 100 | aabb | 1 |
| 1001 | 1099 | 30 | aa | 0 |
| 1100 | 2600 | 100 | aabb | 1 |
| 2601 | 2999 | 30 | aa | 0 |
| 3000 | 3500 | 70 | ca | 1 |
| ---- | ---- | ---- | ---- | ---- |

FIG.44B

| | Recording time Trec (of predetermined program) | | | | |
|---|---|---|---|---|---|
| | Trec < 10 min | 10 min ≦ Trec < 30 min | 30 min ≦ Trec < 1 hr | 1 hr ≦ Trec < 2 hrs | Trec ≧ 2 hrs |
| Selectable summary playback time | Trec | Trec/5<br>Trec/2 | Trec/6<br>Trec/2<br>Trec(2/3) | Trec/6<br>Trec/4<br>Trec/2<br>Trec(2/3) | Trec/12<br>Trec/6<br>Trec/4<br>Trec/2<br>Trec(2/3) |
| Default summary playback time | Trec | Trec/5 | Trec/2 | Trec/2 | Trec/4 |

FIG.46

| | Recording time Trec (of predetermined program) | | | | |
|---|---|---|---|---|---|
| | Trec < 10 min | 10 min ≦ Trec < 30 min | 30 min ≦ Trec < 1 hr | 1 hr ≦ Trec < 2 hrs | Trec ≧ 2 hrs |
| Automatically set No. of chapters | 3 ~ 5 | 3 ~ 10 | 5 ~ 20 | 5 ~ 40 | 10 ~ 100 |

FIG.47

INFORMATION SIGNAL PROCESSING METHOD AND APPARATUS, AND COMPUTER PROGRAM PRODUCT

TECHNICAL FIELD

The present invention relates to an information signal processing method and apparatus and a program recording medium or computer program product, destined for making special playback such as predetermined digest playback in a recording/playback apparatus which records and/or plays back image/voice data such as a video/audio signal to and/or from a recording medium such as a magneto-optical disk, hard disk drive (HDD), semiconductor memory or the like by making predetermined band compression, such as MPEG (Moving Picture Expert Group), of the signal.

This application claims the priority of the Japanese Patent Application No. 2004-233943 filed in the Japanese Patent Office on Aug. 10, 2004, the entirety of which is incorporated by reference herein.

BACKGROUND ART

To roughly know a long content, namely, a content for a long time, recorded in a conventional VTR (video tape recorder) or disk recording/playback apparatus by playing back the content in a time shorter than the length of time taken for the recording, the playback is made at a speed about 1.5 to 2 times higher than the recording with consideration given to a speed at which one can understand voice information.

Even if summary or digest playback is tried of the content in a shorter time, a voice output thus played back at a high speed will not be easy to understand. Normally, only the image information in the content is played back as silent data.

On this account, summary (digest) playback of a recorded broadcast program is made, in some cases, in a predetermined time shorter than the recording time of the initial broadcast program by extracting predetermined feature data on the basis of features appearing in image/voice data (image/voice information signal, image/voice signal or image/voice information) in a recorded broadcast program, detecting key frame sections each appearing to be a key frame (important frame) with the use of the predetermined feature data, and playing back the key frame sections selected sequentially under a predetermined rule and playing back.

Also, in a predetermined section of recorded image data, positional information indicative of playback points is automatically generated at each fixed time intervals such as 3 min, 5 min, 10 min and the like or positional information is manually generated in desired positions by the user. This is generally called "chapter data generation". The chapter data generation is made to make skip playback, edition and thumbnail display with the use of the positional information (chapter data).

DISCLOSURE OF THE INVENTION

The aforementioned feature data may be detected as to plural types of features for each of the image and voice signals. Each feature data is extracted at the time of recording image/voice data, for example, and the feature data is recorded along with the image/voice data into a recording medium.

Then, the recorded feature data will be read for predetermined processing to determine, under a predetermined rule, a section which is to be subjected to summary (digest) playback. However, if the plural feature data are recorded separately as files into a recording medium, many files will result and handling of them in the signal processing will be troublesome, which will not lead to any efficient signal processing.

It is therefore desirable to overcome the above-mentioned drawbacks of the related art by providing an information signal processing method and apparatus and a program recording medium, destined for processing feature data efficiently and making effective summary (digest) playback and efficient various chapter data-based operations in order to make effective feature data-based summary (digest) playback or chapter processing.

According to an embodiment of the present invention, there is provided an information signal processing method, including the steps of:

detecting a predetermined voice feature of a voice signal from an image/voice information signal and segmenting the voice signal on the basis of the result of detection in case the voice signal can be separated into predetermined voice segments;

extracting predetermined characteristic data of an image signal from the image/voice information signal, generating image feature data indicative of a feature of each predetermined section on the basis of the characteristic data and segmenting the image signal in case the image signal can be separated into predetermined image segments;

dividing the image/voice information signal into playback units each having a predetermined length on the basis of the result of predetermined comparison between the results of voice segmentation and image segmentation and a predetermined threshold; and recording the voice feature data extracted from the voice signal and the image feature data into a predetermined recording medium.

According to another embodiment of the present invention, there is provided an information signal processing method, including the steps of:

extracting voice feature data of a voice signal from an image/voice information signal and separating the voice signal into predetermined voice segments on the basis of the result of extraction;

extracting characteristic data of an image signal from the image/voice information signal, generating image feature data indicative of each predetermined section on the basis of the feature data and separating the image signal for each predetermined section into predetermined image segments;

comparing the voice and image segments with a first value and dividing the image/voice information signal at separation of data in which the segments are shorter than the first value into playback units having a second value; and recording the voice feature data extracted from the voice signal and the image feature data into a predetermined recording medium on the basis of the playback units.

According to another embodiment of the present invention, there is provided an information signal processing apparatus, including:

a voice signal processor for extracting voice feature data of a voice signal from an image/voice information signal and separating the voice signal into predetermined voice segments on the basis of the result of extraction;

an image signal processing for extracting characteristic data of an image signal from the image/voice information signal, generating image feature data indicative of each predetermined section on the basis of the feature data and separating the image signal for each predetermined section into predetermined image segments;

a controller for comparing the voice and image segments with a first value and dividing the image/voice information signal at separation of data in which the segments are shorter than the first value into playback units having a second value; and a recorder for recording the voice feature data extracted from the voice signal and the image feature data into a predetermined recording medium on the basis of the playback units.

According to another embodiment of the present invention, there is provided a program recording medium having a control program recorded therein to be computer-readable, the control program comprising the steps of:

detecting a predetermined voice feature of a voice signal from an image/voice information signal and segmenting the voice signal on the basis of the result of detection in case the voice signal can be separated into predetermined voice segments;

extracting predetermined characteristic data of an image signal from the image/voice information signal, generating image feature data indicative of a feature of each predetermined section on the basis of the characteristic data and segmenting the image signal in case the image signal can be separated into predetermined image segments;

dividing the image/voice information signal into playback units each having a predetermined length on the basis of the result of predetermined comparison between the results of voice segmentation and image segmentation and a predetermined threshold; and recording the voice feature data extracted from the voice signal and the image feature data into a predetermined recording medium.

According to the present invention, it is possible to arrange a plurality of different types of image feature data and voice feature data efficiently as a feature data file of each data or as one feature data file. For example, it is possible to process a plurality of types of features including a camera feature, telop (television opaque projector) feature, scene feature, color feature, etc. as image features and voice features such as silence-level feature, sound quality feature (speaking voice or not, for example), etc. as voice features efficiently into a data file in a predetermined form, and record the data file along with image/voice data into a predetermined recording medium for efficient file processing in file management, signal processing, etc.

Also, according to the present invention, since no file is provided for each of the feature data, the recording space occupied by a file may be so smaller than in case a file is provided for each feature data in the recording medium.

Moreover, even in case the user bought a recording/playback apparatus but he found that the latter has not a function he wanted, the present invention enables him to easily make the apparatus possible to perform the function.

Also, the user may initially buy a recording/playback apparatus having only basis functions and the present invention allows him to easily install various desired functions in the apparatus. Thus, the present invention enables the user to select and buy a recording/playback apparatus efficiently with concern about whether or not the apparatus has a function or functions he wants.

The foregoing and other features, aspects and advantages of the present invention will be come apparent from the following detailed description of embodiments of the present invention when taken in conjunction with the accompanying drawings.

BRIEF DESCRIPTION OF THE DRAWINGS

FIG. 5A shows an example of the relation between the information signification processing and feature data in the recording/playback apparatus, and FIG. 5B shows, another example of the relation between the information signification processing and feature data.

FIGS. 6A to 6C show examples of the rule file in the recording/playback apparatus.

FIGS. 12A and 12B show examples of the information signification among the playback units in the recording/playback apparatus.

FIGS. 16A to 16D show examples of the information signal processing process according to the present invention in the recording/playback apparatus.

FIG. 18 shows an example of the description of various predetermined data recorded in the recording/playback apparatus.

FIG. 24 shows the scene changing in the recording/playback apparatus.

FIG. 27 shows an example of the person's feature detection area in the recording/playback apparatus.

FIG. 38 shows an example of the structure of the feature data file in the recording/playback apparatus.

FIGS. 44A and 44B show examples of the play list (summary) in the recording/playback apparatus.

FIG. 46 shows an example of the relation between the recording time and selectable summary playback time in the recording/playback apparatus.

FIG. 47 shows examples of the recording time and number of automatically set chapters in the recording/playback apparatus.

BEST MODE FOR CARRYING OUT THE INVENTION

The present invention will be explained in detail below concerning the embodiments thereof with reference to the accompanying drawings. The explanation will be made in sequence as itemized below. It is of course that the present invention is not limited to the embodiments explained below but may appropriately be modified in various manners without departing from the scope and spirit thereof.

1. Overview of the System as an Embodiment of the Present Invention 1.1 Summary Playback and Chapter Point Setting Based on Feature Data Here will be outlined the operations of the system. Signal processing related to the operations outlined below will also be explained in detail in items which will be described later.

In the following, play list data generation will specifically be explained. However, it may be considered that play list data and chapter data are generated together, unless specifically explained.

The feature data-based summary (digest) playback and chapter processing will be explained herebelow with reference to FIGS. A to G.

First, the summary playback based on the feature data will be explained.

Summary (Digest) Playback Based on Feature Data

Figure 1:
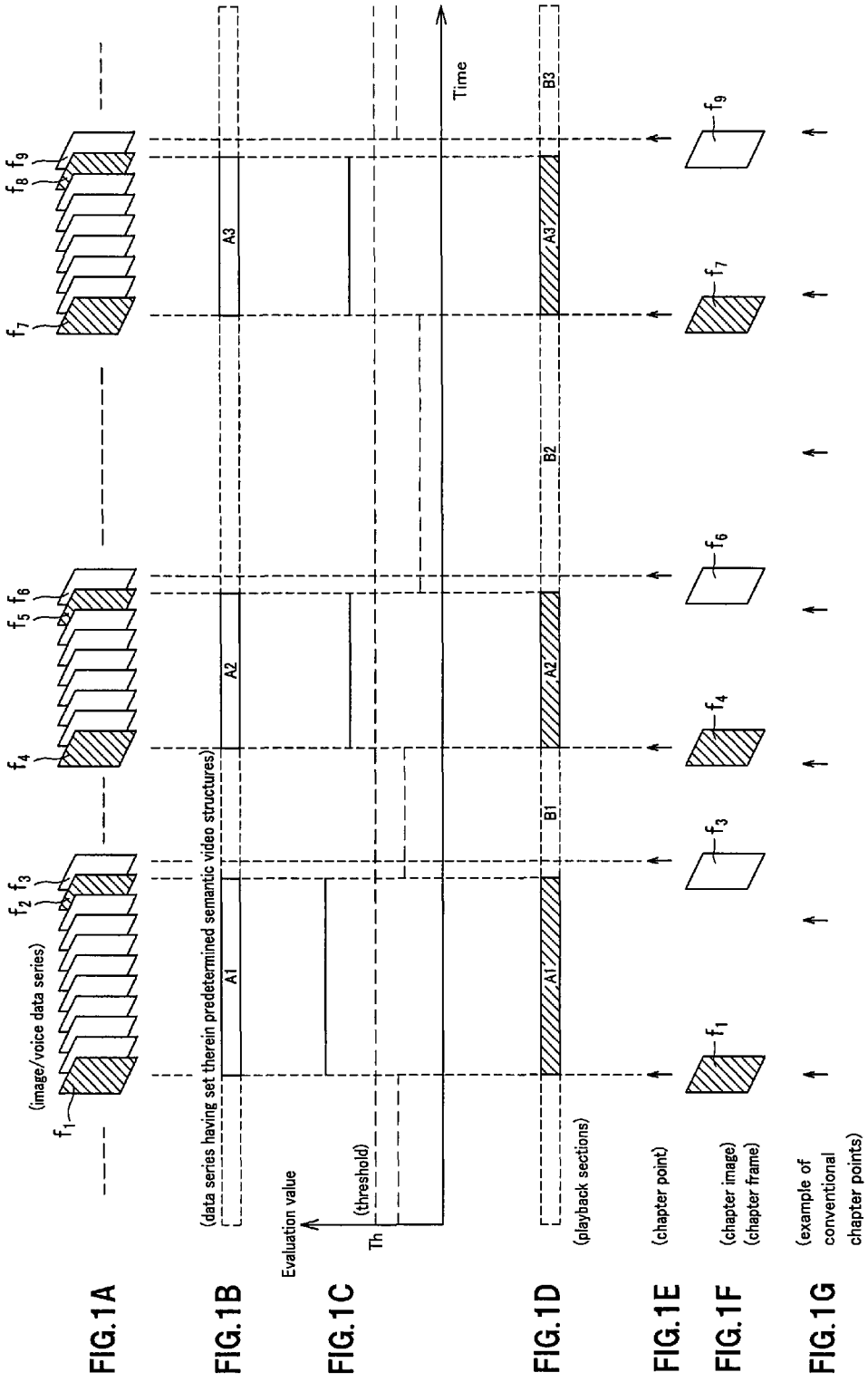
FIGS. 1A to 1G show the operations made in digest playback and chapter setting in the playback/playback apparatus according to an embodiment of the present invention.

It is assumed here that there is available a series of image/voice data as shown in FIG. 1A.

The image/voice data series includes a broadcast program, movie software, etc. which are to be recorded to and played back from a predetermined recording medium such as a hard disk drive (HDD), magneto-optical disk, large-capacity semi-conductor memory or the like by a predetermined band-compression signal processing defined in MPEG (Moving Picture Experts Group) or the like.

The image/voice data series is segmented on the basis of a scene change, voice segment and the like given predetermined meanings, respectively, into predetermined video structures (semantic video structure) including predetermined sections as conceptually shown in FIG. 1B.

The predetermined meaning setting, predetermined section setting, video structure, etc, will be explained in detail later.

Note that as shown in FIG. 1C, a predetermined evaluation value of each of all sections, predetermined program sections, etc. recorded within a predetermined time is set for each of predetermined sections segmented according to each meaning. The section for which the evaluation value is set is taken herein as a predetermined evaluation value data section.

The above "all sections recorded within a predetermined time" refers to all sections of image/voice data, if any, for a predetermined time over all programs.

Also, the above "predetermined program sections" refer to all sections of a program including image/voice data.

It is assumed here that a high evaluation value (important evaluation data) is predetermined for a predetermined key frame one (important frame section or important (image/voice) section) of all predetermined sections.

That is to say, since sections for which high evaluation values have been set (important evaluation value sections) include a key frame section, playback of the sections enables the user to know the outline of a program without having to play back all the sections in the program.

FIG. 1C shows the outline of a predetermined evaluation value section, from which it will be known that a predetermined summary playback (digest playback) will be made of an image/voice data series as shown in FIG. 1A by making skip playback of sections A1, A2 and A3 in which respective frames f1 and f2, f4 and f5, and f7 and f8 are given an evaluation value larger than a set threshold Th during a predetermined summary playback mode as shown in FIG. 1D.

Automatic Chapter Setting Based on Feature Data

FIG. 1E is a conceptual illustration of chapter point setting. In this processing chapter points are set at the top, or in the vicinity of the top, of a predetermined key frame section (important frame section) and top, or in the vicinity of the top, of a section contiguous to the bottom of the key frame section and which is not any key frame section.

In a conventional DVD (digital versatile disk), for example, break points are set for predetermined sections by the so-called automatic chapter setting function. They can be taken as aims for edition, and used for the fast forward (FF) playback, fast reverse (REW) playback, etc.

In the past, the aforementioned automatic chapter setting has been made to set regular time intervals of 5 min, 10 min, 15 min or the like. With such a chapter setting, however, it is not possible as the case may be to set any chapter point at the top of a section which appears to be a key frame as shown in FIG. 1G.

Also, a manual chapter setting function is well known which permits the user himself or herself to set a chapter point at a desired point in time. With this function, however, the user will have to set a chapter point by actually viewing a program he has recorded or is to record. Such setting operation is troublesome to the user and hence this function is not efficient.

On the contrary, with the chapter point setting function (predetermined time-point setting or predetermined-position setting function) based on feature data, according to the present invention, it is possible to automatically set a chapter point at the top, or in the vicinity of the top, and at the bottom of a key frame section and at the top, or in the vicinity of the top, of a section contiguous to the bottom and which is not any key frame section appropriately as shown in FIG. 1E So, this chapter point setting function permits to make effective edition, FF playback and REW playback by making more effective chapter point setting than with the conventional chapter setting function.

Figure 2:
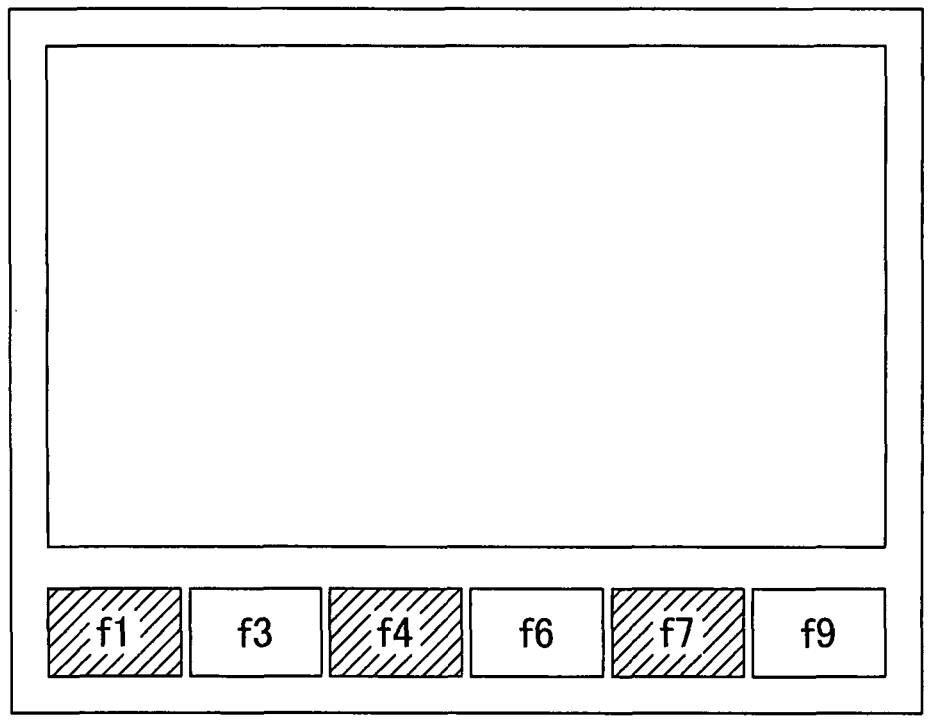
FIG. 2 illustrates an example of the display resulted from the chapter setting.

FIG. 2 shows the concept of the display, on a predetermined video monitor, of the automatically set chapter points as thumbnail images having a predetermined size as shown in FIG. 1F.

As shown in FIG. 1F, the frames f1, f4 and f7 are at the tops, or in the vicinity of the tops, of the predetermined key frame sections A1, A2 and A3, respectively, while the frames f3, f6 and f9 are at the tops, or in the vicinity of the tops, of sections B1, B2 and B3, respectively, contiguous to the key frame sections A1, A2 and A3, respectively, and which are not any key frame section. It is assumed here that by viewing a display screen as shown in FIG. 2, the user will extract the key frame sections A1, A2 and A3 shown in FIG. 1D, record them into a disk-shaped recording medium such as DVD, make skip playback of the data at the points in time of the frames f1, f4 and f7, and make other operations.

FIG. 1G shows examples of the predetermined points in time (chapter points or predetermined positions). Namely, predetermined points in time or positions are regularly or generally regularly set as chapter points at intervals of 5, 10 or other, for example. As will be seen from FIGS. 1C and 1G, the chapter points are not always set in a key frame (important frame).

With the above-mentioned automatic chapter point setting or segmentation (predetermined point setting or predetermined break point setting) based on feature data as in the present invention, it is possible to make effective edition or skip playback.

1.2 Example of the Information Signal Processing Process in the Present Invention Next, an example of the information signal processing process in the present invention will be described with reference to FIG. 3.

Figure 3:
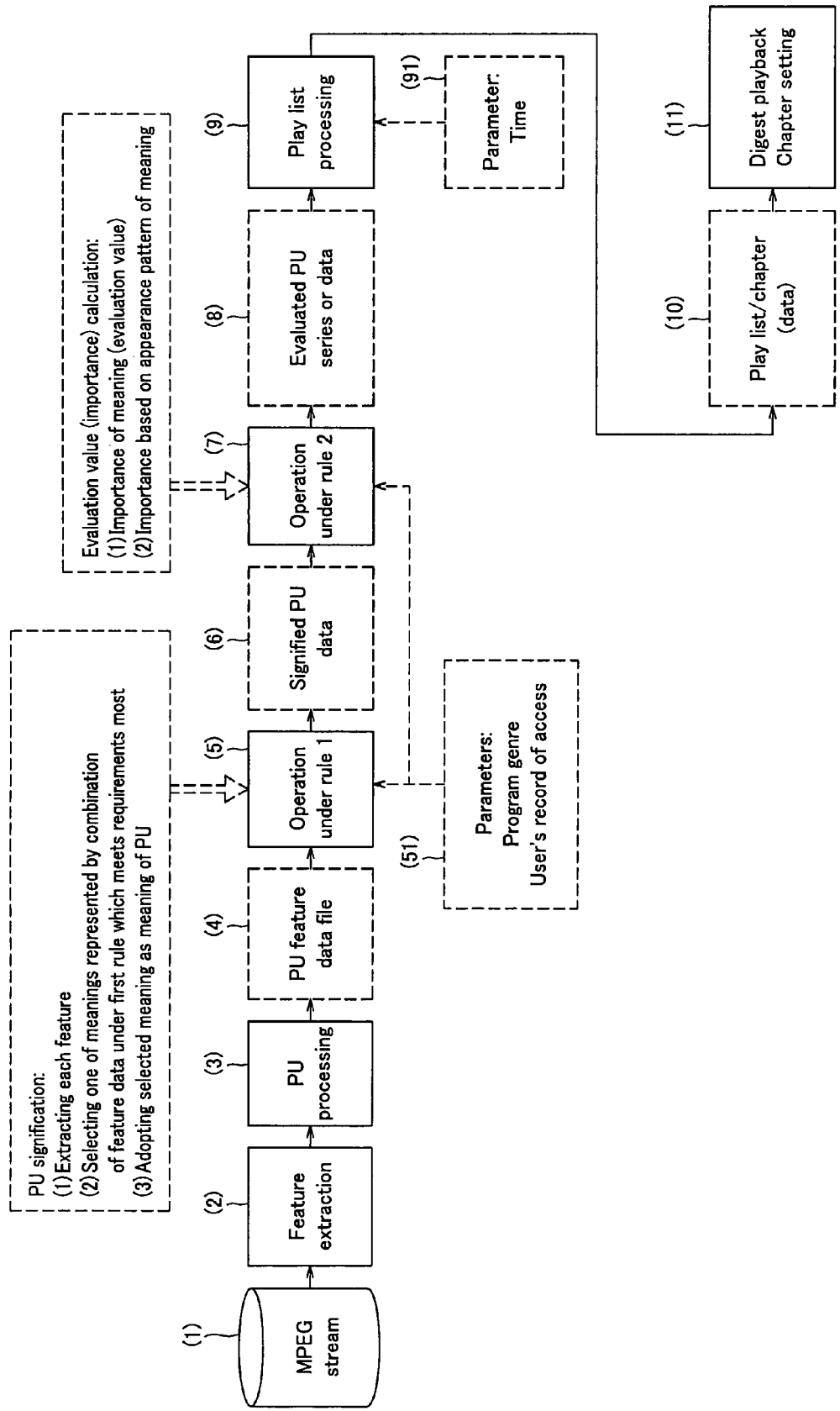
FIG. 3 is a block diagram showing examples of the information signal processing process in the recording/playback apparatus.

The information processing process shown in FIG. 3 includes a step of feature extraction (2) in which feature data on image and voice data series are extracted from MPEG image/voice stream data.

It is assumed here for the simplicity of explanation that an MPEG stream (1) (MPEG data) is to be recorded or has been recorded in a predetermined recording medium. The present invention is also applicable to image/voice data which is transmitted through a predetermined transmission system (cable or radio), for example.

The feature extraction step (2) may be effected simultaneously with the recording, but in case image/voice data is already recorded in the predetermined recording medium, the feature extraction step (2) may be done by playing back the data from the recording medium.

Here will be explained a rule processing.

In the rule processing, there is effected a predetermined processing on the basis of a rule file in which a rule is described in a predetermined form or rule data.

The rule file has described therein a rule corresponding to a program genre and based on feature data, and the rule file and a PU feature data file (playback unit feature data file) having feature data on a predetermined section described therein are processed to generate a predetermined play list file.

It is assumed here that for the simplicity of explanation, the rule file for a predetermined program genre n is Rf(n), PU feature data file is Pu, play list file is Df and desired summary time is t. The play list file Df can be as given by the following expression (1):

$$Df=Pu(*)Rf(n)(*)t \qquad (1)$$

where (*) is assumed to be a predetermined operator based on data in the predetermined file.

The rule file Rf(n) is described in a predetermined form and includes data on predetermined parameters such as a predetermined time correction function, meaning, weighting factor of the meaning (evaluation value or level of importance), etc.

Playback Unit Processing

The feature extraction (2) is followed by PU processing (playback unit processing) (3) as one of the characteristics of the present invention.

In the PU processing (3), each feature data is recorded (stored) as predetermined data (PU feature data file) into a predetermined recording medium or buffer memory at a break point (4) called "PU (playback unit)".

Operation Under a Rule 1

The PU feature data file is subjected to PU signification in a predetermined operation under rule 1 (5). The operation under rule 1 (5) will be briefly explained below and described in detail later.

Process 1:

Adopting a selected meaning as a meaning of PU

Process 2:

Selecting one of meanings represented by the first rule, which meets requirements most, from a combination of feature data Process 3:

Adopting the selected meaning as meaning of PU.

In the operation under the rule 1 (5), in case parameters such as a program genre or a program genre the user viewed in the past, time zone, number of plays, time of play, date of play, etc. and side information, etc. can be used owing to EPG (electronic program guide) or the like, a predetermined processing may be effected with consideration given to these parameters.

The time correction function as in the operation under the rule 1 is calculated as will be explained in detail later.

Operation Under a Rule 2

PU (6) subjected to the signification is subjected to a predetermined evaluation value processing in a predetermined operation under a rule 2 (7).

In the operation under the rule 2 (7), evaluation value processing is made of the importance of the following operations 1 and 2:

Operation 1:
Evaluation of the Meaning Importance
Operation 2:
Evaluation of Appearance Pattern of the Meaning PUs (8) subjected to the predetermined evaluation processing are given a predetermined evaluation value separately or in a combination of some PUs.

Figure 4:
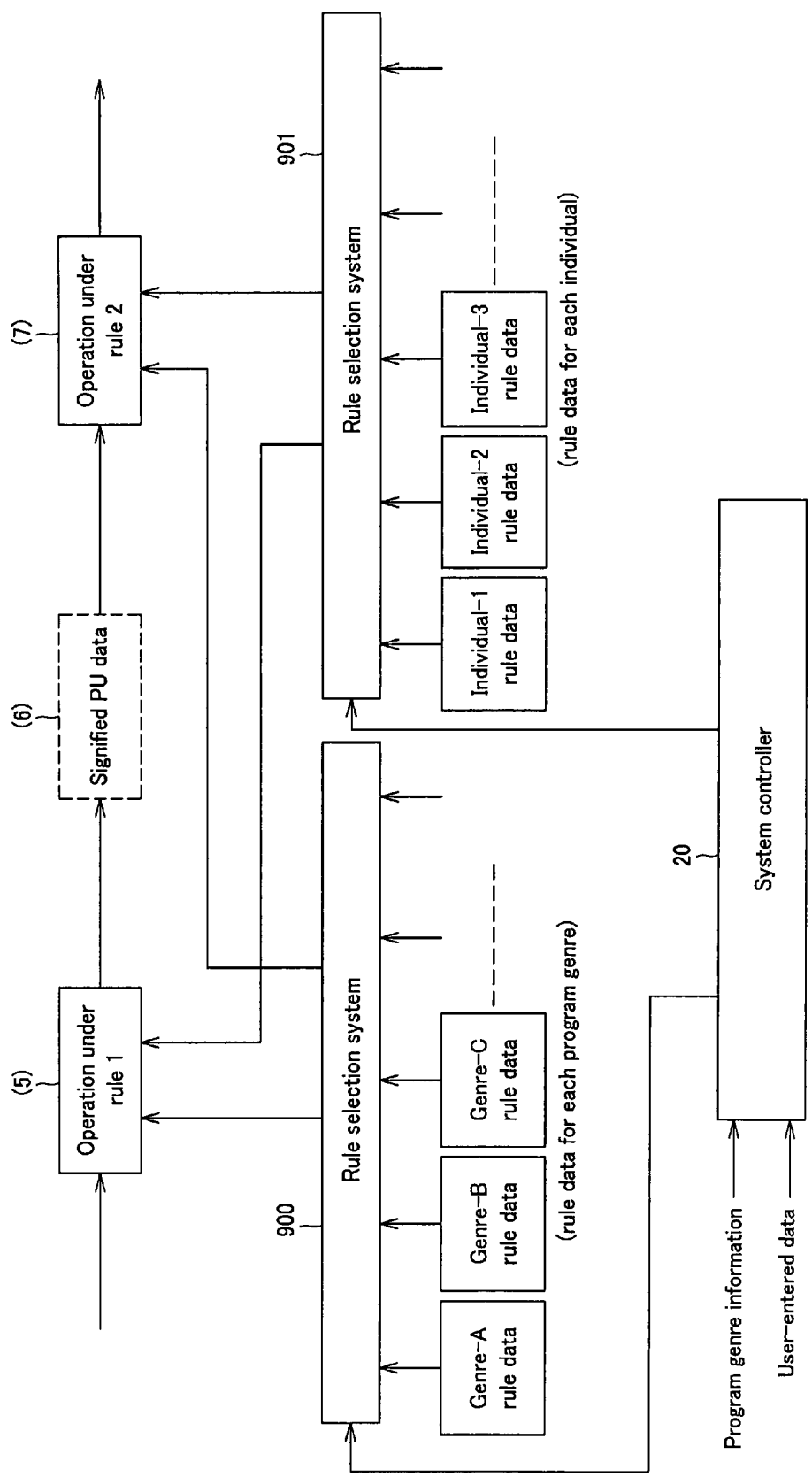
FIG. 4 is a block diagram showing the rule processing in the recording/playback apparatus.

As shown in FIG. 4, a rule selection system 900 selects the rules 1 and 2 or one of them correspondingly to program genre information including genre-A rule data, genre-B rule data, genre-C rule data, . . . and some data for operation under a rule) as rule processing data corresponding to a plurality of program genres and having been supplied to a system controller 20.

Also, some data for operation under a rule are provided for individual users, respectively, as shown in FIG. 4 and selected for application.

In this case, the system controller 20 selects, in a predetermined mode of operation, any one of the data for operation under the rule for an individual user 1, data for operation under the rule for an individual user 2, data for an individual user, . . . through setting made by a predetermined user and supplied to the system controller 20, for making a predetermined rule processing on the basis of the selected data for operation under the rule.

By providing the rule processing data for individual users as shown in FIG. 4, it is possible to make operations including a predetermined playback such as regular or special playback for each individual user, for example, storage of operation information, operation position information, etc. such as a state of playback, position of playback, etc. into a predetermined memory means for the predetermined rule processing for each individual user to reflect the information, updating of these information in predetermined timing as needed as the rule processing data for the individuals through a predetermined learning operation. This is an effective signal processing method for the learning operation for each individual user.

As shown in FIG. 4, a rule selection system 901 selects the rules 1 and 2 or one of them in selecting an operation under a rule for each individual user.

Forms of Operation Under Rule
Operation Under Rule 1:

In the case of a broadcast program, a meaning-given PU is described in association with predetermined image/voice feature data with an alphabet and meaning being set as follows.

For giving a meaning to a character, a scene considered to be a key frame (important frame or scene) in the broadcast program or a predetermined section to be recorded or played back, which is considered too be effective for the summary playback, chapter setting, etc. is selected and described.

Also, a scene the user desires is described. In this case, a predetermined mode of adjustment or the like is used to make it possible to describe a rule the user desires.

Top columns in FIGS. 5A and 5B show examples of news program as in Table 1 below:

TABLE 1

Example of news program

| Setting (meaning) character | Meaning |
|---|---|
| a | Scene of news items with appearance of announcer |
| b | Scene of affair or accident |

TABLE 1-continued

Example of news program

| Setting (meaning) character | Meaning |
|---|---|
| c | Weather forecast |
| d | Start scene of program |
| e | End scene of program |

In the example shown in FIG. 5A, the definition character a describes a rule to extract a scene in which an announcer appears. However, since it is considered that it is not possible to extract all possible scenes (in which announcers appear) under one rule described by the definition character a, a plurality of rules is described to extract such possible scenes.

Similarly, a plurality of rules is described by the definition characters b, c, d and e as in FIG. 5A.

Top columns in FIG. 5B show examples of sumo-wrestling program as in Table 2 below:

TABLE 2

Example of sumo-wrestling program

| Setting (meaning) character | Meaning |
|---|---|
| A | Scene of match introduction |
| B | Scene of initial rise for fighting |
| C | Scene of fighting |
| D | Scene of program start |
| E | Scene of finish |

Also in the example shown in FIG. 5B, since it is considered that it is not possible to extract all possible scenes defined by the character a, for example, wrestlers, sumo-referee, sumo-umpires, etc. in the scene, the definition character a is described by a plurality of tiles. For example, a plurality of rules is set for each of the definition characters. Also, separate rules are described for scenes (key frames) to be extracted as the case may be.

Scenes that cannot uniquely be signified may be included in a broadcast program. For example, the following setting may be done with a definition character @ as shown in Table 3 below:

TABLE 3

| Set (signified) character | Meaning |
|---|---|
| @ | No meaning (undefined) |

The operation under the rule 1 of a definition character (setting or meaning character) will be explained in detail taking a news program as an example.

In case each predetermined feature data is detected as shown in FIG. 18, it is assumed that scenes corresponds to the definition characters a, b, c, d and e, respectively, in the above-mentioned news program.

In FIGS. 5A and 5B, it is assumed that a small circle indicates an operation for a logical product and a small triangle indicates an operation for a logical sum. In a scene with appearance of an announcer, shown in a column indicated with a definition character a, it is assumable that the attribute of voice feature is detected as speaker's voice, a predetermined color is detected in the color feature detection area 2 or 3, the appearance frequency of similar image information is detected as "highest" or "second highest", person's feature is detected in the detection area 1, 2 or 5, and camera feature is "still".

In other columns indicated with the definition characters b, c, d and e, respectively, in FIGS. 5A and 5B, the definition characters can be associated with feature data by associating them with a predetermined feature data correspondingly to each of the small circle and triangle marks as in the column a above.

Each definition character and feature data are described in a predetermined form for the predetermined operation, that is, the operations under the rule 1 and rule 2.

FIG. 6A shows an example of the rule 1 described like a vector component.

That is, each of the feature data shown in FIGS. 5A and 5B is taken as attribute of voice feature, for example. In case the attribute is a speaker's voice, the rule is taken as A1. In case the attribute is a music, the rule is taken as A2. In case the attribute is other than the above, the rule is taken as A3.

In the color feature of an image feature, the area 1 is taken as B1, area 2 is taken as B2, . . .

Features may similarly be taken as B1 to B4, C1 and C2, D1 to D5, E1 to E4, F1 to F4, G1, etc., respectively.

As in FIG. 6A, the definition character a, for example, may be described as given below by an expression (2):

$$a = \\ 1.0(A1)100*(1.0(B2)100+1.0(B3)100)*(1.0(C1)100+1.0(C2)100* \\ (1.0(D1)100+1.0(D2)100+1.0(D5)100)*1.0(F1)100 \quad (2)$$

Other definition characters may also be described as shown in FIG. 6A.

Note that in FIG. 6A, "*" indicates a predetermined logical operation like the logical product (AND) and "+" indicates a predetermined logical operation like the logical sum (OR).

Here will be explained a description of "1.0(A1)100" by way of example.

As mentioned above, the "(A1)" represents that the attribute of the voice feature is a speaker's voice.

Weighting Factor:

The "1.0" in the description of "1.0(A1)100" is a weighting factor for the "(A1)". It is expediently assumed herein that it is 0 to 1.0.

Since the weighting factor is an expedient one for predetermined calculation, it is set (described) within a range of 0 to 100 or 0 to 10.

Detection Ratio Coefficient:

The "100" in the description of "1.0(A1)100" is a detection ratio coefficient for the "(A1)". In case the detection ratio coefficient is 100% in a playback unit section, the "1.0(A1)100" will meet the requirement.

With a description of "1.0(A1)50", for example, the "1.0 (A1)100" will meet the requirement if the detection ratio coefficient is 50%.

The detection ratio will be explained based on the expression (3) given later.

It is expediently assumed herein that the detection ratio coefficient is within a range of 0 to 100.

Since the detection ratio coefficient is an expedient one for predetermined calculation, it is set (described) within a range of 0 to 1 or 0 to 10.

Note here that the above detection ratio coefficient is one when the characteristic could have been detected in the playback unit section.

For example, with the above description of "1.0(A1)100", if the speaker's voice has not been detected in 100%, it may be determined that the characteristic of the "(A1)" has no been detected.

With the description of "1.0(A1)50", for example, if the speaker's voice has been detected in 50%, it is determined that the characteristic has been detected. That is, in the predetermined section, a ratio at which a predetermined feature has been detected can be represented by a coefficient.

Detection Ratio of Feature Data:

On this account, the detection ratio of feature data will be explained.

The operation of detection will be explained later with reference to FIGS. 34 and 35. The present invention has introduced therein an operation concept that there are set predetermined sections such as a voice segment feature and playback unit (or play unit) (PU) which is set correspondingly to the voice segment feature.

On this account, a detection ratio of the predetermined feature data in relation to all the PU sections is used to calculate a ratio between the predetermined characteristics.

Figure 7:
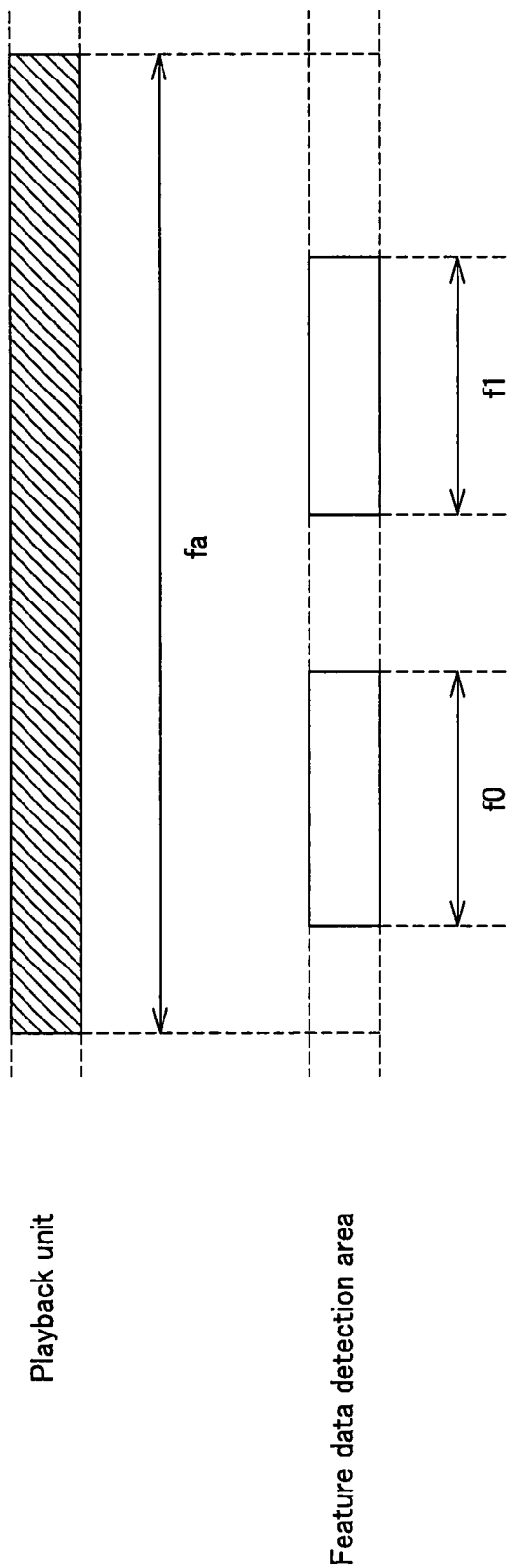
FIG. 7 shows an example of the manner of evaluation value processing in the recording/playback apparatus.

On the assumption that a playback unit has a section length (frame length, length of time or the like) fa and feature data P is to be detected in sections f0 and f1 as shown in FIG. 7, the detection ratio F of feature data P can be calculated based on the expression (3) given below:

$$F=\Sigma fi/fa=(f0+f1)/fa \quad (3)$$

The value calculated using the expression (3) will be used in the evaluation value processing which will be explained in detail later.

Example of evaluation value processing (example 1):

An example of how to calculate an evaluation value (importance) will be explained below.

An ideal value and result of detection of each feature data are processed as follows.

For example, the following processes (1) through (5) are done with p=m(M)n:

Process 1:

A detection ratio s of each predetermined feature data is calculated using the expression (3).

Process 2:

The result of calculation is compared with the above detection ratio coefficient n, and it is assumed here that:

$$\text{In case } s<n, p=m\times s \quad (4)$$

$$\text{In case } s\geq n, p=m\times 100 \quad (5)$$

Process 3:

In the above logical sum (+), when the feature data M is a feature of the same attribute such as M1, M2, . . . , averaging is made.

In the above logical product (*), a concept of operation such as a logical product coefficient r is introduced, and it is multiplied by the result of the averaging.

Process 4:

The above operation is made for each feature data M, calculated values are added, and the result of addition is taken as an evaluation value.

Process 5:

The calculated evaluation values are compared among them, and a meaning of the largest evaluation value is taken as the meaning of the playback unit a.

The above evaluation value processing is a typical example. However, it may be any other operation of calculation as long as the correspondence between the detected feature data or ratio of the feature data detected in the playback unit section and a set "meaning" is appropriate.

For example, in case the process 3 uses a logical product calculation, averaging is done or the feature data on the same attributes are only added together without multiplication by a logical product coefficient.

In case the same feature data are subjected to the logical production calculation in the process 3, the detecting conditions are stricter than those for the logical sum calculation, so that an operation may be made for the detected value to be larger than that in the logical sum calculation.

The application of the aforementioned expression (2) will be explained herebelow.

For example, the features are detected at the ratios as shown in Table 4 listing also detection ratio coefficients and weighting factors.

TABLE 4

| Feature | Detection ratio | Detection ratio coefficient | Weighting factor | p |
|---------|-----------------|------------------------------|------------------|-----|
| A1 | 100 | 100 | 1.0 | 100 |
| B2 | 80  | 100 | 1.0 | 80  |
| B3 | 80  | 100 | 1.0 | 80  |
| C1 | 100 | 100 | 1.0 | 100 |
| C2 | 100 | 100 | 1.0 | 100 |
| D1 | 80  | 100 | 1.0 | 80  |
| D2 | 80  | 100 | 1.0 | 80  |
| D5 | 80  | 100 | 1.0 | 80  |
| F1 | 80  | 100 | 1.0 | 80  |

In case the logical sum calculation (+) is to be made because the features B2, B3, C1 and C2 are equal in type to each other but different in detected attribute from each other, because the features are detected in different areas or because of the similar reason, the features are averaged. In this case, the evaluation value h is as given by the following expression (6) on the basis of the expression (2):

$$h = 100 + (80+80)/2 + (100+100)/2 + (80+80+80)/3 + 80 \quad (6)$$
$$= 100 + 80 + 100 + 80 + 80$$
$$= 440$$

Otherwise, the feature data may be averaged according to their type, and the result of averaging be taken as an evaluation value. In this case, since the feature data are of five types A to F, the evaluation value h may be as given by the following expression (7):

$$h = 440/5 = 88 \quad (7)$$

Logical product calculation of relation among feature data equal in attribute to one another:

Here will be explained a case in which feature data having the same attribute, for example, B2 and B3, in the above expression (2) are logical products, that is, (1.0(B2)100*1.0 (B3)100.

A concept of the logical product coefficient r is derived from the aforementioned evaluation value processing (process 3) to make calculation r(80+80)/2.

On the assumption that r=1.5, $$h = 100 + 1.5 \times (80+80)/2 + (100+100)/2 + (80+80+80)/3 + 80 \quad (8)$$
$$= 100 + 120 + 100 + 80 + 80$$
$$= 480$$

Also, averaging the result of the above calculation by the number of types of the feature data (=5) results in the following evaluation value h:

$$h = 480/5 = 96 \quad (9)$$

In the above case, since the conditions for the logical product calculation are stricter than those for the logical sum calculation, the evaluation value of a detected "meaning" should be somewhat lager.

Also, on the assumption that r=0.8, $$h = 100 + 0.8 \times (80+80)/2 + (100+100)/2 + (80+80+80)/3 + 80 \quad (10)$$
$$= 100 + 64 + 100 + 80 + 80$$
$$= 424$$

Also, averaging the result of the above calculation by the number of types of the feature data (=5) results in the following evaluation value h:

$$h = 424/5 = 84.5 \quad (11)$$

In the above case, such an arrangement is made that a smaller evaluation value will be detected, which is opposite to the aforementioned case, since the conditions for the logical product calculation are stricter than those for the logical sum calculation.

Product Sum Calculation of Relation Among Feature Data Different in Attribute from One Another:

In this calculation, feature data different in attribute from each other are represented each by a logical product operator (*) as given in the aforementioned expression (2). However, they are represented each by a logical sum operator (+) as the case may be.

For the simplicity of explanation, only the first and second terms A1 and B2 of the expression (2) are determined and placed in the expression (2):

$$a = 1.0(A1)100 + 1.0(B2)100 \quad (12)$$

The operation is made expediently based on a concept of logical sum coefficient was having been described concerning the evaluation value processing represented by the aforementioned expression (3).

In this case, the evaluation value h is calculated as follows based on the above expression (12):

$$h = (100+80)w \quad (13)$$

When w=1, the logical product calculation leads to the following:

$$a = 1.0(A1)100 * 1.0(B2)100 \quad (14)$$

$$h = 100 + 80 = 180 \quad (15)$$

The logical sump calculation given by the expression (8) is made for the evaluation value to be larger than that in the logical product calculation so that when:

$$w = 1.5 \quad (16)$$

$$h = (100+80) \times 1.5 = 270 \quad (17)$$

Also, the logical sump calculation given by the expression (8) is made for the evaluation value to be smaller than that in the logical product calculation so that when:

$$w = 0.8 \quad (18)$$

$$h = (100+80) \times 0.8 = 144 \quad (19)$$

Since the evaluation value processing is a concept expediently introduced for evaluation of the value of an expression which is a combination of a set meaning, feature data, various coefficients, etc., the range and value of each coefficient in the above evaluation expression are not limited to the above but may be set smaller or larger.

An evaluation value of each section of a playback unit stated in a rule included in the rule file is determined through calculation of the above evaluation value. For example, in the summary playback mode, a PU section of which the evaluation value is large is selected according to the time of summary playback, and a PU section of which the evaluation value is smaller is selected until the time of summary is approximated as much as possible.

By playing back each PU section thus selected, it is possible to make a predetermined summary playback.

Other Method of Evaluation Value Processing:

A value w(M)*k is determined based on one term of each of the above-mentioned feature data n and predetermined operator *

In the case of P(*k(n), det(n)), $$d(n)=P(*k(n),\det(n)) \qquad (20)$$

d(n) corresponding to any following the operator * is determined as follows:

(1) In the case of *=(∥>), namely, in the case of P((∥>)k(n), det(n)) is described as follows:

$$\text{if}(k(n) \le \det(n)) \text{ then } d(n)=0 \qquad (21)$$

$$\text{else } d(n)=100 \qquad (22)$$

(2) In the case of *=(∥<), that is, in the case of P((∥<)k(n), det(n)), $$\text{if}(k(n) > \det(n)) \text{ then } d(n)=0 \qquad (23)$$

$$\text{else } d(n)=100 \qquad (24)$$

In the above operations (1) and (2), a value d(n) being processed is processed into 100 or 0 correspondingly to the detection det(n) and set detection ratio k(n). So, the operations (1) and (2) are more effective in characterizing feature data remarkably than in operation (3) or (4) which will be explained below and in which a value being processed is processed into a difference.

(3) In the case of *=(|>), that is, in the case of P((|>)k(n), det(n)), $$\text{if}(k(n) < \det(n) \text{ then } d(n)=0 \qquad (25)$$

$$\text{else } d(n)=|k(n)-\det(n)| \qquad (26)$$

(4) In case *=(|<), that is, in case P((|<)k(n), det(n)), $$\text{if}(k(n) > \det(n) \text{ then } d(n)=0 \qquad (27)$$

$$\text{else } d(n)=|k(n)-\det(n)| \qquad (28)$$

Therefore, the evaluation value will be as given by the following expression (29):

$$\sum_{n}^{n} w(n) \times (100 - d(n)) \Big/ \sum_{n}^{n} w(n) \qquad (29)$$

With introduction of the above-mentioned operator, it is possible to make a following description in case there exist feature data A1 and B2, for example:

$$a=1.0(A1)(\|<)100+1.0(B2)(|<)100 \qquad (30)$$

In this case, on the assumption that the detection ratio of the feature A1 (actual detected value) is 100 and that of the feature B2 is 80, the above operations (1) and (4) result in the following evaluation value h:

$$h = 1.0 \times (100 - 0) + 1.0(100 - 80)/(1.0 + 1.0) \qquad (31)$$

$$= (100 + 20)/2$$

$$= 60$$

There are available some methods for the evaluation value processing as above. However, the evaluation value may be calculated by any other method.

The description of the rule 1 shown in FIG. 6A is an example of representation of the appearance pattern (meaning) of data to be described. In this description, letters a, b, c, . . . are used as meanings. However, letters A, B, C . . . may be used as their negations and "*" be used as a wildcard character.

Operation Under Rule 2

The operation under the rule 2 is such that an operation is made with consideration given to the linkage in meaning among the playback units which are predetermined sections having been signified with the aforementioned operation under the rule 1.

The operation under the rule 2 includes time correction based on the time correction coefficient, that is, time weighting.

For example, when the evaluation value of the meaning a is taken as 70 and that of the meaning b is as 80 in the operation under the rule 1, the evaluation value g of (ab) is given as follows:

$$g=70+80=150$$

Otherwise, the number of meanings may be averaged. The number of meanings (a and b) is divided by two as follows:

$$g=510/2=75$$

Otherwise, the evaluation values may be multiplied together as follows:

$$g=70\times80=5600$$

For example, the evaluation value g may be normalized by "100" (assumed to be a maximum value) as follows:

$$g=5600/100=56$$

In the weighting of a time correction coefficient, "gt" is taken as a final evaluation value on the assumption that the above-mentioned (ab) can be detected at a time t, its evaluation value is g and the time correction coefficient (weighting factor) is w.

The time correction coefficient is described as its change point (information data in a change-point coordinate system) in place in the rule 2 in the rule file according to a predetermined rule of description.

An example of the operation under the rule 2 is shown in FIG. 6B.

Time Correction Coefficient:

First, the time correction coefficient will be explained.

The time correction coefficient is utilizable to correct the time for summary in a predetermined program genre in the rule file.

Some of the users may possibly want to play back some of predetermined broadcast programs mainly for the former or latter half of the length of broadcasting time as the case may be.

On this account, it is possible to weight a time period (or time instant as the case may be) for a predetermined section to be summary- or digest-played-back with consideration given to various parameters corresponding to a broadcast program, such as the genre, broadcast time and others of the program to be recorded.

That is, the section to be weighted for the time period will be given a larger importance of summary (or digest) playback than that to be given to sections for the other time period.

FIGS. 8A to 8I show examples of the time correction function for the time weighting.

Figure 8A:
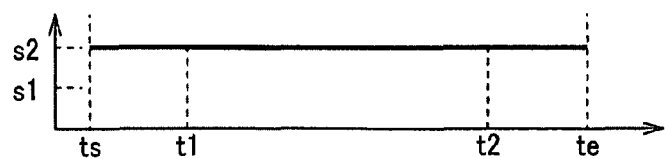
FIGS. 8A to 8I graphically illustrate examples of the time correction function in the recording/playback apparatus.

FIG. 8A shows time weighting of an entire predetermined summary playback section with the same importance.

Figure 8B:
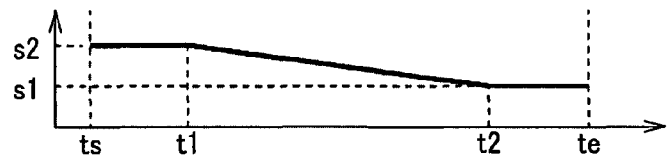

FIG. 8B shows time weighting of the predetermined section with a larger importance given to the former half than that given to the latter half.

Figure 8C:
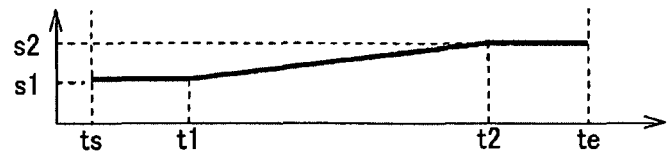

FIG. 8C shows time weighting of the predetermined section with a larger importance given to the latter half of the section than that given to the former half.

Figure 8D:
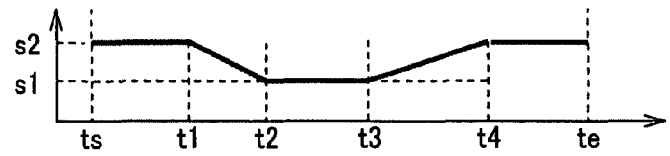

FIG. 8D shows time weighting of the predetermined section with a larger importance given to the former and latter portions of the section than that given to the middle portion.

Figure 8E:
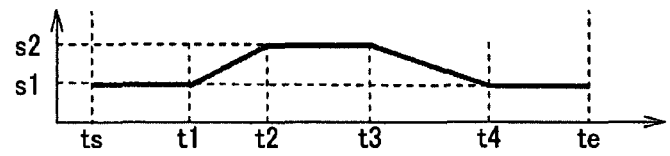

FIG. 8E shows time weighting of the predetermined section with a larger importance given to the middle portion of the section than that given to the former and latter portions.

Figure 8F:
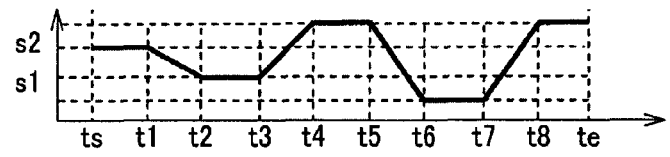

FIG. 8F shows a combination of two correction functions as shown in FIG. 8D but different from each other, showing time weighting with different levels of importance given to the former portion, to between the former and central portions, to between the central and latter portions and to the latter portion, respectively.

Figure 8G:
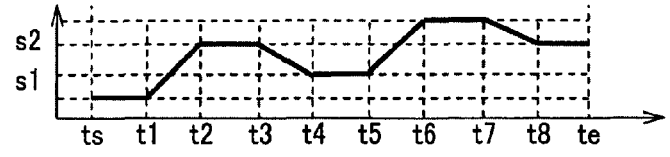

FIG. 8G shows a combination of two correction functions as shown in FIG. 8E but different from each other, showing time weighting with different levels of importance given to the former portion, to between the former and central portions, to between the central and latter portions and to the latter portion, respectively.

Figure 8H:
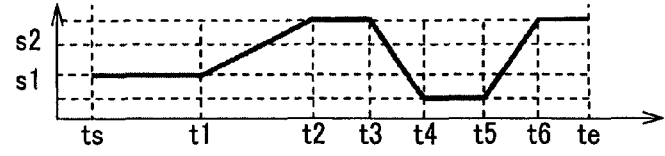
Figure 8I:
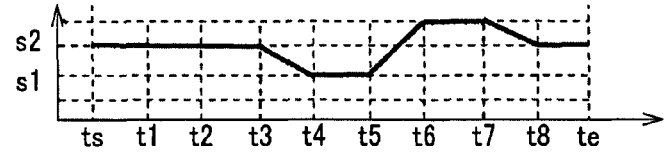

FIG. 8H shows a combination of the correction functions as shown in FIGS. 8C and 8D, respectively, and FIG. 8I shows a combination of the correction functions as shown in FIGS. 8D and 8B, respectively.

Figure 9:
FIG. 9 graphically illustrates an example of the general form of the time correction function in the recording/playback apparatus.

FIG. 9 shows an example of the general form of the time correction function in which the start, change and end points are P0(ts, s3), P1(t1, s3), . . . , Pe(te, s0), respectively.

In the coordinate in FIG. 9, the y-axis indicates weighting within a rage of 0 and 100 (maximum value is 100 and minimum value is 0), for example, for the simplicity of explanation, and the x-axis indicates positional information set within a range of 0 to 100 in value in the same dimension as that of "start/end position information" as will be explained later with reference to FIGS. 41 to 43 or in ratio from the start point based on a section between the start and end points.

Determination of Meanings of, and Relation, Among Playback Units Connected to One Another:

As having been explained above, it is possible to set meanings for the playback units (PU) on the basis of feature data resulted from a predetermined extraction.

Figure 10:
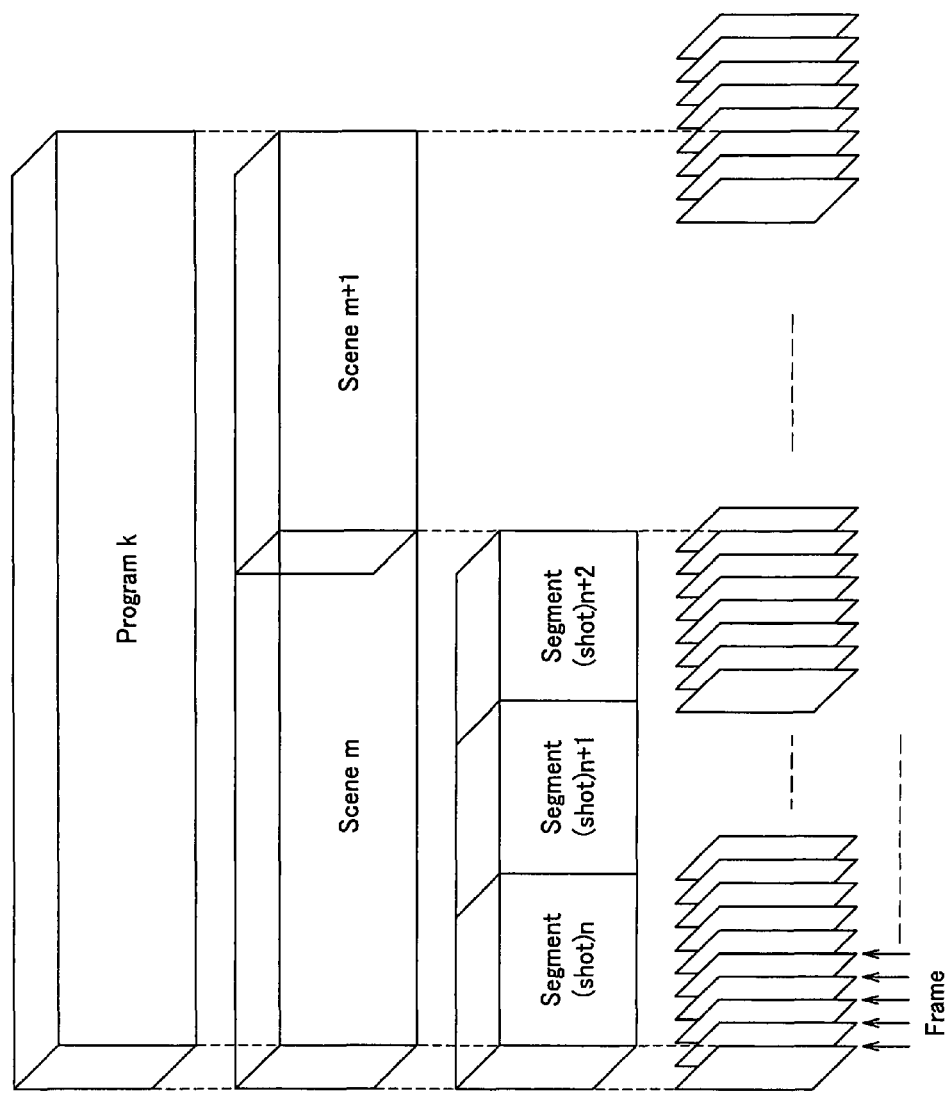
FIG. 10 shows an example of the structure of video data in the recording/playback apparatus.

Here will be explained a video data structure as shown in FIG. 10.

A program k may be divided into some scenes m, m+1, . . . , and each of the scenes be divided into some shots.

Each of the segments (shot) forms one frame.

The breakpoint between the scenes is a scene change point.

The segments (will also be referred as shot or image segment hereunder wherever appropriate) may be a combination of similar images corresponding to each scene or a combination of similar image characteristics.

The segments, segments, etc. have concepts unique to their meanings in the program.

Some segments and scenes each having its own meaning are combined together to form a video data structure in the program.

For example, in case a scene of a batter lasts in a broadcast program of a baseball game, similar images of the batter are detected and the scene can be divided into similar characteristic segments. The segments will have a meaning (concept of meaning) "images of the batter".

Also, in case a scene of a pitcher throwing a ball lasts in the broadcast baseball game program, similar images of the pitcher are detected and the scene can be divided into similar characteristic segments. The segments will have a meaning (concept of meaning) "images of the pitcher".

When it is supposed that the pitcher throws a ball, and the batter hits the ball and runs toward the base, it is possible to detect a linkage between image scenes having their own meanings, such as "image scene of the pitcher", "image scene of the batter" and "image scene of the batter in base running".

Image feature data and voice feature data in a predetermined program are processed in each of the above-mentioned PUs to set a meaning for each of PUs correspondingly to the feature data. For example, a scene of a news program, in which a caster (announcer) first reads news items (news headline), will include features of one or two persons, telop (tlp feature), speaker's voice as attribute of voice feature, etc., and the news program itself includes some scenes in which the caster reads news. Thus, the news program includes a plurality of scenes similar to the scenes where the caster or caster reads. Therefore, the similar image feature, namely, a certain ID, will appear more frequently.

As above, it is possible to set a meaning for each of PUs correspondingly to predetermined feature data such as person's feature, voice feature, telop feature, similar image feature and other feature as in the operation under the rule 1, which has previously been explained.

In the above example of the baseball game program, the relation among PUs connected to one another has a predetermined meaning. That is, PUs having predetermined feature data or characteristic data are connected to one another in a predetermined manner.

Figure 11:
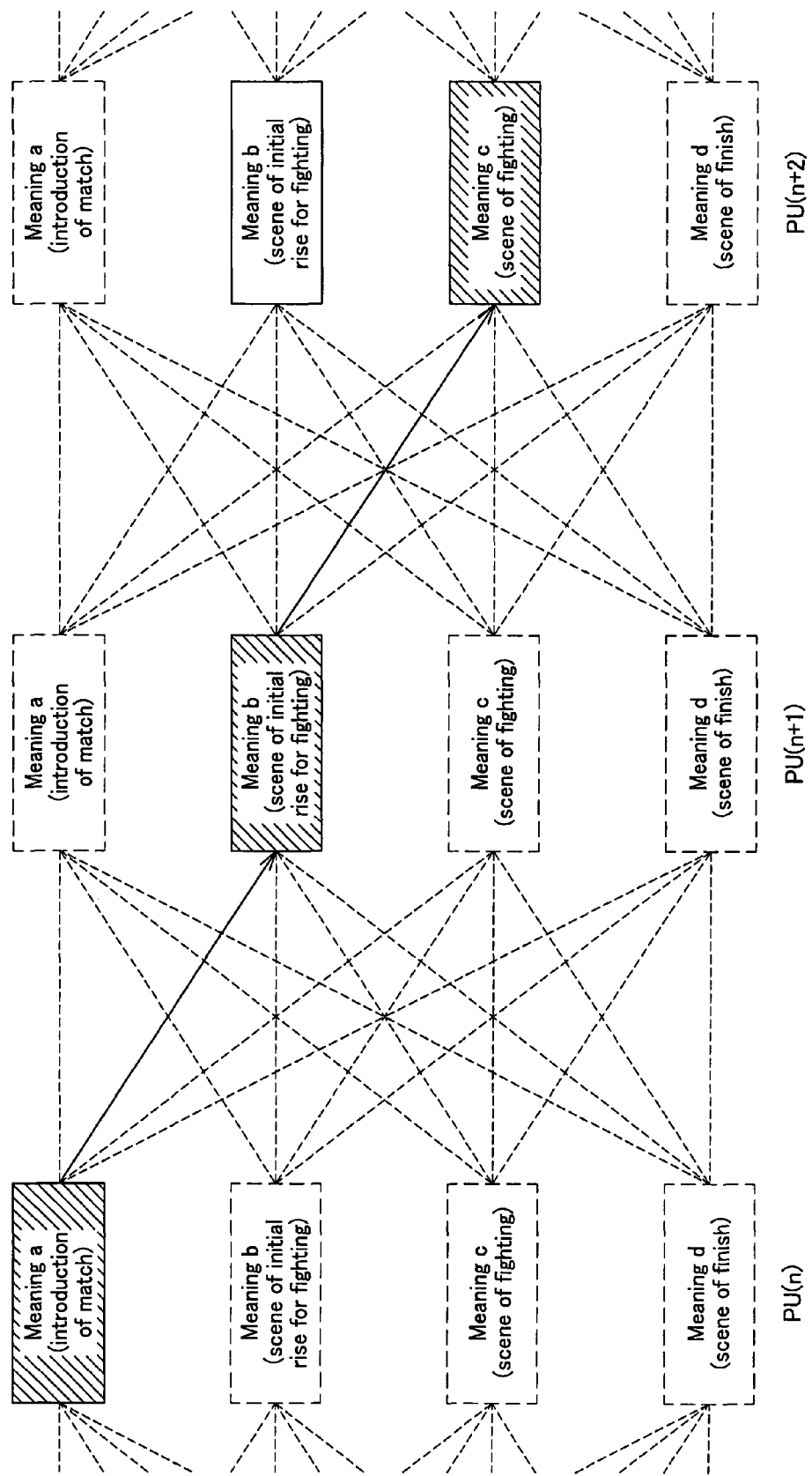
FIG. 11 shows an example of the connection among playback (or play) units in the recording/playback apparatus.

The relation among the playback units (PU) having the predetermined meanings, that is, for which the predetermined meanings are set, is shown in FIG. 11.

In FIG. 11, predetermined meanings a to d are set in a program (broadcast program).

The relation among certain sections PU(n) to PU(n+2) connected to one another indicates that the meaning a of PU(n), b of PU(n+1) and c of PU(n+2) are connected to one another in a most natural manner.

FIG. 11 shows the connected relation among PUs for a sumo-wrestling broadcast program. As will be known, it is most appropriate and reasonable that the meaning a "Scene of match introduction" is followed by the meaning b "Scene of initial rise for fighting" and that the meaning b "Scene of initial rise for fighting" is followed by the meaning c "Scene of fighting".

The connected relation among PUs may be defined by a series of character such as "abc". When the character series "abc" corresponds to key frames, it is possible to find out "abc" in a broadcast program and set the first and last sections thus found or their nearest points as predetermined set points.

In case playback units in a section correspond to meanings "throw a ball", "hit", "meaningless" and "get across", respectively, in a baseball game broadcast program, PUs determined to have the three meanings "throw a ball", "hit" and "get across" except for the meaning "meaningless" may be put together to provide a predetermined PU lump signified as "throw a ball/hit/get across".

Also, it is not any problem that the PU having the meaning "meaningless" is put together with the other PUs because it is determined to have no meaning. Thus, the above four PUs may be put together to provide a predetermined PU lump signified as "throw a ball/hit/meaningless/get across".

The above "meaningless" is set because it is possible that predetermined signification is made based on some meanings defined based on predetermined feature data by predetermination evaluation in the aforementioned operation under the rule 1, that is, that no positive signification can be made based on a plurality of meanings by the predetermined signal processing.

The "meaningless" may be "whatever meaning will do". The operation using the latter definition is similar to that using the definition character @.

FIG. 12A shows an example of news program in which a connection of "aabb", that is, "scene with appearance of announcer", "scene with appearance of announcer", "scene of affair or accident" and "scene of affair or accident". is appropriate and reasonable.

FIG. 12B shows an example of the aforementioned sumo-wrestling program.

Figure 13A:
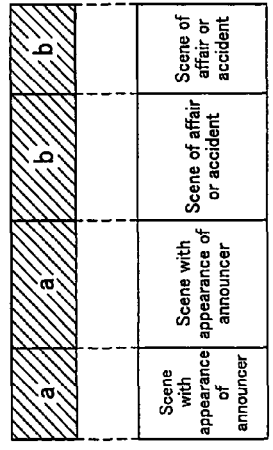
FIGS. 13A and 13B show examples of the rule 2 processing in the recording/playback apparatus.
Figure 13B:
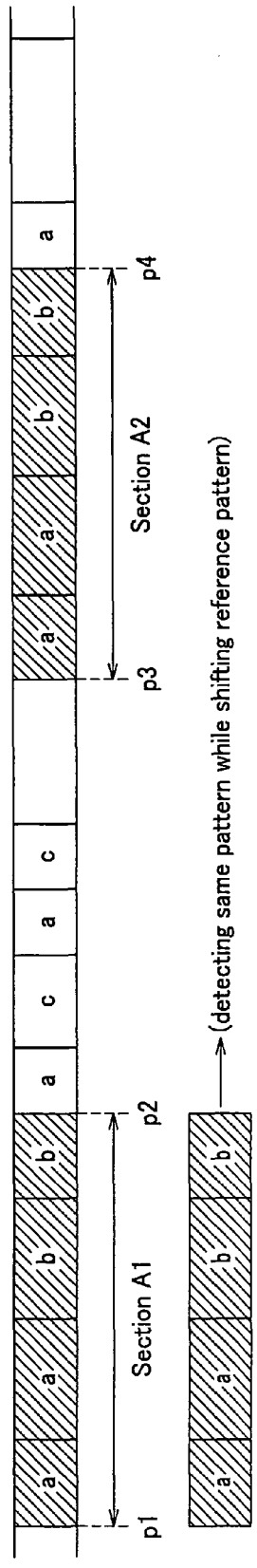

FIGS. 13A and 13B show processing of a new program under the rule 2. FIG. 13A shows that a reference pattern (series of reference characters) is "aabb" and FIG. 13B shows that sections having the reference pattern "aabb" are detected in predetermined program record sections and sections A1 and A2 in the illustration are found to have the reference pattern "aabb".

As shown in FIG. 13B, the start points p1 and p3, and end points p2 and p4 of the sections found to have the reference pattern "aabb", for example, are set as predetermined set points to make a predetermined processing of chapter data (positional information data) of a play list which will be explained later. In the summary playback mode, for example, the playback is controlled to play back the set points p1, p2, p3 and p4.

For the chapter setting, setting of predetermined points in time (predetermined position setting), etc., the points in time p1, p2, p3 and p4 and predetermined points near the time points are taken as set positions and subjected to predetermined processing.

Thus, playback control can be made by judging based on predetermined feature data that PU has a predetermined meaning, setting the PU to have the predetermined meaning, assuming the relation in connection between the meanings on the basis of the PU set to have such meaning, and assuming the connection and set of a predetermined number of PUs corresponding to the predetermined meaning.

Figure 14:
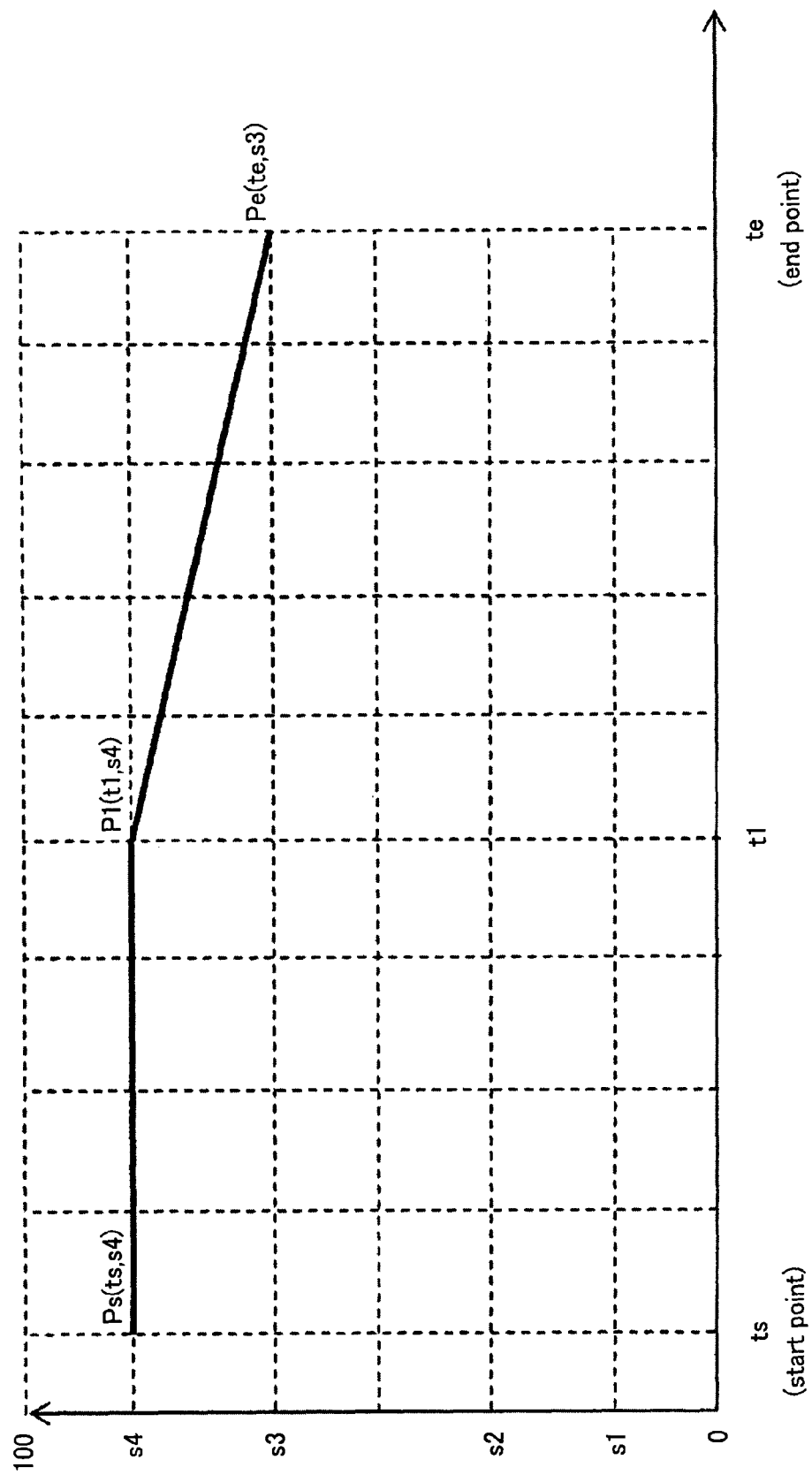
FIG. 14 graphically illustrates another example of the time correction function in the recording/playback apparatus.

In the example of the description of the operation under the rule 2, shown in FIG. 6B, a key frame (important frame) defined by a character series (aabb) to be detected and 100 as a weighting factor are described. Ps (ts, s4), P1 (t1, s4), Pe (te, s3) is described as time correction functions (having previously been described) after the former description. In this example, the function is such that the importance gradually decreases in the latter half of a program as shown in FIG. 14. This time correction function as shown in FIG. 14 is suitable for use to listen to and view mainly the former half of the program.

The description of the operation under the rule 2, shown in FIG. 6B, is an example of representation of the appearance pattern (meaning) of data to be described. In this description, characters a, b, c, . . . are used as meanings. However, characters A, B, C . . . may be used as their negations and "*" be used as a wildcard character. In the description of the operation under the rule 2, shown in FIG. 6B, in case the program belongs to a news program genre, for example, and is defined by (Abb), "A" is other than "Scene with appearance of announcer" and "b" is "Scene of affair or accident". Namely, "Scene with appearance of announcer" and two successive "Scenes of affair or accident" will be detected.

An example of the evaluation value calculation will be explained below. A playback unit group is taken as (abc). The detection ratios (value) and weighting factors of the features a, b and c are calculated using the aforementioned expression (1) as shown in Table 5.

TABLE 5

| Meaning | Value | Weighting factor (important) | Remarks |
|---------|-------|------------------------------|---------|
| a | 1.0 | 100 | 1.0 × 100 = 100 |
| b | 0.8 | 80 | 0.8 × 80 = 64 |
| c | 0.8 | 80 | 0.8 × 80 = 64 |

Evaluation Value $$\begin{aligned}\text{Evaluation value} &= 100 \times (100 + 64 + 64) / (\text{weighting factor sum}) \\ &= 100 \times 228 / (100 + 80 + 80) \\ &= 100 \times 228 / 260 \\ &= 88\end{aligned}$$

Other Example of Playback Unit Group in the Operation Under the Rule 2:

In the above expression, (abc) is multiplied by "100" because the ratio (%) of the evaluation value is taken in account. However, since the evaluation value may be in a scale which permits a predetermined evaluation and is not any problem in the predetermined calculation, the ratio may not be taken in account unless there occurs any problem such as overflow.

Other example of the playback unit group in the operation under the rule 2:

Here will be explained how to connect a plurality of meaning group units each being a playback unit group formed from a plurality of playback units having a "meaning" and connected to one another in the operation under the rule 2.

The operation under the rule 1 has been explained concerning only one playback unit. It was intended to find a playback unit most likely to have a "meaning" from the feature data.

The operation under the rule 2 may further be expanded to detect a section resulted from connection of lumps each including a group of playback units, that is, a combination of playback units signified by the operation under the rule 2.

For example, the aforementioned (aabb) may be taken as Ga1, and plural Ga1's be connected together in the form like (Ga1Ga1). In this case, the evaluation value of Ga1 is calculated by an operation similar to the operation under the rule 1. More specifically, it is possible to calculate the evaluation value by averaging the sum of evaluation values of the playback units different in meaning from each other, by averaging the products of the evaluation values of the playback units different in meaning from each other or by any other method.

For example, in case the evaluation of the playback unit having the meaning a is 80 and that of the playback unit having the meaning b is 60, the evaluation value of Ga1 can be determined as follows by the averaging the sum of evaluation values of the playback units:

(80+80+60+60)/4=70

Figure 15B:
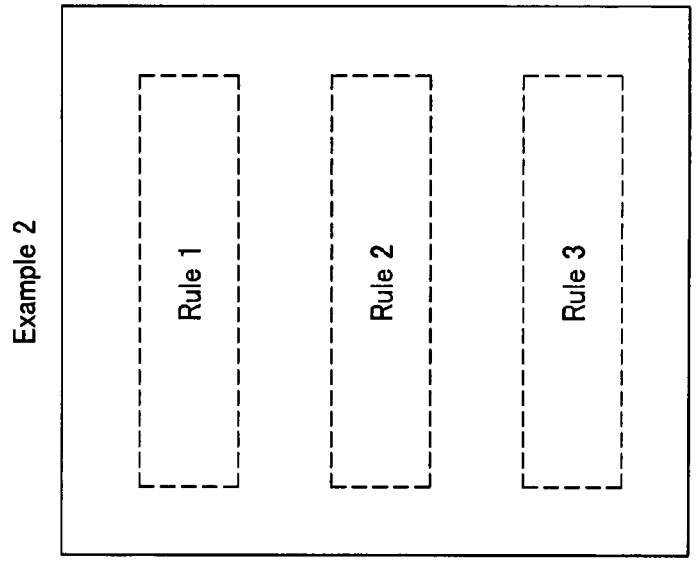
FIGS. 15A and 15B show examples of the structure of the rule file in the recording/playback apparatus.
Figure 15A:
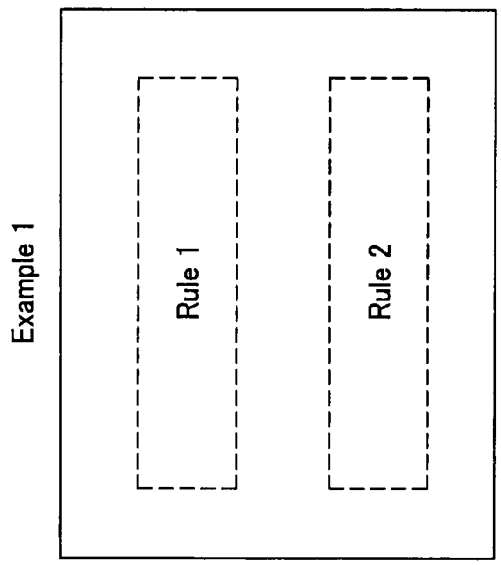

Normally, up to the operation under the rule 2 is done as in the example 1 in FIG. 15*a*. In case feature data are included in a plurality of programs, for example, in case each of the programs is time-weighted, an operation under a rule 3 is to be effected as shown in FIG. 15B.

FIG. 6C shows one example in which a news program (news) and sports program (sports) are weighted and time-corrected.

In the example shown in FIG. 6C, a news program is weighted in 100%, and corrected with the start point Ps (ts, s4), change point P1 (t1, s4) and end point Pe (te, s3) as time correction coefficients. A sports news is weighted in 70%, and corrected with the start point Ps (ts, s4), change point P1 (t1, s4) and end point Pe (te, s3) as time correction coefficients.

The operations having been explained above with reference to FIG. 3 will further be explained below with reference to FIG. 16.

FIG. 16A shows signification, in some ways, of each scene by the operation under the rule 1 on the basis of various predetermined feature data.

A predetermined operation is effected to set an evaluation value for each scene having been signified by the operation under the rule 2 as shown in FIG. 16B.

For example, to make playback at a user-desired time t1 in the summary playback mode, a scene (image) having the largest evaluation value set thereto is first selected, scenes having larger evaluation values are then selected at points in time as approximate to the time t1 as possible, and positional information is set to play back the section thus selected.

The set positional information is stored in a predetermined data memory, and it is read out of the memory when controlling the playback of a predetermined section.

The sections are sequentially played back (skip playback) to make predetermined summary (digest) playback.

In the example shown in FIG. 16C, it is assumed that the total recording time is 60 min and summary playback is to be made in 15 min. In case PUs having evaluation values of less than 70 are selected and summary-played back, if the time for the summary playback is somewhat less than 15 min, sections of PUn+8 having evaluation values of 60 are selected so that the playback time will be as approximate to the desired playback time of 15 min as possible.

Predetermined PU sections whose evaluation values are large are selected to select a PU section for the playback time to be as approximate to the predetermined one as possible.

The predetermined PU section is selected based on the evaluation value so that the playback time T will be within a predetermined allowable range tc of a desired playback time Tm as given below:

*Tm−tc<T<Tm+tc*

Also, by setting predetermined positions (chapter) at the beginning (or in the vicinity thereof), and at the end (or in the vicinity thereof), of a signified section having a large evaluation value, for example, as shown in FIG. 6D, the section may be used in predetermined operations such as edition, pause of the playback for skip playback, repeated playback, etc.

2. Examples of Block Construction of the Recording/Playback Apparatus

For the simplicity of explanation, it is assumed herein that image/voice data to be recorded is broadcast program data and the data is to be predetermined band compression based on MPEG (Moving Picture Experts Group). It should be noted that the signal may be processed by the wavelet transform, fractal analysis or the like. In case the wavelet transform, for example, is used to process the signal, a DCT coefficient of image data which will be explained below is equivalent to an analysis coefficient in multi-resolution analysis may thus be processed by the multi-resolution analysis.

2.1 Example 1 of the Block Construction

Figure 17:
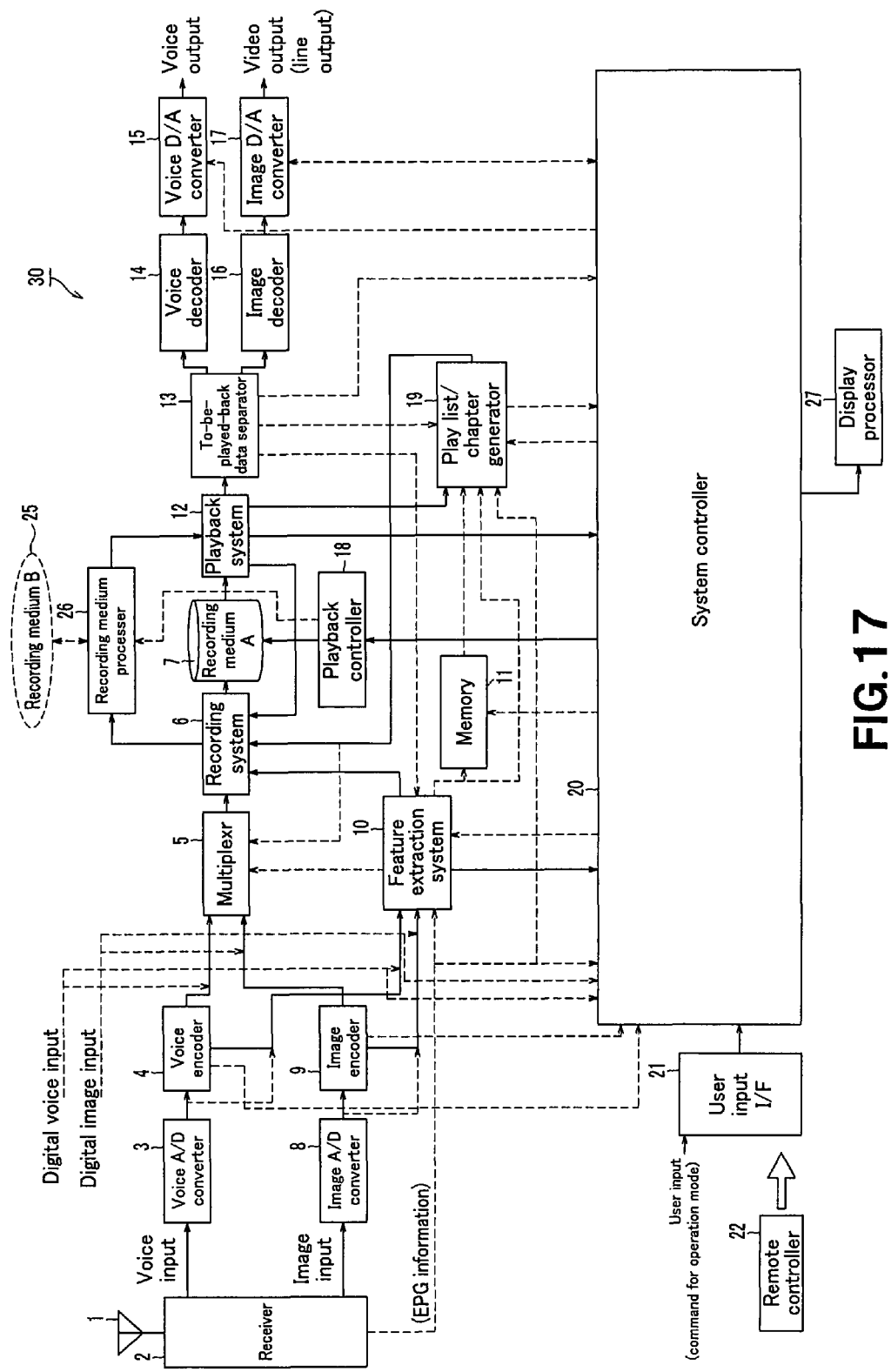
FIG. 17 is a block circuit diagram showing an example of the structure of the recording/playback apparatus of the present invention.

FIG. 17 is a block circuit diagram showing an example of the block structure of a recording/playback apparatus 30 (will be referred to as "recorder/player 30" hereunder) as an embodiment of the present invention.

Here will be explained, for the simplicity of explanation, an example in which the recorder/player 30 receives a television broadcast and records the received broadcast program.

2.1.1 System to Process Signal for Recording

The recorder/player 30 includes a reception antenna system 1 and receiver 2 to receive a predetermined broadcast program, a voice A-D converter 3 to make predetermined A-D conversion of a voice signal in the broadcast program with a predetermined sampling frequency and predetermined number of quantization bits, and an voice encoder 4 to which the voice signal thus A-D converted is then supplied.

The voice encoder 4 processes the A-D converted voice signal with a predetermined band compression technique such as MPEG audio, C3 audio (Dolby AC3 or Audio Code number 3) or the like.

The recorder/player 30 also includes another A-D converter 8 to make predetermined A-D conversion of an image signal in the broadcast program with a predetermined sampling frequency and predetermined number of quantization bits, and an image encoder 9 to which the image signal thus A-D converted is supplied.

The image encoder 9 processes the A-D converted image signal with a predetermined band compression technique such as MPEG, wavelet conversion or the like.

The voice and image data processed by the voice encoder 4 and image encoder 9 as above are supplied to a recorder 6 via a multiplexer 5.

For extraction of features of the voice signal, the recorder/player 30 also includes a feature extraction system 10 which is supplied with a part of the signal supplied to the voice encoder 4 or a part of the signal being processed during the predetermined encoding operation.

In the recorder/player 30 shown in FIG. 17, a part of the signal once supplied to the voice encoder 4 is supplied from the voice encoder 4 to the feature extraction system 10. However, the part of the signal may be supplied to the voice encoder 4 and also to the feature extraction system 10.

Also, for extraction of features of a video (image) signal, a part of the signal supplied to the image encoder 9 or a part being processed during the predetermined encoding operation is supplied to the feature extraction system 10.

In the recorder/player 30 shown in FIG. 17, a part of the signal once supplied to the image encoder 9 is supplied from the image encoder 9 to the feature extraction system 10. However, the part of the signal may be supplied to the image encoder 9 and also to the feature extraction system 10.

In the recording mode, feature data are detected one another for each predetermined section, and it is recorded along with image/voice data having been subjected to the predetermined encoding in a predetermined recording area in a predetermined recording medium 7.

The recorder/player 30 also includes a play list/chapter generator 19 that makes a predetermined signal processing such as play list processing (9) to generate play list data for predetermined summary (digest) playback from the feature data or digest playback chapter processing (11) to generate chapter data.

Here it is possible to make the following signal processing (process (a) or (b)) to generate play list or chapter data.

Process (a):

After the feature data is stored into a predetermined memory area of a predetermined memory or system controller for a predetermined amount of data, the predetermined play list data and predetermined chapter data are generated.

Process (b):

After the feature data are stored one after another for the predetermined amount of data into the recording medium 7 which is to record image/voice data each time the predetermined feature extraction is effected, the data is played back to generate the predetermined play list data and predetermined chapter data.

In the above process (a), after a broadcast program for a predetermined length of time t is entirely recorded, all predetermined feature data in the broadcast program are collected together. At this point in time, play list data generation can be made to determine where a key frame corresponding to a summary playback time td is in the length of time t. That is, the feature data to be processed for the length of time t will be stored in the predetermined memory area of the memory or system controller.

In the above process (b), after the broadcast program is entirely recorded for the predetermined length of time t as in the process (a), it is detected whether the program has been recorded for the predetermined length of time t, the predetermined data is played back and the play list data generation corresponding to the predetermined summary playback time td will be started.

After completion of the play list data generation, the recorder/player 30 is ready for the predetermined summary playback, and it is possible to make the predetermined summary (digest) playback using the play list data.

Since the play list data has already been generated, the predetermined feature data is erased in case no more play list data is to be generated. However, in case the data is generated again for correction of the play list data, the feature data may be left as it is recorded.

After the feature data in a predetermined section is stored via the system controller 20, it is used by the play list/chapter generator 19 to generate play list data for the predetermined summary (digest) playback.

The generated play list data is recorded in a predetermined manner in the recorder 6 and then recorded in a predetermined recording area in the recording medium 7.

For skip playback of a section thus recorded in the predetermined manner, the play list data includes data as a pair of information on playback start and end points of each predetermined section to be played back. It includes, for example, a pair of data on a playback start frame number and end frame number of the predetermined section.

The play list data is used for making the summary (digest) playback by skipping between predetermined necessary sections of the recorded program. So, the play list data may be time code data, time stamp data such as PTS (Presentation Time Stamp), DTS (Decode Time Stamp) or the like defined in MPEG or the like in addition to the above-mentioned frame data.

The play list data may be used to make predetermined data generation after completion of predetermined program recording while in the recording mode in which image/voice data as in the above-mentioned broadcast program, and then make a predetermined operation using the feature data while in the playback mode which will be explained later.

As will be known from FIG. 17, voice and image data having been encoded in a predetermined manner with a MPEG-based technique may not be encoded in the voice encoder 4 and image encoder 9 but may be supplied directly to the multiplexer 5, processed by the recorder 6 and recorded into a recording medium.

It is possible to detect, by the system controller 20, whether digital image/voice data is supplied for direct recording or recorded after an analog image/voice signal is supplied to the receiver 2 and encoded in the predetermined manner. Namely, it is possible to determine, depending upon the input system, whether the predetermined image/voice feature data is to be extracted automatically during the recording mode or after the data has been recorded. Alternatively, in case the digital image/voice data is supplied, no data will pass through the predetermined encoder, so that it is not necessary to make any predetermined analysis of the data structure. In this case, the predetermined image/voice feature data may be extracted after the image/voice data has been recorded.

When in the recording mode, the analog or digital input system may be set according to a user's predetermination operation via a user input interface (I/F) 21.

As also seen from FIG. 17, the system controller 20 can automatically detect a signal from the voice encoder 4 or voice A-D converter 3, a signal from the image encoder 9 or image A-D converter 8, and digital and voice data encoded in the predetermined manner.

In case the digital data encoded in the predetermined manner is detected while the data from the voice encoder 4 or voice A-D converter 3, and data from the image encoder 9 or image A-D converter 8, are not detected, it may be determined that digital image and voice data having been encoded in the predetermined manner have been supplied.

In case the digital data encoded in the predetermined manner is not detected by the system controller 20 while the data from the voice encoder 4 or voice A-D converter 3 and data from the image encoder 9 or image A-D converter 8 are not detected by the system controller 20, the data may be determined to be an analog input.

Both the analog input and digital data encoded in the predetermined manner are detected, the analog input signal from the receiver 2 may be recorded in a predetermined manner for initialization (default setting).

The feature extraction is made based on DCT data on an image, for example. So, in case the data is encoded in the predetermined manner, the DCT for ordinary data recording may be used for the feature extraction as well. Since subband-coded data is used in the predetermined encoding, the subband coding for the ordinary data recording may be used for encoding the voice data in the predetermined manner for extraction of feature data.

In case the encoded digital data is supplied directly to the recorder/player 30, no encoding may be done. So, it is necessary to analyze the digital data and extract feature data by DCT, which will cause a load to the recorder/player 30.

On this account, the feature data is extracted as necessary after the digital data is recorded. Alternatively, also in case analog data is supplied, feature data may automatically be extracted after the analog data is recorded correspondingly to the extent of the load to the signal processor.

Figure 20:
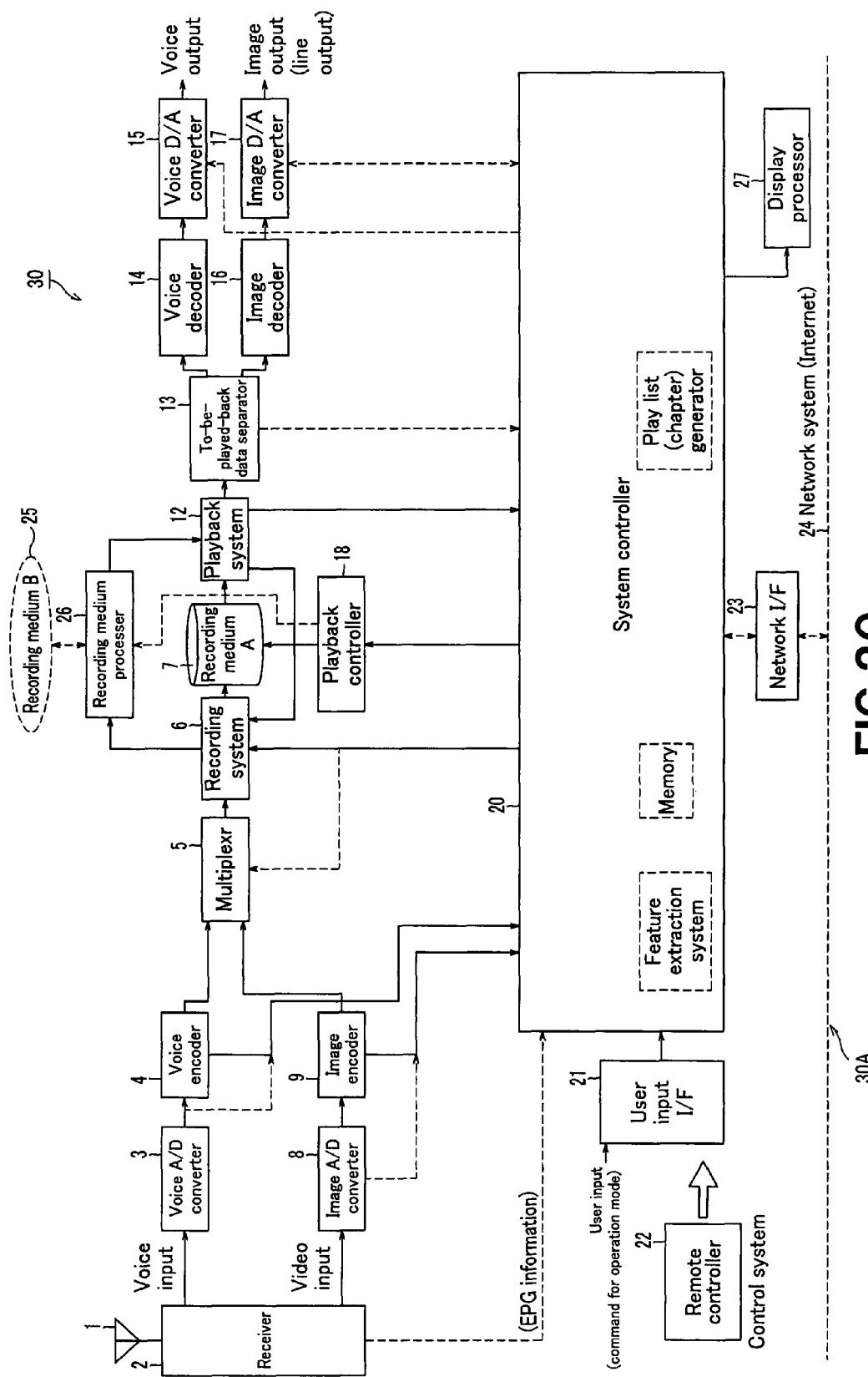
FIG. 20 is a block circuit diagram showing another example of the structure of the recording/playback apparatus of the present invention.

The feature extraction may be done by software as shown in FIG. 20, for example. Since it depends upon the performance of the system controller whether the feature extraction can be made simultaneously with each predetermined signal processing in the recording mode, the feature extraction is to be done after completion of the predetermined recording. Also, the system controller 20 may include a CPU, DISP (digital signal processor) and other various processors. However, the higher the performance, the more expensive the system controller is. So, it may be determined correspondingly to the processing ability whether the feature extraction is to be done simultaneously with the recording or after the recording.

The predetermined feature extraction may be done after completion of the predetermined recording mode, for example, after completion of a predetermined time recording operation or in the night for which, it is normally assumable, the apparatus is not operated by the user. In such a case, a time period for which the apparatus is in operation should be stored in the predetermined memory in the system controller 20 and the time period for which the feature extraction is to be effected should automatically be set appropriately by predetermined learning.

Also, in case a time period for which the apparatus is normally not in operation for recording or playback is detected by the system controller 20, the predetermined feature extraction may be effected for the period during which the apparatus is not in use by the user. In this case, all predetermined data have not possibly been processed. A point of which processing has been interrupted is to be memorized in the predetermined memory in the system controller 20, and it is to be detected that the apparatus is not normally in operation for recording or playback. If it is determined that a time for which signal processing can be done is available, the predetermined signal processing interrupted once is to be resumed at the interrupted point.

2.1.2 Operation of the Playback System of the Apparatus

Normal Playback Mode

Next, there will be explained the signal processing for playback in the recorder/player 30 shown in FIG. 17.

First, the operations in the normal mode of playback will be explained.

When the normal mode of playback is set by a user input interface 21, predetermined data including predetermined image/voice data, feature data, etc. are played back from the recording medium 7, and subjected to predetermined playback n the playback system 12.

The predetermined data thus played back is separated by a playback data separator 13 into predetermined data. Voice data is supplied to a voice decoder 14 in which it will be decoded in a predetermined manner corresponding to a signal processing technique with which the data has been subjected to the band compression at the time of recording, supplied to a voice D-A converter 15 where it will be D-A converted, and then provided as a voice signal.

Also, image (video) data sorted in a predetermined manner is decoded by a video decoder 16 in a predetermined manner corresponding to the signal processing technique with which the data has been subjected to the band compression at the time of recording, supplied to a video D-A converter 17 in which it will be D-A converted, and then provided as a video signal.

Summary (Digest) Playback Mode

In the summary (digest) playback mode, processing of image/voice data differs depending upon whether or not the image voice data is recorded along with feature data and play list data in the recording medium.

FIG. 18 shows how the feature data and play list data are recorded in the recording medium.

Firstly, in case play list data (play list data file) and chapter data as in FIGS. 18A and 18B can be played back, that is, in case the play list data and chapter data are recorded in a predetermined recording medium (data recording medium) and can be played back in the summary playback mode or predetermined chapter image can be displayed as a thumbnail in the chapter display mode, the image/voice data will be processed as in the following:

Namely, the processing is made as follows when the user selects the summary playback mode or chapter display mode.

In case feature data, parameter data, play list data, chapter data, etc. subjected to the predetermined data separation in the playback data separator 13 have been recorded when the user supplies the system controller 20 with a command for an operation in the predetermined summary (digest) playback mode via the user input interface 21, the separated predetermined feature data, predetermined parameter data, predetermined play list data, chapter data, etc. will be supplied to the system controller 20.

In case the feature data, parameter data, play list data and chapter data cannot be separated by the playback data separator 13, these data will not be supplied to the system controller 20. So the playback data separator 13 and system controller 20 judge whether the feature data, play list data, predetermined chapter data, parameter data, etc. are recorded in the predetermined recording medium 7.

The play list data includes playback start and end point information on some predetermined playback sections in order to make predetermined summary playback.

The chapter data includes positional information on the top of a predetermined feature section or a position near the top, bottom of the predetermined feature section or a position near the bottom, top of a section other than a feature section connected to the feature section or a position near the top, or bottom of a section other than the feature section or a position near the bottom.

The system controller 20 makes summary (digest) playback by making skip playback correspondingly to skip playback start and end data in play list data detected through playback.

Also, a display processor 27 processes, for display, an image of a chapter point or a point near the chapter point as a predetermined thumbnail on the basis of the predetermined chapter data, and makes a predetermined image display.

As will be described next, in case play list data (play list data file) and chapter data as in FIGS. 18C and 18D cannot be played back, that is, in case the play list data and chapter data are not recorded in the predetermined recording medium or storage medium and cannot be played back in the summary playback mode, a series of chapter-related operations such as predetermined thumbnail display, chapter playback, etc. cannot be done at the thumbnail point in time when in the chapter display mode.

The explanation made herein applies to playback of image/voice data from another recording medium as in case a recording medium 25 is played as DVD software in the recording medium processor 26 and playback system 12, not to playback of a received image/voice data such as the aforementioned broadcast program, and to playback of image/voice data whose feature has not been extracted.

In case any play list or chapter data has not been generated and cannot thus be detected through playback or in case it is desired to re-generate play list data or chapter data detected through playback, it is possible to generate summary-playback play list data and chapter data for predetermined chapter-related mode chapter data from predetermined feature data and parameter data detected through playback.

In a case shown in FIG. 26C, that is, in case feature data can be played back because feature has been extracted at the time of recording, play list data or predetermined feature data is supplied from the playback system 12 or playback data separator 13 in the recorder/player 30 shown in FIG. 17 to the play list/chapter generator 19 which will generate predetermined play list data or predetermined chapter data.

Figure 19:
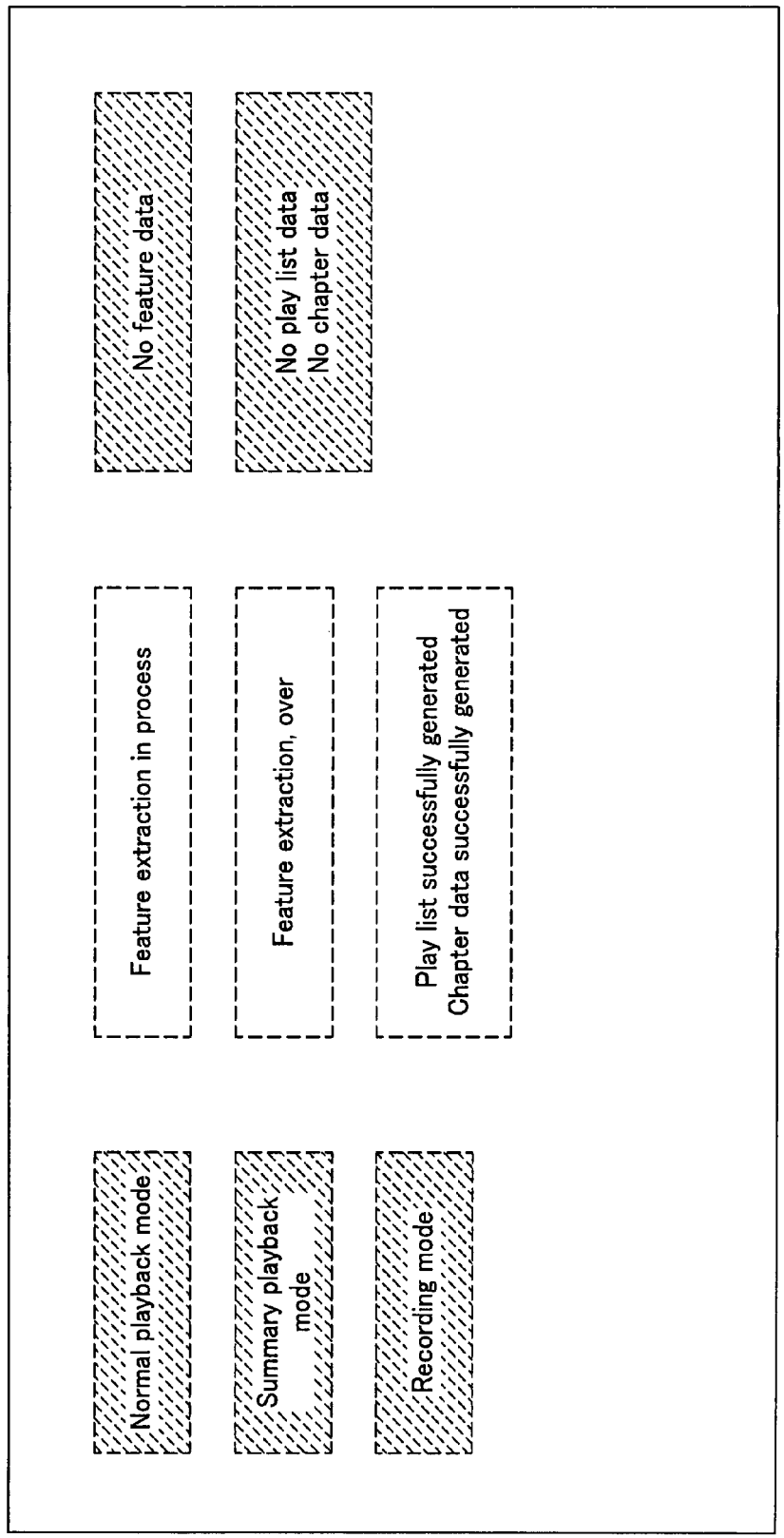
FIG. 19 shows an example of the display in the recording/playback apparatus.

For this operation being explained here, the display processor 27 may be adapted to provide a predetermined indication that the play list data as shown in FIG. 19 is not existent when the user has entered a command for the summary playback mode.

The generated play list data is supplied to the system controller 20. The system controller 20 will control a playback controller 18 so that predetermined playback sections based on the play list data will be played back one after another (skip playback) correspondingly to a predetermined summary playback time instructed by the user, and thus the playback controller 18 will control the playback operation of the recording medium 7.

Also, the generated chapter data is supplied to the system controller 20. The system controller 20 will control the playback controller 18 so that predetermined chapter-related operations such as display of an image as a thumbnail at a predetermined chapter point in time based on the chapter data, editing operations such as cutting, connection, etc. of chapter points, skip playback of chapter points selected by the user, etc., and thus the playback controller 18 will control the playback operation of the recording medium 7 and the operation of the display processor 27 by means of the system controller 20.

As above, also in case an external recording medium such as DVD is summary-played back as the recording medium 25, the similar signal processing to the above may be done. The recording medium processor 26 is controlled by the playback controller 18 to make the predetermined summary playback as above.

Also, it is possible to make, through the similar signal processing to the above, a series of predetermined chapter-related operations such as the edition using chapter data, skip playback between predetermined chapter points (or points near the chapter points), display of an image as a thumbnail at the chapter points (or points near the chapter points), etc. Thus, the recording medium processor 26 is controlled by the playback controller 18 to make predetermined signal processing as above.

In addition, the feature data shown in FIG. 16D cannot be played back, as will be explained below.

The above example has been explained concerning the generation of play list data and chapter data from feature data. However, if the external recording medium 25 to which data has been recorded by another user is copied to the recording medium A, the feature data cannot be played back in some cases.

In case the recording medium 7 has recorded therein image/voice data such as a broadcast program, not any feature data, it is not possible to playback any feature data, as will be explained below.

For the operation being explained here, the display processor 27 may be adapted to provide a predetermined indication that the feature data as shown in FIG. 19 is not existent when the user has entered a command for the summary playback mode or predetermined chapter-related operation mode.

To play back the image/voice data from the recording medium A (7) in the summary playback mode in this case, the data played back by the playback system 12 is supplied to the playback data separator 13, and the image and voice data thus separated and having been subjected to the predetermined band compression are supplied to the feature extraction system 10 in which these data will be subjected to various types of predetermined feature data detection to detect DCT, DC coefficient, AC coefficient, motion vector, etc. as image characteristic data, and voice power as voice characteristic data.

The feature extraction system 10 will further extract, based on the above-mentioned various image/voice characteristic data and predetermined parameter data, predetermined telop feature data (telop section judgment data), person's feature data and other image feature data (image feature section judgment data), and speaker's voice feature data (speaker's voice judgment data), applause/cheer feature data (applause/cheer judgment data) and other voice feature data (voice feature judgment data).

The above-mentioned various image feature data and voice feature data are supplied to the system controller 20, and it is determined, when the predetermined feature extraction from all the predetermined image/voice sections is complete, that the feature extraction is over.

In case the feature extraction is over, a signal indicating that the predetermined signal processing is complete is supplied from the system controller 20 to the display processor 27. The display processor 27 may be adapted to provide a predetermined indication as shown in FIG. 19.

Next, there will be explained an operation to generate predetermined play list data and chapter data from the feature data.

The aforementioned feature data is stored into the memory 11 for each of the predetermined feature-extraction sections. When all the operations for the predetermined features are complete, the feature data are supplied to the play list/chapter generator 19 which will generate predetermined play list or chapter data.

Note here that the feature-extraction data of a predetermined section may be supplied from the feature extraction system 10 directly to the play list/chapter generator 19 and that when the feature extraction of all the above-mentioned predetermined sections and predetermined broadcast program is complete, the play list/chapter generator 19 may generate the aforementioned predetermined play list data or chapter data on the basis of the predetermined signal from the system controller 20.

Also, the processed feature data from the feature extraction system may be processed to the play list/chapter generator 19 via the system controller 20.

When the play list/chapter generator 19 has generated the predetermined play list data or chapter data, a signal indicating that the predetermined operations are over is supplied to the system controller 20 which can thus make a predetermined chapter-related operation using summary-playback or predetermined chapter data corresponding to a desired summary-playback time.

In this case, there is provided a predetermined indication that the play list data or chapter data could has successfully been generated as shown in FIG. 19. Alternatively, there is made on the display processing system 27 an indication that the apparatus is in a summary playback mode and predetermined chapter-related mode of operation.

In case it is not known in which length of time the user wants to make summary playback of a recorded one hour-long broadcast program lasting, 30 or 20 min, play list data corresponding to some lengths of playback time may be generated in advance correspondingly to a sum of lengths of time of all sections of image/voice data such as the recorded broadcast program, from which features have been extracted.

In case the broadcast program from which features are to be extracted is a one-hour one, summary playback is made for 40, 30 and 20 min to generate play list data for each of the lengths of playback time. By generating the play list data in this way, it is possible to make summary playback operations corresponding to all the predetermined lengths of playback time in case such summary lengths of time are selected by the user operating the remote controller 22 or a similar remote commander.

Playing the recording medium 25 is similar to the playing of the recording medium A (7). Namely, the recording medium 25 is detected by the recording medium processor 26, a playback signal is processed by the playback processor 12, and predetermined image/voice data is separated by the playback data generator 13. Since the subsequent signal processing is similar to that for playing the recording medium 7, so it will not be explained herein.

By installing a control program for performing a series of operations into a computer incorporated in a dedicated hardware or by installing various programs, the control program is installed into a general-purpose personal computer or the like capable of performing various functions.

The recording medium may be a package medium such as a hard disk having the control program recorded therein as well as a magnetic disk, optical disk, magneto-optical disk, semiconductor memory or the like having the program recorded therein and which is distributed for providing the user with the program separately from the computer.

22. Example 2 of the Block Construction

The present invention will further be explained with reference to FIG. 20 showing a another example of the recorder/player 30 shown in FIG. 17. The recorder/player is generally indicated with a reference numeral 30A in FIG. 20.

The signal recording/playback of a broadcast program is similar to that made in the recorder/player 30 shown in FIG. 17, and only differences from the signal recording/playback in the recorder/player 30 will be explained herebelow.

2.2.1 Signal Processing in the Recording System

The difference of the recorder/player 30A in FIG. 20 from the recorder/player 30 lies in that a series of signal processing operations for feature extraction in the recording mode is made by software in the system controller 20.

In the recorder/player 30A, predetermined software is downloaded over a network system 24 and used to make feature extraction, play list processing (chapter generation (generation of information such as playback section and playback point in time)) by software operations as will be explained below.

The downloading of the software according to the present invention by a software operation will advantageously permit an existing apparatus having the software according to the present invention not initially installed therein to utilize the downloaded software. For example, in case the software cannot be manufactured or sold in time for installation in a recording/playback system, the manufacturer may first provide the user with a simple-configured system having not applied therein the software according to the present invention, and subsequently a system having the software applied therein after the software is manufactured.

After buying the simple-configured system having not applied therein the software according to the present invention, the user can advantageously add further functions to his or her system since he can install the software into his system by a software operation.

Also, for correcting or improving the processing system, the user can advantageously upgrade the system by downloading the software according to the present invention.

To download the software according to the present invention into his system, the user operates a predetermined control system (such as the remote controller 22 or the like) to access to a predetermined Internet site over the network system 24 and download the software according to the present invention by operating the predetermined control system.

The software according to the present invention, thus downloaded, is decompressed and installed in predetermined manners in the system controller 20, and then the predetermined processing functions according to the present invention such as the predetermined feature extraction, play list generation, chapter setting, etc. are provided in the user's system.

Using a microprocessor (MPU or CPU) having predetermined functions, the system controller 20 is able to make the predetermined feature extraction and recording simultaneously.

Also, the predetermined data memory provided in the system controller 20 may be used as the aforementioned memory 11.

To make predetermined image/voice band compression as one of the aforementioned predetermined recording operations, MPU or CPU having the above predetermined functions or DSP (digital signal processor) may be used. Namely, the same MPU or CPU or DSP making the band compression may be used to make the aforementioned predetermined feature extraction and play list generation.

2.2.2 Signal Processing in the Playback System

The difference of the recorder/player 30A in FIG. 20 from the recorder/player 30 lies in that a series of signal processing operations is made by software in the system controller 20 when the feature extraction is effected in the playback mode without any feature data being detectable.

Using the microprocessor (MPU or CPU) having the predetermined functions, the system controller 20 is able to make the predetermined feature extraction and recording simultaneously.

Also, the predetermined data memory provided in the system controller 20 may be used as the aforementioned memory 11.

3. Feature Extraction

Next, there will be explained operations for voice feature extraction and image feature extraction.

3.1 Voice Feature Extraction

Figure 21:
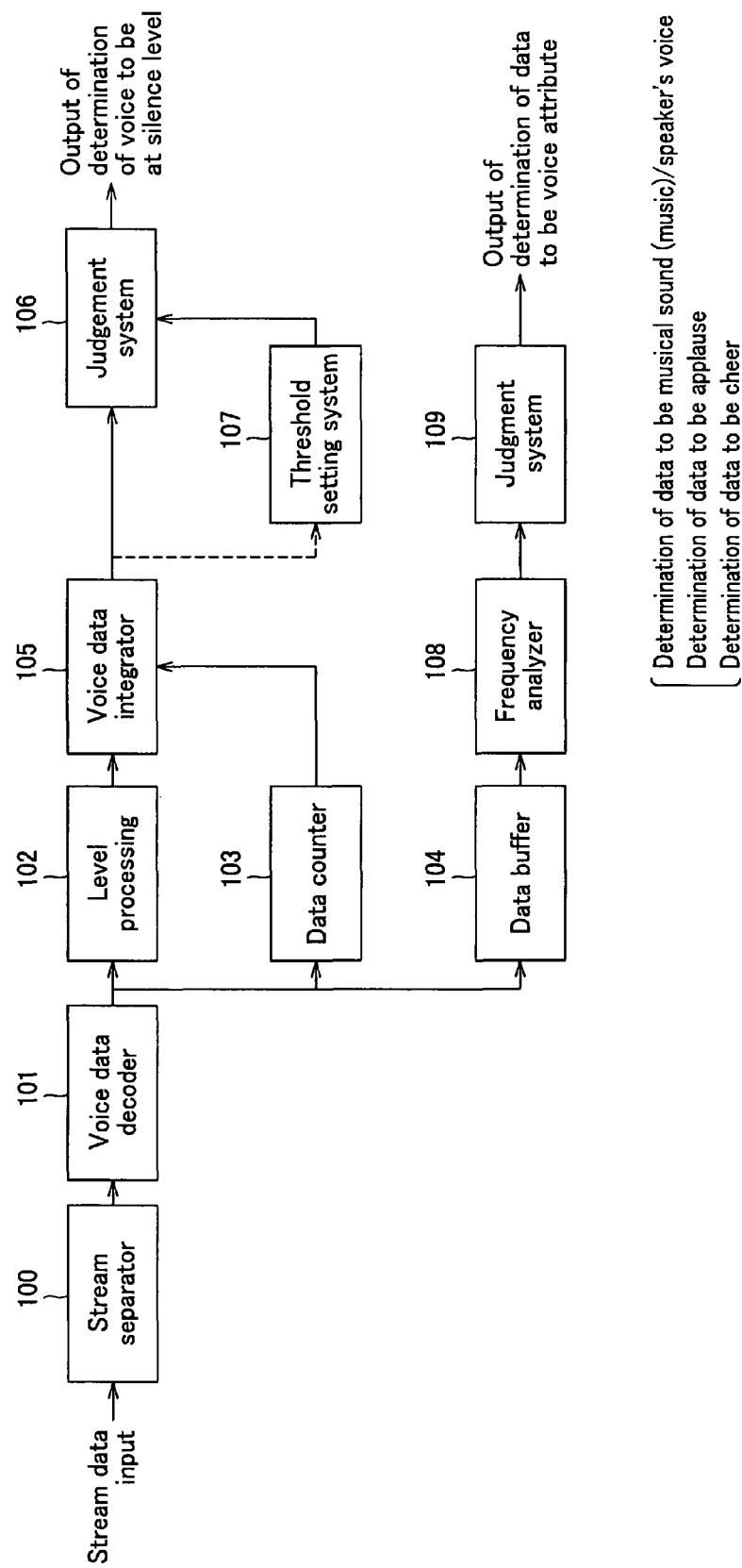
FIG. 21 is a block circuit diagram of an example of the structure of the voice feature extraction system according to the present invention.

In the voice feature extraction system, image/voice stream data based on MPEG is supplied o a stream separator 100 in which it will be separated into image and voice data, and the voice data is supplied to a voice data decoder 101 in which it will be decoded in a predetermined manner, as shown in FIG. 21.

The decoded voice data (voice signal) is each of a level processor 102, data counter 103 and data buffer 104. In the level processor 102, the data is processed into an absolute value for calculation of a mean power (mean level) Pav of predetermined sections of the voice data, and the mean power is integrated by a voice data integrator 105 until the data counter 103 counts a predetermined number of sample data.

The mean power Pav can be determined by making calculation of the expression (32) given below:

$$Pav = \sum^{nd} |Ad(n)|/Sm \tag{32}$$

where Ad(n) is a value (level) of he voice data.

The predetermined section for which the mean level is to be calculated may be, for example, about 0.01 sec (10 msec) to 1 sec. On the assumption that the sampling frequency Fs is Fs=48 kHz, for example, calculation is made of 480 to 48,000 samples and he calculated values are averaged with a number of samples Sm to determine a mean level (mean power) Pav.

The data Pav supplied from the voice data integrator 105 is supplied to the judgment system 106 in which it will be compared with a predetermined threshold Ath set by a threshold setting system 107 to judge whether the section is silent.

For setting the predetermined threshold Ath in the threshold setting system 107, the predetermined threshold Ath may be set as a fixed one Ath0. Otherwise, it may be set as a variable one Athm corresponding to the mean level of the predetermined voice section in addition to the fixed threshold Ath0.

With a section to be processed being taken as n and the mean level Pav of preceding sections (n–k) being taken as Pav(n–k), the variable threshold Athm may be as given by the following formula (33):

$$Athm = \sum_{k=1}^{t} Pav(n-k)/m \quad (t \leq m) \quad (33)$$

For example, on the assumption t=2, $$Athm = (Pav(n-1) + Pav(n-2))/m \quad (34)$$

For example, m is set as a value within a range of about 2 to 20.

Other Voice Feature Extraction

The predetermined voice data stored in the data buffer 104 is supplied to a frequency analyzer 108 in which it will be subjected to a predetermined frequency analysis.

The frequency analysis may use FFT (fast Fourier Transform). The number of data sampled from the data buffer 104 for the predetermined analysis is a predetermined power of two (2), for example, 512, 1024, 2048 or the like.

The signal (data) from the frequency analyzer 108 is supplied to the judgment system 109 in which it will be judged in a predetermined manner.

A music (musical sound) may be judged based on the continuity of the spectrum peak of a predetermined frequency band.

The above techniques are disclosed in the Japanese Patent Laid Open No. 2002-116784 etc. for example.

For judgment of a speaker's conversation voice, the data or signal can be processed by detecting a predetermined steep rising or falling section at a breath section in a waveform of the speaker's conversion voice.

In this case, the appearance probability of the waveform rising or falling section in the music (musical sound) waveform is generally considered to be lower than in the speaker's voice. So, with the characteristic (feature) of the music (musical sound) waveform being also taken in account, the attribute of a voice signal is judged in a comprehensive manner.

For judgment of the attribute of a voice signal on the basis of the difference in waveform characteristic (feature) between the speaker's voice signal and music (musical sound) signal, the temporal physical characteristic of the waveform will be detected. So, the above-mentioned frequency analysis may be effected before a method of making a predetermined judgment in the baseband (analysis and judgment of a signal in a time domain) is used in addition to a method of making a predetermined signal processing by judgment (analysis and judgment of a signal in a frequency domain).

Figure 22:
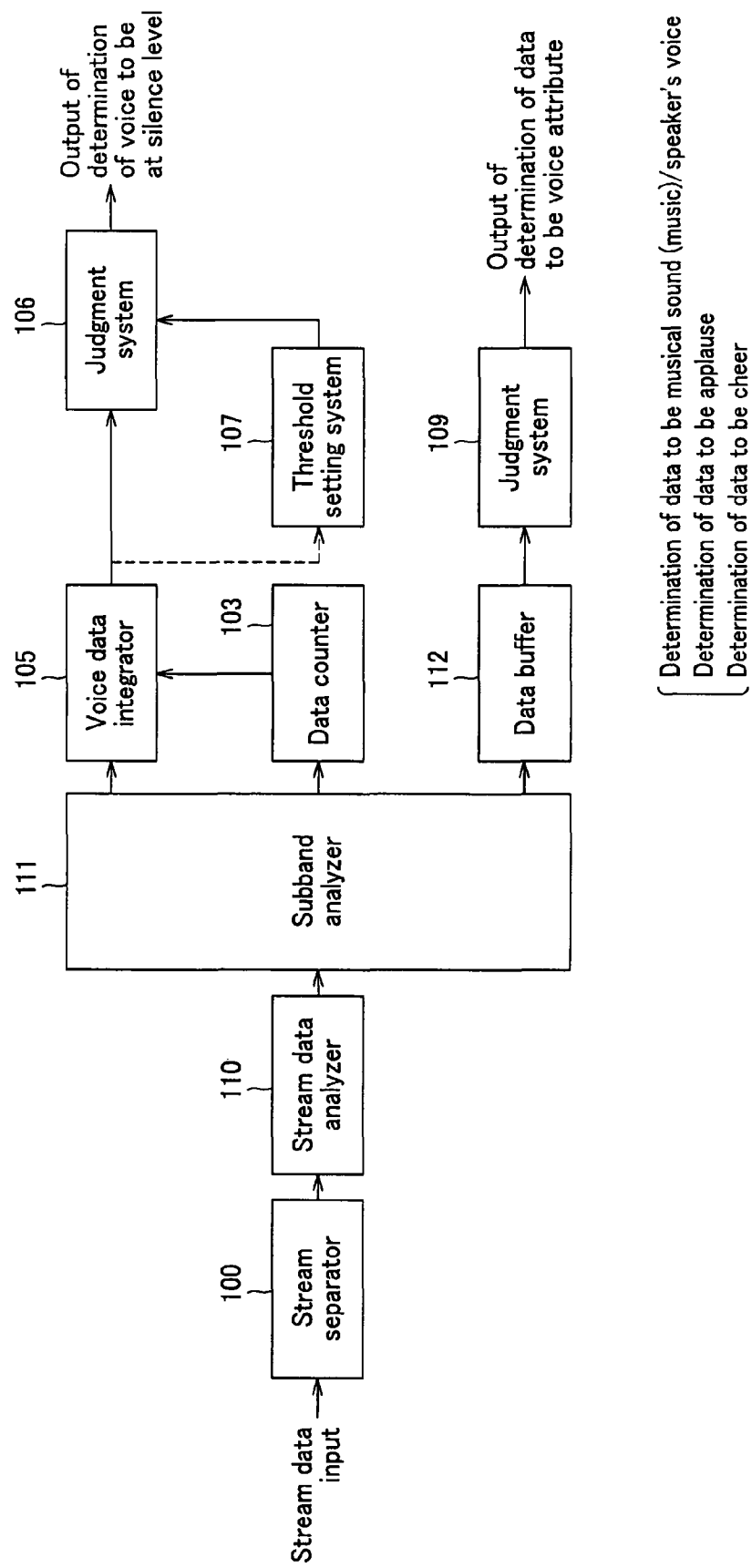
FIG. 22 is a block circuit diagram of another example of the structure of the voice feature extraction system according to the present invention.

FIG. 22 is a block circuit diagram of another example of the structure of the voice feature extraction system for analysis of a voice signal (voice data) not decoded but still in a compressed band.

In the voice feature extraction system shown in FIG. 22, a data stream subjected to a predetermined band compression, for example, image/voice data based on MPEG, is supplied to the stream separator 100 in which the data will be separated into image and voice data, the voice data is supplied to a stream data analyzer 110 in which it will be analyzed as to a predetermined sampling frequency, quantifying bit number, etc., and predetermined voice data is supplied to a subband analyzer 111.

In the subband analyzer 111, a predetermined subband analysis is effected, and data in a predetermined subband is processed in the similar manner to that having been explained above with reference to the formulae (32) to (34).

That is, predetermined integration operations including the supply of the data to the voice data integrator 105 through the detection of a predetermined number of sampling data in the data counter 103 are effected, and then the data is subjected to a predetermined silence judgment in the judgment system 106 on the basis of a predetermined threshold set in the threshold setting system 107.

With consideration given to the spectrum of the voice data in the silence judgment, a predetermined data band of less than about 3 kHz in a band where much energy concentrates may be used as a subband.

The judgment, by the frequency analysis, of a musical sound (music) and judgment of a speaker's voice have been explained above. Since the operation of the subband analyzer 111 is equal to the operations in the signal processing system, the signal processing for the attribute judgment can be covered by the aforementioned judgment of the continuity of spectrum peak.

In this case, the spectrum peak is within the widest data band of each predetermined subband. So, the similar signal processing to than in the FFT analysis may be made.

3.2 Image Feature Extraction

Next, the operations for feature extraction of an image will be explained.

Figure 23:
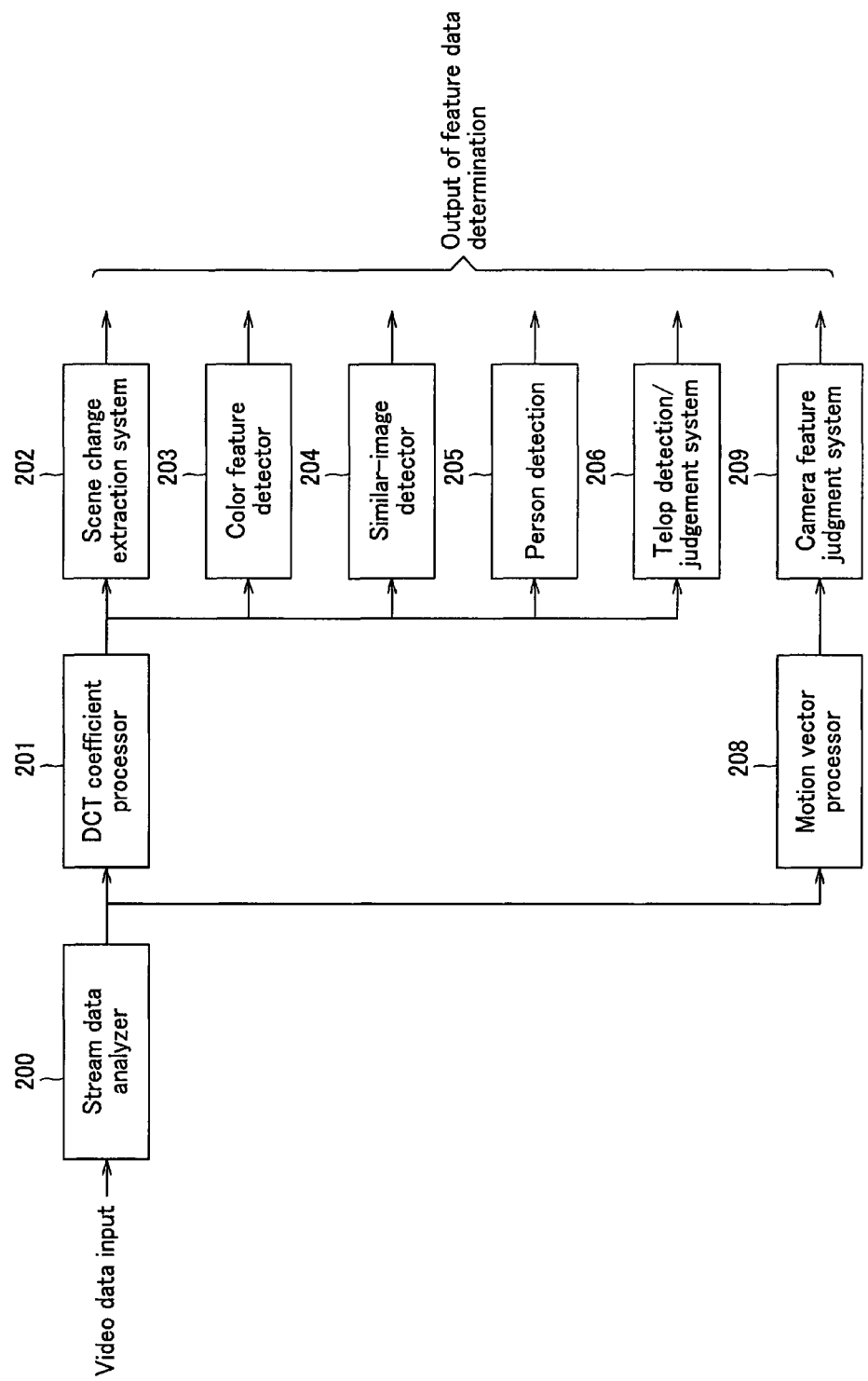
FIG. 23 is a block circuit diagram of an example of the structure of the image feature extraction system according to the present invention.

As shown in FIG. 23, in the image feature extraction system, the image data separated in the predetermined manner in the stream separator is supplied to a stream data analyzer 200 in which it will be subjected to predetermined analysis including a rate detection, detection of number of pixels and the like. Then, the output from the stream data analyzer 200 is supplied to a DCT coefficient processing system 201 in which it will be subjected to predetermined calculation processing (inverse DCT calculation processing) including detection of DC and AC coefficients of DCT, etc. Based on an output from the DCT coefficient processing system 201, operations are made in a scene change detector 202, color feature detector 203, similar-image detector 204, person detector 205 and telop detection/judgment system 206, respectively. The output from the stream data analyzer 200 is also supplied to a motion vector processor 208 in which it will be subjected to a predetermined motion vector detection.

3.2.1 Scene Change Feature

The scene change feature detector 202 divides a screen into predetermined sub areas, calculates mean values of Y (brightness data), Cb and Cr (color difference) of DC coefficient data of DCT in each sub area to determine inter-frame difference or inter-field difference for each sub area, and compares the difference with a predetermined threshold to detect a predetermined scene change.

In case no scene change is detected, the inter-frame (or inter-field) difference data of each sub area is smaller than the threshold. When a scene change is detected, there will be detected a larger difference data.

Figure 24:
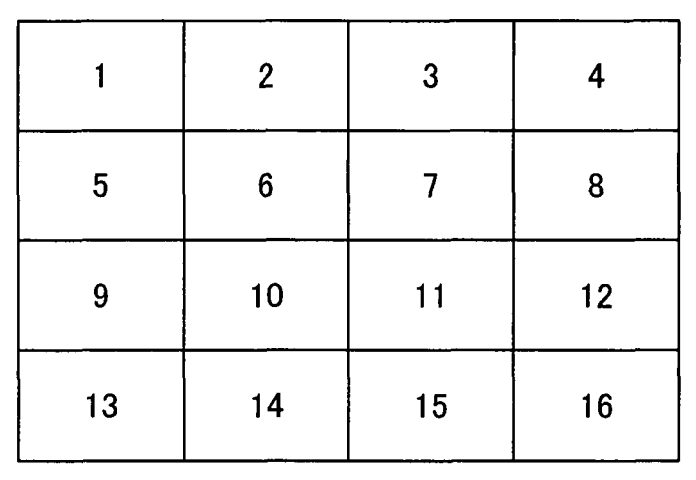

Note that in the above screen division, a valid screen is divided into 16 sub areas, for example, as shown in FIG. 24.

The screen division is not limited to that shown in FIG. 24. The number of sub areas may be increased or decreased. However, since it is considered that if the number of sub areas is too small, the precision of the scene change detection will possibly be low, while if the number of sub areas is large, the precision will possibly be too high, the number of sub areas is set as an appropriate value within a range of about 256 (16× 16).

3.2.2 Color Feature

The color feature detector 203 can detect a color feature based on the mean values of Y (brightness data), Cb and Cr (color difference) of DC coefficient data of DCT.

Figure 25:
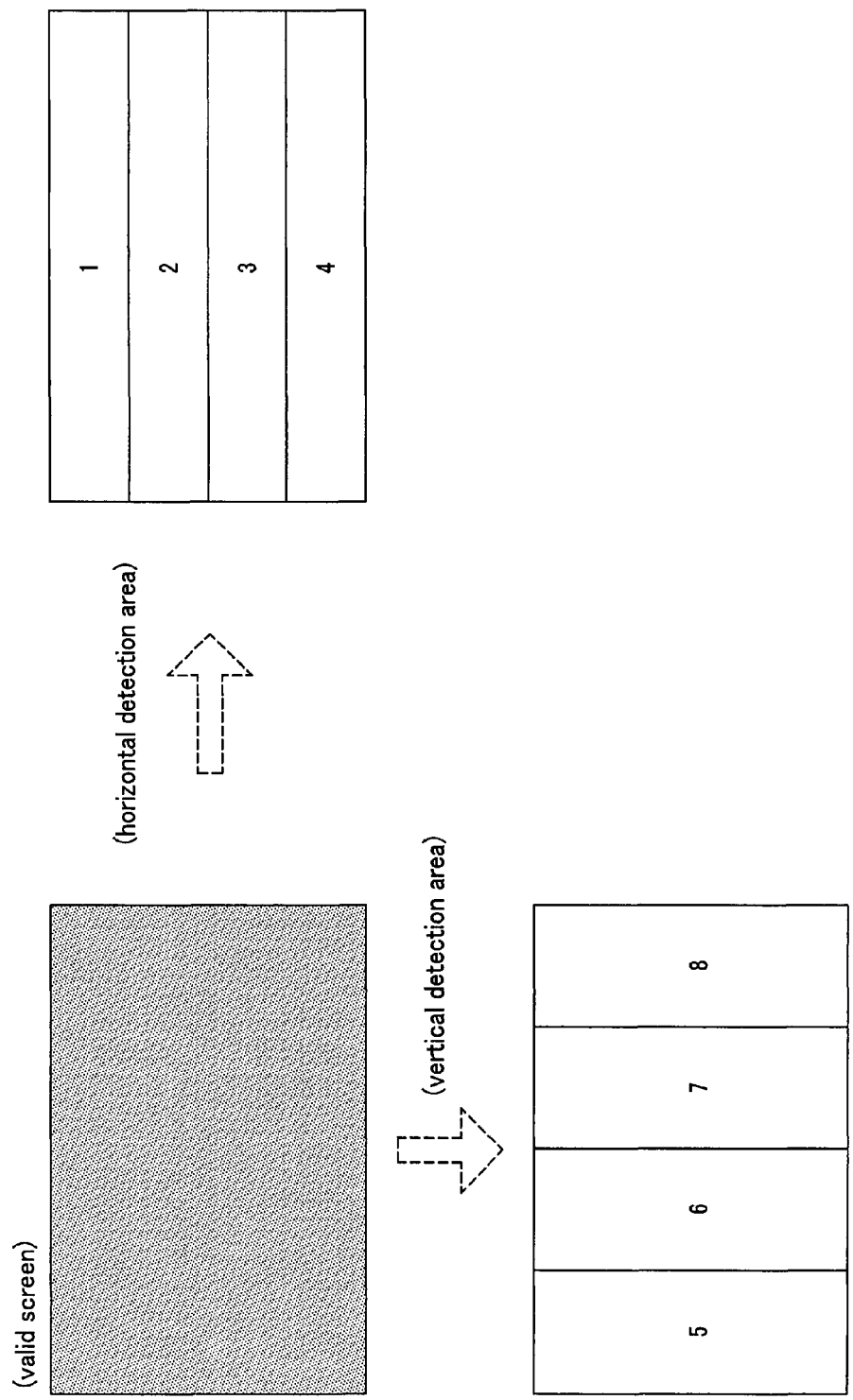
FIG. 25 shows an example of the telop and color feature detection areas in the recording/playback apparatus.

Predetermined areas may be, for example, ones shown in FIG. 25. In FIG. 25, the valid screen is divided by four horizontally into detection areas 1 to 4, and also by four vertically into detection areas 5 to 8. Each of the detection areas is assigned an area ID, and data on each detection area is identified with the area ID.

Note that only the horizontal detection areas 1 to 4 or vertically detection areas 5 to 8 are provided as the case may be.

Beside the screen division as shown in FIG. 25, the screen may be divided in a check form such as 5 by 5, 6 by 6 or the like.

For example, in the case of a broadcast program of a program genre "sumo-wrestling", if a color "brown" can be detected from the detection area 3 in FIG. 25, it is highly probable that the scene is of a "sumo ring".

A combination of this color feature with a voice attribute feature, for example, a combination of "sumo-ring scene" and "voice attribute or the other (or speaker's voice)", will provide a high probability of a "scene of a starting match". Namely, such a scene section may be set as a key frame section.

In this case, since the voice level of the starting-match scene will be raised due to the audience's cheer and data having a frequency in a band different from an ordinary band will be detected, the voice level and predetermined frequency band data may be regarded as feature data.

3.2.3 Similar-Scene (Similar-Image) Feature

In the similar-image detector 204, a predetermined ID (ID number or ID symbol) is assigned to each similar scene (similar image). Similar images (scenes) are assigned the same ID. This technique is disclosed in the Japanese Patent Laid Open No. 2002-344872, for example.

This ID assignment is such that an ID is recorded in a memory in a one-to-one correspondence to an image (scene) or positional information (frame number, PTS, recording time or the like) of the image (scene). When an image is displayed or playback is started at the image, various predetermined operations using the ID, such as sorting of similar images by displaying images having the same ID, skip playback of points in time of images having the same ID, etc. can be done because the positional information on the image (scene) is in one-to-one correspondence to each other and also the positional information themselves are of course in a one-to-one correspondence to each other.

The feature data may be a detected order of appearance, such as the highest, second highest or such frequency of appearance as having been explained above concerning the scene ID.

Also, the feature data may be a ratio between detected ID lengths, such as a ratio of an order of appearance such as the highest, second highest or such frequency of appearance with a PU section length, as shown in FIG. 7.

The feature detection is such that, for example, a screen is divided into a plurality of sub areas (25 sub areas, for example), a mean DC coefficient of DCT of areas corresponding to the screen sub areas is calculated, an image (scene) corresponding to a portion of which a predetermined vector distance (with the calculated mean DC coefficient being taken as a vector component) is smaller than a predetermined threshold is taken as a similar image (scene), and similar images (similar scenes) are assigned the same predetermined ID (scene ID).

For example, "1 (one)" is used as an initial value for ID. When no image (scene) whose predetermined vector distance is smaller than the predetermined threshold is detected, "1" is added to the largest value of ID and the result of addition is taken as a new ID which is assigned to that image (scene).

The feature data in the present invention may be used for calculation of the appearance frequency of ID in a predetermined section as having previously been explained with reference to FIG. 5 in order to detect the highest and second highest frequency of appearance, for example.

The above may be used for effective processing of data in, for example, a news program in which an announcer appears frequently, and a program belonging to a genre in which similar scenes appear frequently, such as sumo-wrestling, baseball base or the like. That is, when the appearance frequency of the announcer in a new program is highest or second highest, a scene in which the announcer appears frequently will highly be detectable.

Figure 26:
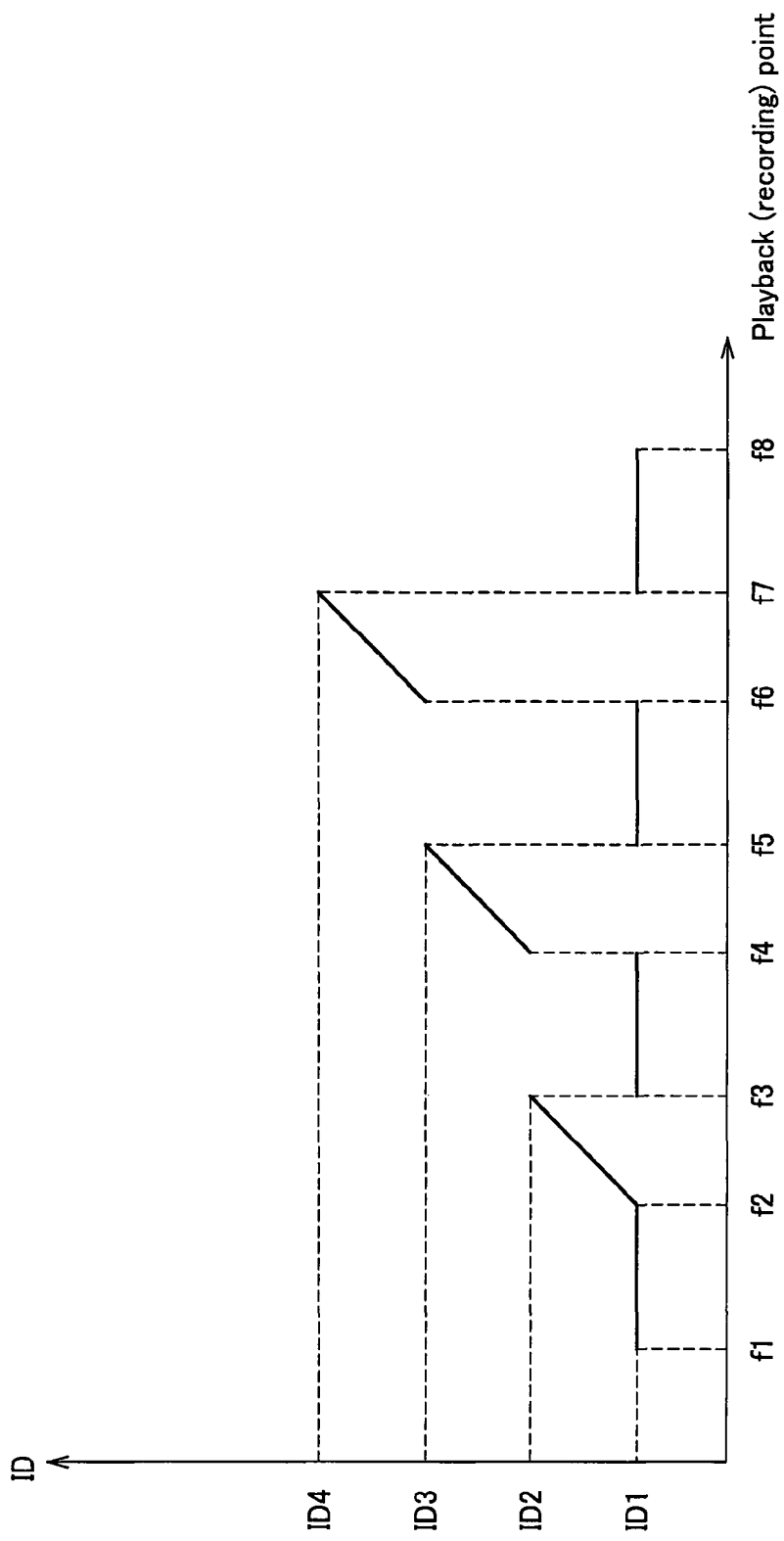
FIG. 26 shows an example of similar image feature in the recording/playback apparatus.

FIG. 26 outlines how to calculate the appearance frequency of an ID. The same ID, that is, ID1, is detected in four sections between f1 and f2, f3 and f4, f5 and f6, and between f7 and f8, for example. Namely, similar images appear in these sections.

As shown in FIG. 26, sections in which the same IDs successively appears are counted as one section, and it is calculated how many such sections are included in a scene.

When no more similar scenes are found, no same ID will be detected any more. So, a predetermined frequency of appearance may be calculated by calculating the continuity and discontinuity of an ID.

3.2.4 Person's Feature

In the person detector 205, a screen area is divided as shown in FIG. 27 to detect a specific color in each area in order to judge whether a person appears in the screen.

In the example shown in FIG. 27, the valid screen is divided by four into sub areas 1 to 4, and a fifth sub area 5 is provided around the center of the screen.

For example, in the case of a news program, it is considered that an announcer's face will appear in the sub area 5 with a high probability.

Also, in case a flip or telop and announcer appear in the screen, the announcer's face will appear in the sub area 1 or 2 in some cases. In such a case, it is considered that the flip or telop will appear in the area 2 or 1.

In case the flesh color of a white is taken as a specific color, it is already known from the experiments that the specific color can be detected with the use of the following conditional expression:

$$0.6 < Cb/Cr < 0.9 \text{ to } 0.97 \tag{35}$$

$$(0 < Cb < 255, 0 < Cr < 255) \tag{36}$$

As will be explained below, a specific color in the sub areas shown in FIG. 27 may be detected in another method.

It is assumed herein for the simplicity of explanation that the screen size is 720×480.

Process 1:

In the DC component of the DCT coefficients Cb and Cr included in the conditions for detecting a specific color (Cb, Cr) (conditions for detecting the flesh color of a white), there are included 16×16 macro blocks of which 720/16 (=45) pieces (0 to 44) are laid along the x-direction and 480/16 (=30) pieces (0 to 29) are laid along the y-direction. Data points are detected at each of the x-directional macro blocks 0 to 45 while macro blocks are detected at each of the y-directional macro blocks 0 to 29 under the judgment conditions as in the item 3.2.3:

$$0.6 < Cb/Cr < 0.9 \text{ to } 0.97 \tag{37}$$

where (0≤Cb≤255, 0≤Cr≤255). In some cases, the data points are compressed to a half in each of the x- and y-directions to have x-directional macro blocks 0 to 22 and y-directional macro blocks 0 to 14.

Note that the data points may be shifted 8 bits (128 times) and the judging conditions as given by the following expression (38) may be used:

$$77 < (Cb << 8/Cr < 115 \text{ to } 124 \tag{38}$$

Process 2:

Under the judging conditions given by the above expressions (37) and (38) defining the conditions (for detection profiles of a person, face or the like) for detecting a profile based on the AC coefficient of a brightness signal, data larger in value than the predetermined threshold Ath is detected in each of the x- and y-directions.

$$xh(x) > Ath \tag{39}$$

$$nH(y) > Th \tag{40}$$

In some cases, a covariance analysis is made of the detected data.

Figure 28:
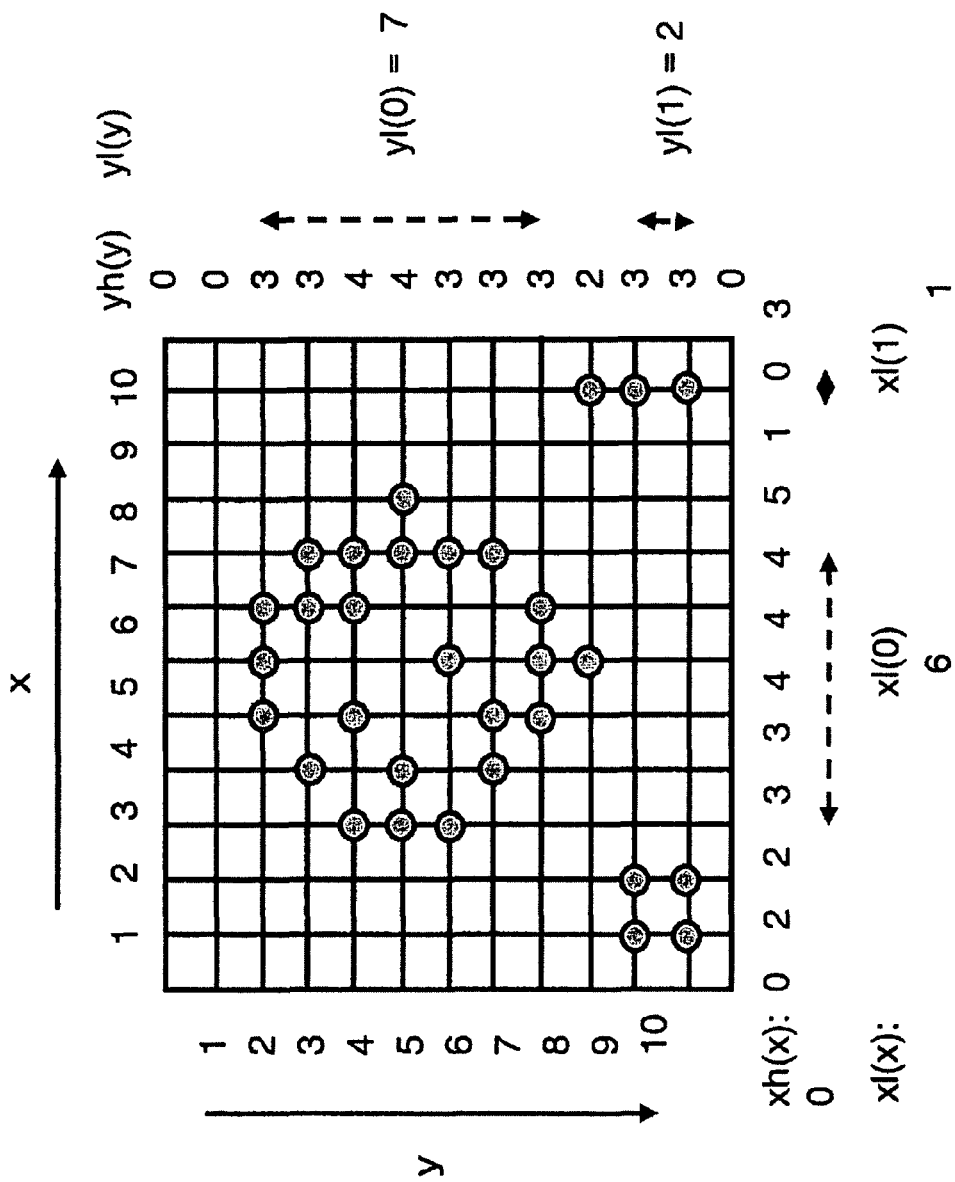
FIG. 28 shows an example of the person detection in the recording/playback apparatus.

At the detection points indicated with small black points, the following will be achieved as shown in FIG. 28, for example:

$$xh(0) = 0 \quad yh(0) = 0$$
$$xh(1) = 2 \quad yh(1) = 0$$
$$xh(2) = 2 \quad yh(2) = 3$$
$$\ldots \quad \ldots$$
$$\ldots \quad \ldots$$
$$\ldots \quad \ldots$$

Process 3:

At detected data points xh(x) and yh(y) as given by the following expressions and larger than the predetermined thresholds Hth:

$$xh(x) > Hth \tag{41}$$

$$yh(y) > Th \tag{42}$$

the continuous length of data larger than a predetermined threshold Lth as given by the following expressions (43) and (44) is detected in each of the x- and y-directions with consideration being given to the conditions for the validity in size of an object to be detected:

$$x1(n) > Lth \tag{43}$$

$$y1(m) > Th \tag{44}$$

In the case shown in FIG. 28, for example, the continuous length of a portion in which the detection points as given below on the assumption that Hth=2:

$$xh(x) > 2$$

$$yh(y) > 2$$

is detected to be:

$$x1(0) = 6$$

$$x1(1) = 1$$

$$y1(0) = 7$$

$$y1(1) = 2$$

On the assumption that Lth=3, the data $x1(0)$ and $y1(0)$ will be detected.

Process 4:

The conditions for detecting the validity of the shape of a person's face will be explained. For each of the detected data points $x1(n)$ and $y1(m)$, data having a difference or ratio within a range of 0 to Dth or of eth1 to eth2 between the data points is detected based on the following expression (45):

$$|x1(n) - y1(m)| < Dth \tag{45}$$

or $$eth1 < x1(n)/y1(m) < eth2 \tag{46}$$

In the example shown in FIG. 28, the data at the data points $x1(0)$ and $y1(0)$ are calculated.

On the assumption that a person's face is approximate to a square with consideration given to the general persons' faces, the aspect ration is calculated.

For example, on the assumption that the following expression (47):

$$0.8 < x1(n)/y1(m) < 1.5 \tag{47}$$

is detection condition, for example, the following will be achieved:

$$y1(0)/x1(0) = 1.2 \tag{48}$$

Thus, the object in the area of $x1(0)$ and $y1(0)$ in FIG. 28 can be determined with a high probability to be a person's face.

Note that a bit shift processing may be used for extraction of a person's feature as in the item 3.2.4.

In addition to the detecting conditions as in the processes (1) to (4), the following process (5) can be effected to detect the continuity of detected data.

Process 5:

Conditions for judgment of the temporal continuity of the detected shape are given as follows:

Continuity Judging Method 5.1:

In some cases, the temporal continuity (stability of detection) as in the aforementioned processes 1 to 4 is judged.

On the assumption that the value S(N) of a picture N, detected based on the expression (48) is as given below:

$$S(N) = y1(0)/x1(0) \tag{49}$$

S(N+1), S(N+2), . . . are detected to judge the temporal continuity of the detected face.

It is determined that the following three pictures, for example, have been detected to be continuous:

$$0.8 < S(N) < 1.5 \tag{50}$$

$$0.8 < S(N+1) < 1.5 \tag{51}$$

$$0.8 < S(N+2) < 1.5 \tag{52}$$

Each of the pictures to be detected may be I picture.

Continuity Judging Method 5.2:

Alternatively, any one or some of the detected values as in the processes 1 to 3 may be judged to see whether data detected from the picture N can continuously be detected as N+1, N+2 and N+3.

On the assumption that, for example, the value detected from the frame N is as follows:

$$Col(N)=(Cb<<8)/Cr \quad (53)$$

it is judged whether three pictures have continuously been detected as follows, and when the judgment is affirmative, the operation is shifted to a next step of detection:

$$77<Col(N)<115 \quad (54)$$

$$77<Col(N+1)<115 \quad (55)$$

$$77<Col(N+2)<115 \quad (56)$$

Also, the data on the detected N to (N+2) pictures may be averaged and the mean value be judged conditionally.

That is, on the assumption that the mean value of the three detected picture data is AvCol, the judgment may be done based on the following:

$$AvCol=(Col(N)+Col(N+1)+Col(N+2)/3 \quad (57)$$

$$77<avocet<115 \quad (58)$$

Continuity judging method 5.3:

With the data being calculated based on the expressions (39) and (40) to detect a data point xh(N(x), yh(N)(y) from the picture N, it can be judged whether the pictures such as N+1, N+2, . . . are continuous. It is judged whether the three I pictures have continuously been detected as follows, and when the judgment is affirmative, the operation shifts to a next step of detection.

$$xh(N)(x)>Ath \quad (59)$$

$$xh(N+1)(x)>Ath \quad (60)$$

$$xh(N+2)(x)>Ath \quad (61)$$

$$yh(N)(y)>Ath \quad (62)$$

$$yh(N+1)(y)>Ath \quad (63)$$

$$yh(N+2)(y)>Ath \quad (64)$$

Also, detected data in the pictures N to (N+2) may be averaged, and judgment be effected conditionally.

Namely, with the mean value of the three detected picture data being taken as Avxh and Avyh, the judgment may be done of whether the following are achieved:

$$Avxh=(xh(N)(x)+xh(N+1)(x)+xh(N+2)(x))/3 \quad (65)$$

$$Avyh=(yh(N)(y)+yh(N+1)(y)+yh(N+2)(y))/3 \quad (66)$$

$$Avxh>Ath \quad (67)$$

$$Avyh>Ath \quad (68)$$

Continuity Judging Method 5.4:

With the data being calculated based on the expressions (43) and (44) to detect a data point x1(N(x), y1(N)(y) from the picture N, it can be judged whether the pictures such as N+1, N+2, . . . are continuous. It is judged whether the three I pictures have continuously been detected as follows, and when the judgment is affirmative, the operation shifts to a next step of detection.

$$x1(N)(x)>Lth \quad (69)$$

$$x1(N+1)(x)>Lth \quad (70)$$

$$x1(N+2)(x)>Lth \quad (71)$$

$$y1(N)(y)>Lth \quad (72)$$

$$y1(N+1)(y)>Lth \quad (73)$$

$$y1(N+2)(y)>Lth \quad (74)$$

Also, detected data in the pictures N to (N+2) may be averaged, and judgment be effected conditionally.

Namely, with the mean value of the three detected picture data being taken as Avx1 and Avy1, the judgment may be done of whether the following are achieved:

$$Avx1=(x1(N)(x)+x1(N+1)(x)+x1(N+2)(x))/3 \quad (75)$$

$$Amy1=(E1(N)(y)+E1(N+1)(y)+E1(N+2)(y))/3 \quad (76)$$

$$Avx1>Lth \quad (77)$$

$$Avy1>Lth \quad (78)$$

Outline of Basic Method of Detecting the Number of Persons

It is judged as follows whether the number of persons has been detected.

Figure 29:
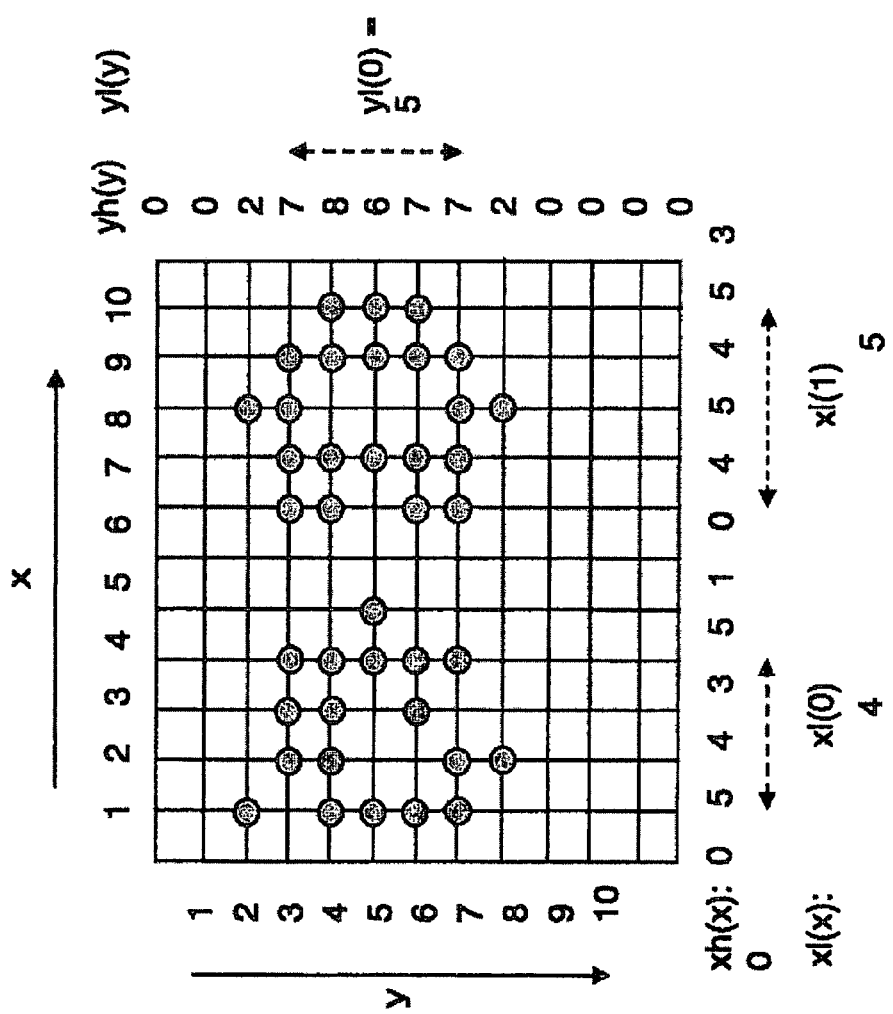
FIG. 29 shows an example of the person detection (determination of the number of persons) in the recording/playback apparatus.

No.-of-Persons Judging Method 1B:

As in FIG. 29, it is assumed that, for example, two x-directional data x1(0) and x1(1) larger in value than a threshold have been detected while one y-directional data y1(0) larger in value than the threshold has been detected.

There will be explained data densities in an area 1 identified with x1(0) and y1(0) and area 2 identified with x1(1) and y1(0).

The number of all data points S1 in the area 1 is given as follows:

$$S1=x1(0) \times y1(0)=20 \quad (79)$$

The number of data larger in value than the threshold is as given below:

$$\Sigma xh(x)=17 \quad (80)$$

The data density $\Delta 1$, that is, number of data per unit data point is given as follows:

$$\Delta 1=0.85 \quad (81)$$

In case data all larger in value than the threshold have been detected in the area 1, the date density will be $\Delta 1=1$. Therefore, a predetermined threshold Mth is set to judge the following:

$$\Delta 1>Mth \quad (82)$$

Similarly, the number of all data points S2 in the area 2 is given as follows:

$$S2=x1(0) \times y1(0)=25 \quad (83)$$

The number of data larger in value than the threshold is as given below:

$$\Sigma xh(x)=21 \quad (84)$$

The data density $\Delta 2$ is given as follows:

$$\Delta 2=0.84 \quad (85)$$

On the assumption that the Mth is:

$$Mth=0.80 \quad (86)$$

The areas 1 and 2 meet the requirements as proved by the expressions (81) and (85), which leads to determination that it is highly probable that the person has been detected.

The number of all data points laid along the x-direction in an area St identified with x1(0)+x1(1) and y1(0) is given as follows:

$$(x1(0)+x1(1)) \times y1(0) \quad (87)$$

The number of detected data is given as follows:

$$\Sigma xh(x) = 17 + 21 = 38 \quad (88)$$

The data density Δ is given as follows:

$$\Delta = 8.4 \quad (89)$$

Since the data density in an area St is given as follows:

$$\Delta > Mth \quad (90)$$

it is determined that a person is detected in the same y-directional positions in the areas 1 and 2.

Figure 30:
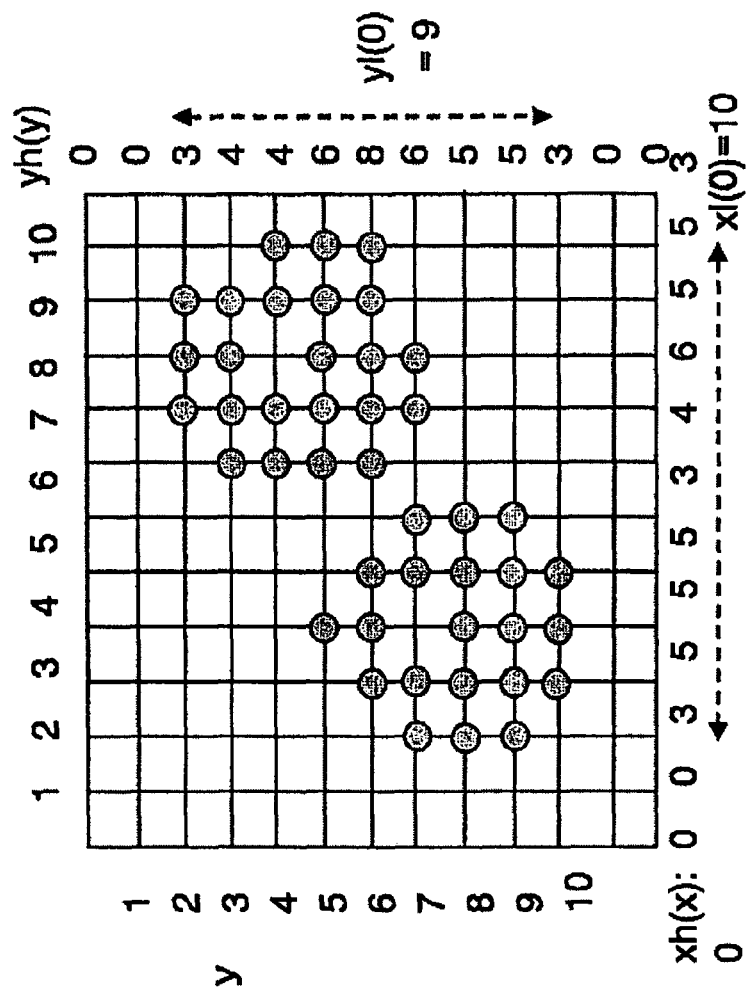
FIG. 30 shows an example of the detection of the number of persons in the recording/playback apparatus.

Other example of detection 1 (in case areas overlap each other):

In the example shown in FIG. 30, one data x1(0) is detected in the x-direction and one data y1(0) is detected in the y-direction.

The number of all data points Sr in an area R identified with x1(0) and y1(0) is given as follows:

$$Sr = x1(0) \times h1(0) = 90 \quad (91)$$

The number of detected data is given as follows:

$$\Sigma xh(x) = 44 \quad (92)$$

The data density Δr is given as follows:

$$\Delta r = 0.49 \quad (93)$$

Since Δ<Mth, it cannot be determined that one person is detected in the area R.

The reciprocal of the data density is given as follows:

$$1/\Delta r = 2.0$$

Figure 31:
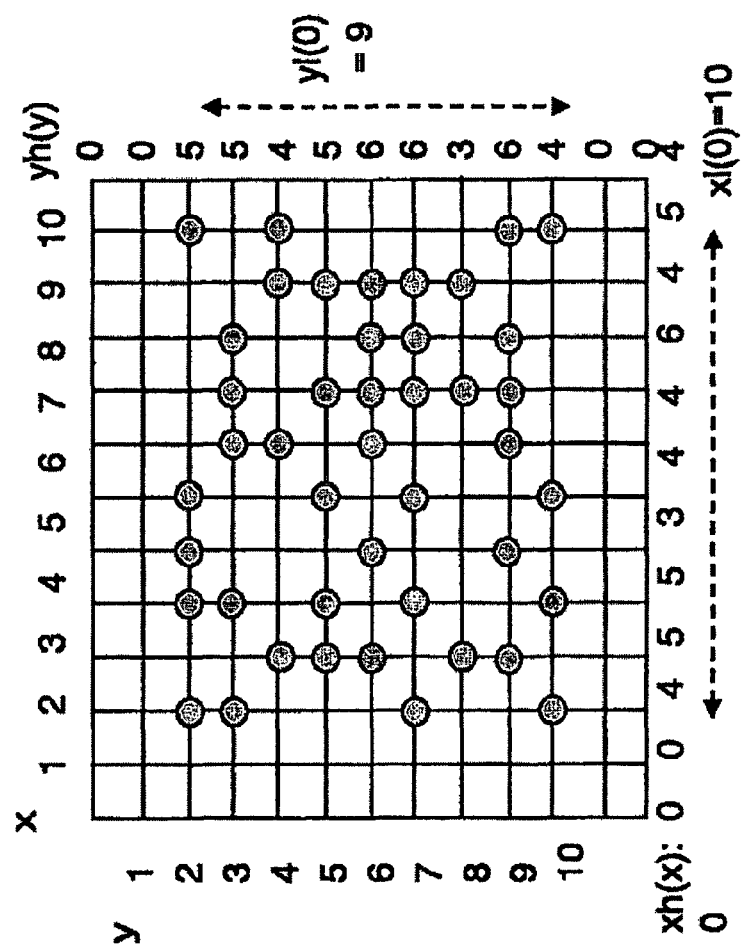
FIG. 31 shows another example of the detection of the number of persons in the recording/playback apparatus.

So, it is possible that two objects exist. However, it should be noted that the data density is also the same even when data exist sparsely as shown in FIG. 31.

The variance σ in the y-direction will be explained below with reference to FIG. 30.

On the assumption that the mean value of yh(y) is yhav and number of data is m, the following will be achieved:

$$m = y1(0) \quad (94)$$

$$\sigma y = (\Sigma(yh(y) - yhav)^2)/m = 2.32 \quad (95)$$

In the y-direction, with the mean value being xhav and number n of data being as follows:

$$n = x1(0) \quad (96)$$

the following will be achieved:

$$\sigma x = (\Sigma(xh(x) - xhav)^2)/n = 1.04 \quad (97)$$

Figure 37:
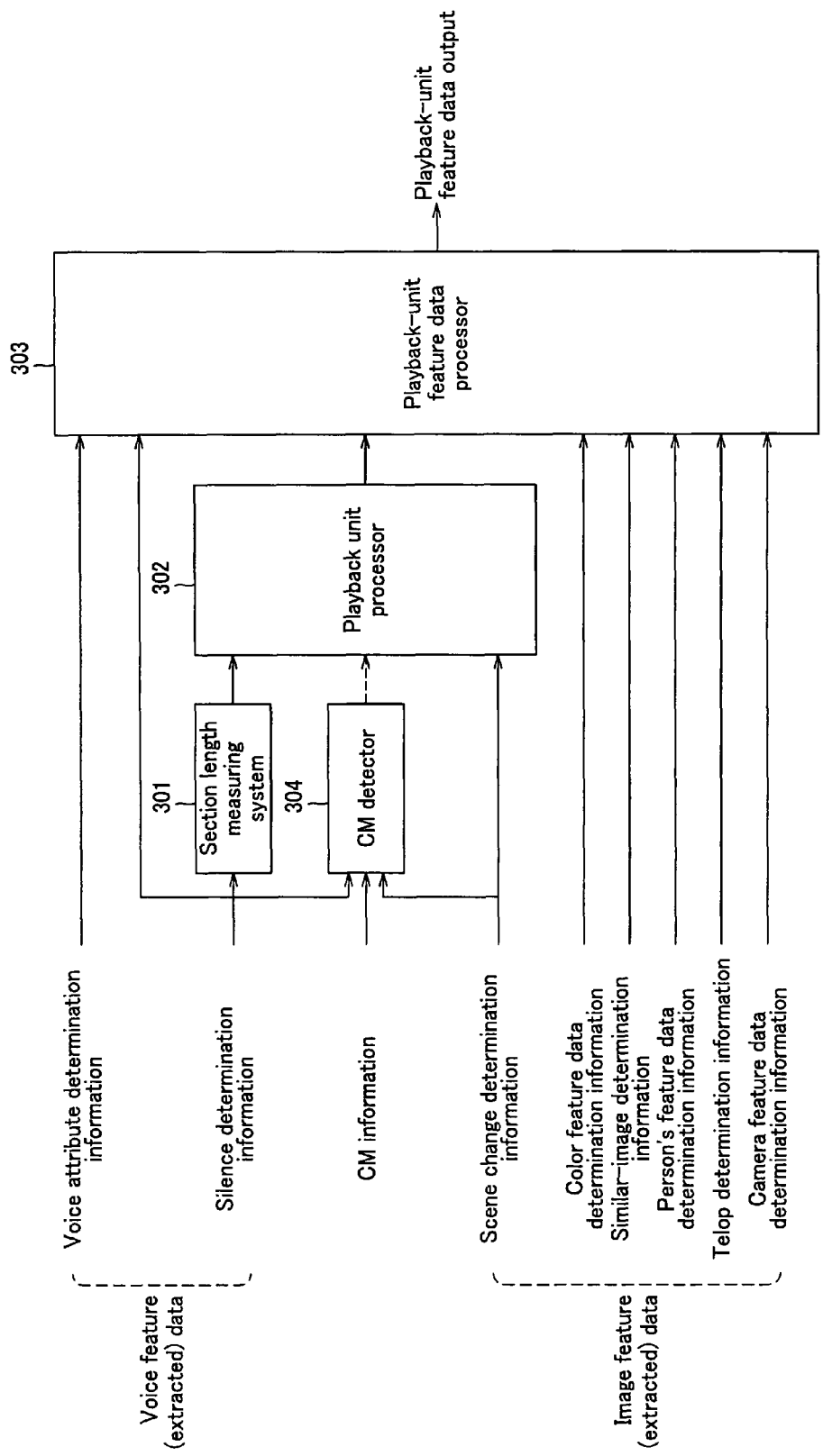
FIG. 37 is a block diagram of an example of the structure of the playback unit processor in the recording/playback apparatus.

Similarly, the x- and y-directional variances in FIG. 37 are given as follows:

$$\sigma y = 0.99 \quad (98)$$

$$\sigma x = 0.64 \quad (99)$$

Figure 36:
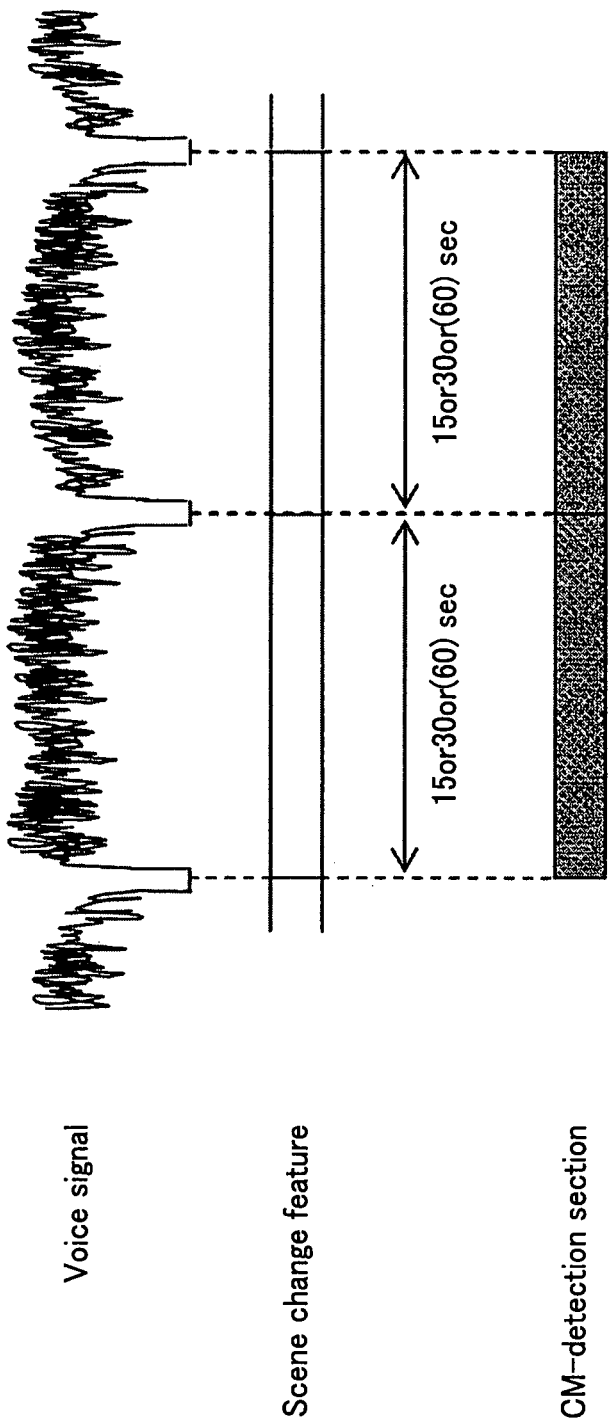
FIG. 36 shows an example of the CM (commercial) detection in the recording/playback apparatus.

From the above results, it will be known that the variance of data in FIG. 36 is larger.

On this account, a predetermined threshold Bth for the variance and thresholds d1 and d2 corresponding to numbers of detected data are set for judgment of the following conditions to detect the number of data.

$$\sigma y > Bth \quad (100)$$

$$\sigma x > Bth \quad (101)$$

$$d1 < 1/\Delta < d2 \quad (102)$$

In the example shown in FIG. 36, for example, the judgment may be effected with the thresholds being set as follows:

$$Bth = 2.0 \quad (103)$$

$$d1 = 1.8 \quad (104)$$

$$d2 = 2.3 \quad (105)$$

Figure 32:
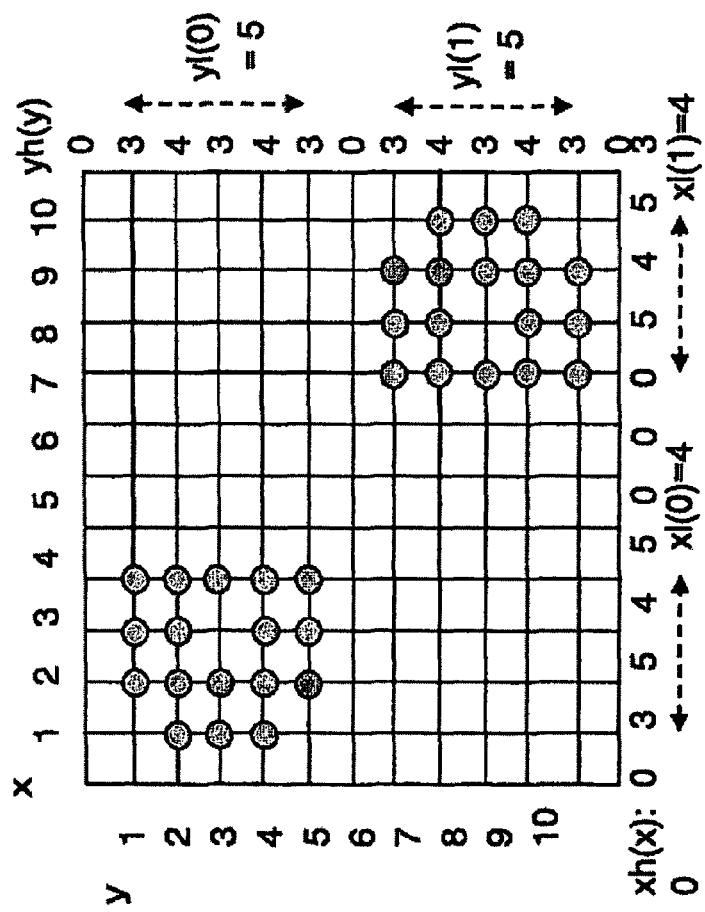
FIG. 32 shows still another example of the detection of the number of persons in the recording/playback apparatus.

Other example of detection 2 (in case areas are diagonally separate from each other):

In the example shown in FIG. 32, two data x1(0) and x1(1) are detected in the x-direction and two data y1(0) and y1(1) are detected in the y-directions.

The number of all data points S00 in an area R00 identified with x1(0) and y1(0) is given as follows:

$$S00 = x1(0) \times h1(0) = 20 \quad (106)$$

The number of detected data is given as follows:

$$\Sigma xh(x) = 17 \quad (107)$$

The data density Δr is given as follows:

$$\Delta 00 = 0.85 \quad (108)$$

Since Mth is 0.80 as in the item 3.2.5, $$\Delta 00 > Mth \quad (109)$$

and it is determined that one person is detected in the area R00 with a high probability.

Next, the number of all data points Sa in an area Ra identified with x1(0) and (y1(0)+y1(1)) is given as follows:

$$Sa = x1(0) \times (y1(0) + y1(1)) = 40 \quad (110)$$

The number of all detected data is given based on the expression (107) as follows:

$$\Sigma xh(x) = 17 \quad (111)$$

The data density Δa is given as follows:

$$\Delta a = 17/40 = 0.43 \quad (112)$$

However, the data density does not meet the threshold.

That is, since x1(0) and (y1(0)+y1(1)) are now in consideration, if it is assumed that Δa is larger than a predetermined threshold, it is determined that two persons are detected with a high probability.

However, as seen from the expression (112), Δa is smaller than the predetermined threshold, so that it is not possible to determine that two persons are detectable in the area identified with x1(0) and (y1(0)+y1(1)). As seen from the expression (109), it is possible to determine that one person is detectable.

That is, it is determined that a person is detectable with a low probability in the area identified with x1(0) and y1(1).

Similarly, the number of all data in an area Rb identified with x1(1) and (y1(0)+y1(1)) is given as follow:

$$\Sigma xh(x) = 17 \quad (113)$$

The number of all data points Sb is given as follows:

$$Sb = x1(1)(y1(0) + y1(1)) = 40 \quad (114)$$

The data density Δb is given as follows:

$$\Delta b = 17/40 = 0.43 \quad (115)$$

As the expression (115) shows, two persons are detectable in the area R6 with a low probability.

The data density Δ10 in the area identified x1(1) and y1(0) is given as follows:

$$\Delta 10 = 17/20 = 0.85 \quad (116)$$

because the number of detected data is given by Σxh(x)=17 and number of all data points is given by x1(1)×y1(0)=20. Similarly, the data density Δ11 in the area identified with x1(1) and y1(1) is given as follows:

$$\Delta 11 = 0.85 \quad (117)$$

As the expressions (115) to (117) show, the probability that a person is detectable any of the areas 10 and 11 is low.

Next, the data density in an area Rc identified with (x1(0)+x1(1)) and y1(0) will be discussed. Since the number of detected data is given by Σvh(y)=17 and the number of all data points is given by (x1(0)+x1(1))×y1(0)=40, the data density Δc is given as follows:

$$\Delta c = 17/40 = 0.43 \quad (118)$$

Since the data density is smaller than the above predetermined threshold Mth, two persons are detectable with a low probability in the area Rc. As the expressions (109) and (115) to (117) show, persons will consequently be detected in the area identified with x1(0) and y1(0) and area identified with x1(1) and y1(1).

The number of persons can be detected with the aforementioned operations.

Other Method for Detection of Person (Method 2):

Beside the above methods, the x-directional macro blocks 0 to 44 and y-directional macro blocks 0 to 29 are sequentially judged to see whether they meet the predetermined threshold for detection of a person.

A series of data series taken as d(x)(y) is sequentially judged to find ones which meet the conditions given by the aforementioned expressions (37), (41) and (42). If data meeting the following conditions, for example, are continuously detected in the x- and y-directions, both the size and position of a detected object will be known simultaneously:

$$d(x1)(y1), d(x2)(y1)$$

$$d(x1)(y2), d(x2)(y2)$$

In the above method, all data is detected one by one for judging the continuity of the series of data. So, this method (2) needs a longer time for calculation time than the aforementioned method (1).

For effecting this method, data is compressed to a half of the data size, for example, in the x- and y-directions to reduce the number of operations for data processing.

Other Method for Detection of Person (Method 3)

As in the method 2 above, a person is approximated to a square, a person can be detected through judgment of whether data in the square area being varied in size sequentially meets the given conditions.

Figure 33:
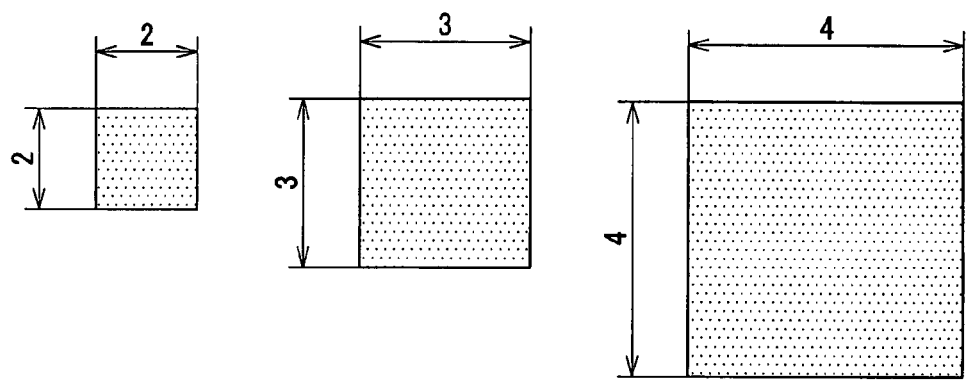
FIG. 33 shows yet another example of the detection of the number of persons in the recording/playback apparatus.

For example, square areas of 2×2, 3×3 and 4×4 in size are set as shown in FIG. 33.

Each of the square areas different in size from each other is shifted data by data and it is judged whether the data in the area meets the given conditions. This is made first with the smallest square area, then similarly with a second smallest square area and finally with the largest square area.

When the above data shift and judgment are over with all the square areas, the detected areas and number of detected areas will be known. This operation will take a similar time to that taken by the aforementioned method 2.

3.2.5 Telop Feature

The telop feature detection/judgment system 206 detects a mean value of AC coefficients of DCT in the screen area as shown in FIG. 25.

In a screen in a predetermined area, the profile of a telop including information such as characters having a predetermined size is relatively clear. When a telop image appears in any area shown in FIG. 25, it is possible to detect an AC coefficient larger in value than the predetermined threshold, whereby it is possible to detect the telop.

In addition to the above detection of AC coefficient of DCT, edge detection may be made in the baseband domain (signal of a time domain) to detect an edge on the basis of an interframe difference in brightness of an image, for example.

Also, wavelet transformation is made to analyze the multi-resolution, and data in a predetermined multi-resolution area including predetermined high-frequency data is used to calculate a mean value of an area as shown in FIG. 25 for similar signal processing to that for the AC coefficient of DCT.

The telop is character information appearing in a hypochromic area like a flip as well as below an image in a news program, for example. The area where a telop appears depends upon the genre of a broadcast program but a telop possibly appears frequently in a lower portion, upper portion, right-side portion or left-side portion of a screen.

The flip feature and flop feature may be included together in a character-feature category.

3.2.6 Camera Feature

The camera feature judgment system 209 can judge features concerning the operations of a camera such as zooming, panning and other, for example, with the use of a motion vector of a P picture defined in MPEG as disclosed in the Japanese Patent Laid Open No. 2003-298981.

Beside this technique, a technique concerning the camera features is disclosed in the Japanese Patent Laid Open No. 2002-535894, for example.

4. Operations with Playback Unit (or Play Unit)

The summary (digest) playback is such that various feature data such as voice feature data image feature data obtained through the predetermined signal processing are used to select some important (key) frame sections in as predetermined section and the sections are sequentially skip-played back.

In case skip playback is effected, it is possible that a skip will not cause any discomfort in viewing the screen but will cause some users to feel unpleasant in hearing the voice if the voice is discontinuous. On this account, a section in which the sound level is lower than a predetermined level (volume) is set as a silent section and a predetermined point in time in that section is taken as a point in time to skip.

Also, since a scene change is regarded as a point in time at which a topic in a broadcast program, movie or the like being played back is broken, a scene change point or a point near the scene change point may be taken as a candidate skip point.

That is, the skip playback point in time and skip playback section may be considered in correspondence to a predetermined silent section of a predetermined voice signal and scene change point in time of predetermined image signal or a point near the scene change point.

From the above point of view, a skip playback point in time (skip playback section) is processed herein with a predetermined playback unit (PU) being set for the convenience of explanation.

Predetermined image and voice feature data in a playback unit (PU) thus set are subjected to a predetermined processing to set a predetermined summary (digest) playback section correspondingly to the voice feature data and summary playback time and the predetermined summary playback is effected by making skip playback in a predetermined summary playback mode.

Also, it is possible to make the above-mentioned summary playback as well as to set a chapter (or edition point or playback break point) at a first point in time (or a point near the first point) or last point in time (or a point near the last point) of PU set through predetermined signal processing.

That is, by setting a chapter as above, it is possible to display a thumbnail display through a predetermined signal processing of the chapter point and for the user to make an edition in viewing the thumbnail display.

Next, there will be explained an example of the playback unit (PU) processing with reference to FIGS. 34 and 35.

Figure 34A:
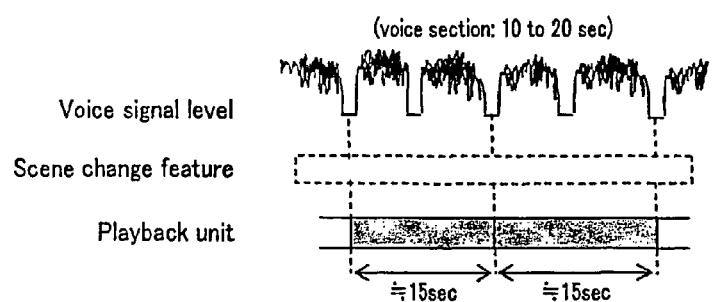
FIGS. 34A to 34E show examples of the playback unit processing in the recording/playback apparatus.

In the Case of a Sounding Section (Voice Signal Higher in Level than Predetermined):

In a process 1 shown in FIG. 34A, in case a voice section has a level higher than a predetermined one and lasts in a range of 10 to 20 sec, not any scene change point but a break point whose voice segment lasts for 15 sec (predetermined silence-detection point) is taken as a break point of the playback unit.

Figure 34B:
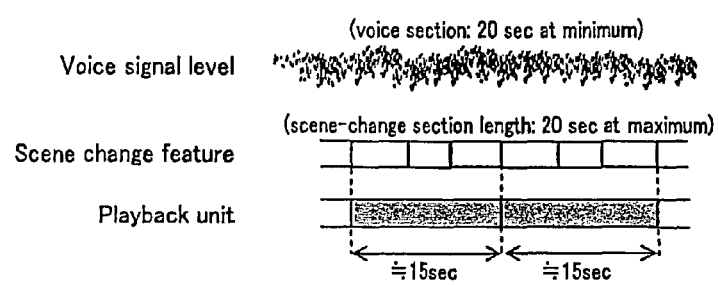

In a process 2 in FIG. 34B, in case a voice section lasts for more than 20 sec while a scene change section lasts for less than 20 sec, a scene change point detection point where the break point of the scene change lasts for a time most approximate to 15 sec is taken as a break point of the playback unit.

Figure 34C:
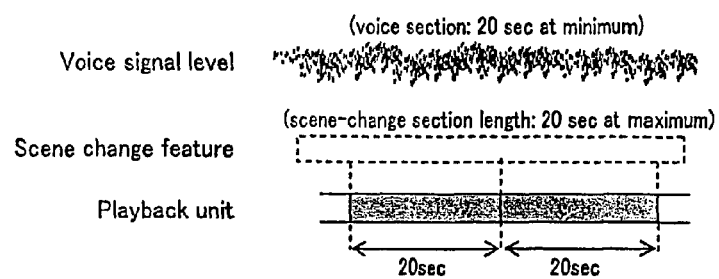

In a process 3 shown in FIG. 34C, in case a voice lasts for more than 20 sec while a scene change section lasts for more than 20 sec, not any voice segment and scene change point but a point in time when the playback unit has last for 20 sec is taken as a break point of the playback unit.

Figure 34D:
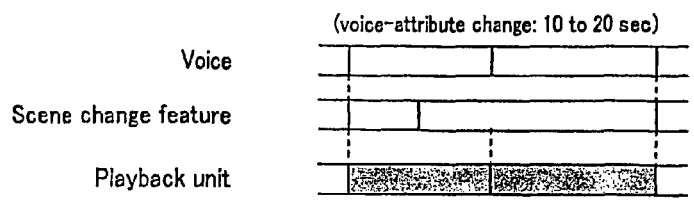

In a process 4 shown in FIG. 34D, in case the attribute of a voice feature changes within a range of 10 to 20 sec, the point in time when the attribute has changed is taken as a break point of the playback unit.

Figure 34E:
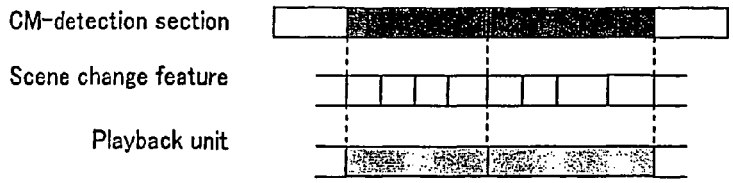

In a process 5 shown in FIG. 34E, in case CM (commercial) has been detected, the point in time when the CM has been detected is taken as a break point of the playback unit.

Here will be explained the method for CM detection with reference to FIG. 35.

Generally, the section length of CM in a broadcast program is a predetermined one (generally, 15, 30 or 60 sec), and a scene is changed at a break point of the CM (at start and end point in time). So, by detecting the predetermined length of time and scene change, it is possible to detect the CM as shown in FIG. 36.

Figure 35A:
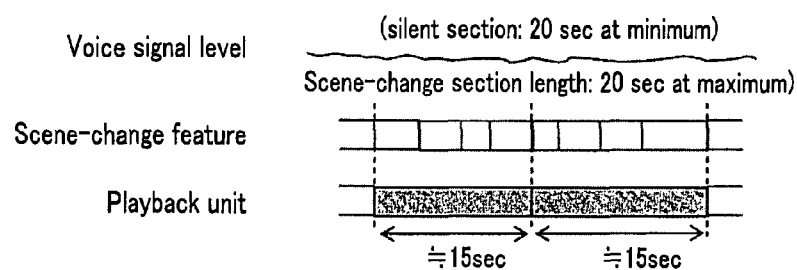
FIGS. 35A and 35B show other examples of the playback unit processing in the recording/playback apparatus.

In the case of a silent section (voice signal lower in level than predetermined):

In a process 6 shown in FIG. 35A, in case a silent section (whose mean voice level is lower than predetermined) is shorter than 20 sec and scene change detection section is shorter in length than 20 sec, a scene change point most approximate to 16 sec is taken as a break point of the playback unit.

Figure 35B:
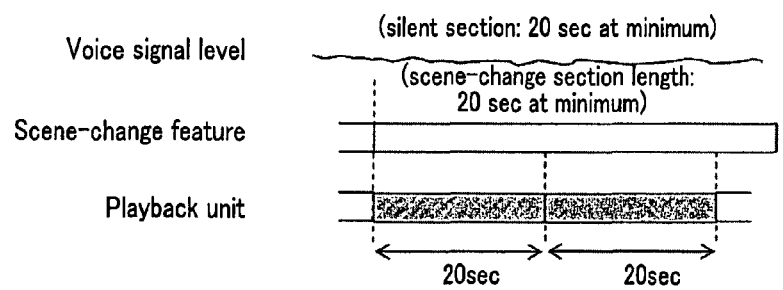

In a process 7 shown in FIG. 35B, in case a silent section lasts for more than 20 sec and scene change detection section lasts for more than 20 sec, not any scene change detection point but a point of 20 sec from a start point of the playback unit is taken as a break point of the playback unit.

In the above explanation of any playback unit processing, the initial value of the start point of the playback unit is a start point when the program (broadcast program) has been recorded.

With the above playback unit processing, it is possible to play back a predetermined playback unit corresponding to a predetermined voice and image features (scene change features).

Example of Block Construction of the Playback Unit Generator

FIG. 37 is a block diagram of examples of the playback unit processor having previously been explained and unitized feature data processor in which the feature data are supplied to the playback unit and which will be explained in detail later.

Since the predetermined points in time such as the summary playback point and chapter point are set at the start and end points of a playback unit, the setting is done with feature data being put in correspondence to each playback unit as having been explained above.

That is, predetermined feature data, voice feature data and image feature data extracted from each predetermined section are processed based on the playback unit section.

The example of block construction of the unitized feature data processor shown in FIG. 37 will be explained below.

In the example of block construction shown in FIG. 37, silence judgment data is supplied to a time measurement system 301 in which a predetermined interval (length of time) based on the aforementioned playback unit processing is measured. The result of processing is supplied from the system 301 to a playback unit processor 302.

The playback unit processor 302 is also supplied with scene change judgment data and CM detection/judgment data to make the signal processing having been explained concerning the method for playback unit processing in order to generate a predetermined playback unit.

A CM detector 304 is supplied with silence feature detection data and scene change feature data as well as channel information used for judging whether a program channel currently selected is a channel on which a CM is being broadcast, and the CM is detected by the predetermined signal processing method having been explained above with reference to FIG. 36.

A playback unit feature data processor 303 is supplied with voice feature data such as voice attribute information, silence information, etc. and feature data such as scene change feature, color feature, similar-image feature, person's feature, telop feature, etc. to fill each feature data into a playback unit as will be explained later.

5. PU Feature Data Processing

Next, the PU feature data file processing will be explained.

The PU feature data file contains voice and image feature data.

The feature data is resulted from filling of the extracted voice and image feature data into the playback unit. For each of the playback units, various feature data (data file) are recorded into a predetermined recording medium.

For recording the feature data into each playback unit, each feature data detected for each predetermined section is recorded into a predetermined recording medium and then feature data corresponding to a predetermined section of the playback unit is processed.

Feature data indicative of voice and image characteristics can be obtained by extracting predetermined feature data (characteristic signal) from voice signal (voice data) and image signal (image data) and processing the extracted signals (data) in a predetermined manner. However, it should be noted here that also the signal (data) indicative of a feature obtained by making predetermined processing of characteristic data (characteristic signal) will be described as feature data (feature signal) except in case a special caution is to be given.

In the case of image (video) signals, brightness signal (Y signal) of an I picture, DC coefficient of DCT of color signal (color difference signal) (Cb and Cr signals), motion vector data in B or P picture and AC coefficient of DCT are extracted as characteristic data from a MPEG stream. Scene change feature (scn), camera operation feature (cam), similar-image feature (sid), color feature (col), person's feature (person), etc. are extracted from the on-screen position information, predetermined threshold and correlated values, etc.

In the case of voice signals, a mean level of the voice signals is calculated at intervals of about 20 ms for processing the characteristic data, and voice features (seg features) such as attribute (class), mean power (mean level), etc. of the voice signal in a predetermined section are extracted from the calculation data and predetermined threshold.

It is considered herein that the voice attributes are speaker's voice, music (musical sound), cheer in a sports program, etc.

5.1 Feature Data File Structure

FIG. 38 shows a first example of the structure of a feature data file in which the aforementioned voice feature data and image feature data such as scene change feature (scn), camera feature (cam), similar-scene feature (sid), telop feature (tlp), color feature (col), person's feature (person), etc. form separate feature data files, respectively.

Each feature data file is written as text-form data or binary-form data.

Note that it is possible that these feature data is provisionally stored as file data to be recorded into a predetermined recording medium or as normal data in a predetermined recording medium (such as a semiconductor memory) and read later for use to generate summary list data and predetermined setting point in time (chapter point), which will be explained later. This is also true for data files shown in FIGS. 39 and 40.

Figure 39:
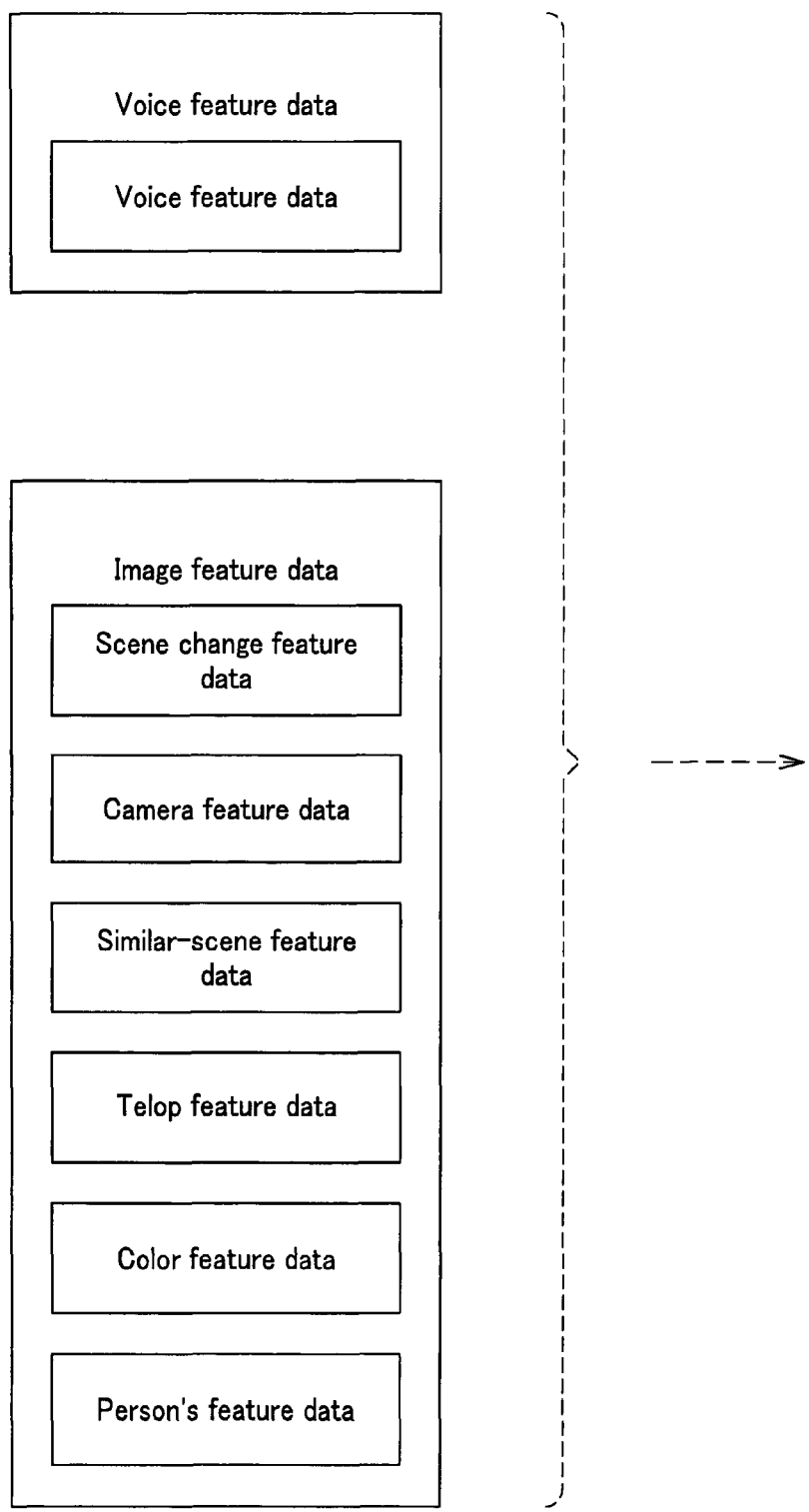
FIG. 39 shows an example of the structure of the feature data file in the recording/playback apparatus.

FIG. 39 shows a second example of the structure of the feature data file in which all the aforementioned voice feature data are arranged as one text- or binary-form file and all the aforementioned image feature data are arranged as one text- or binary-form file.

Figure 40:
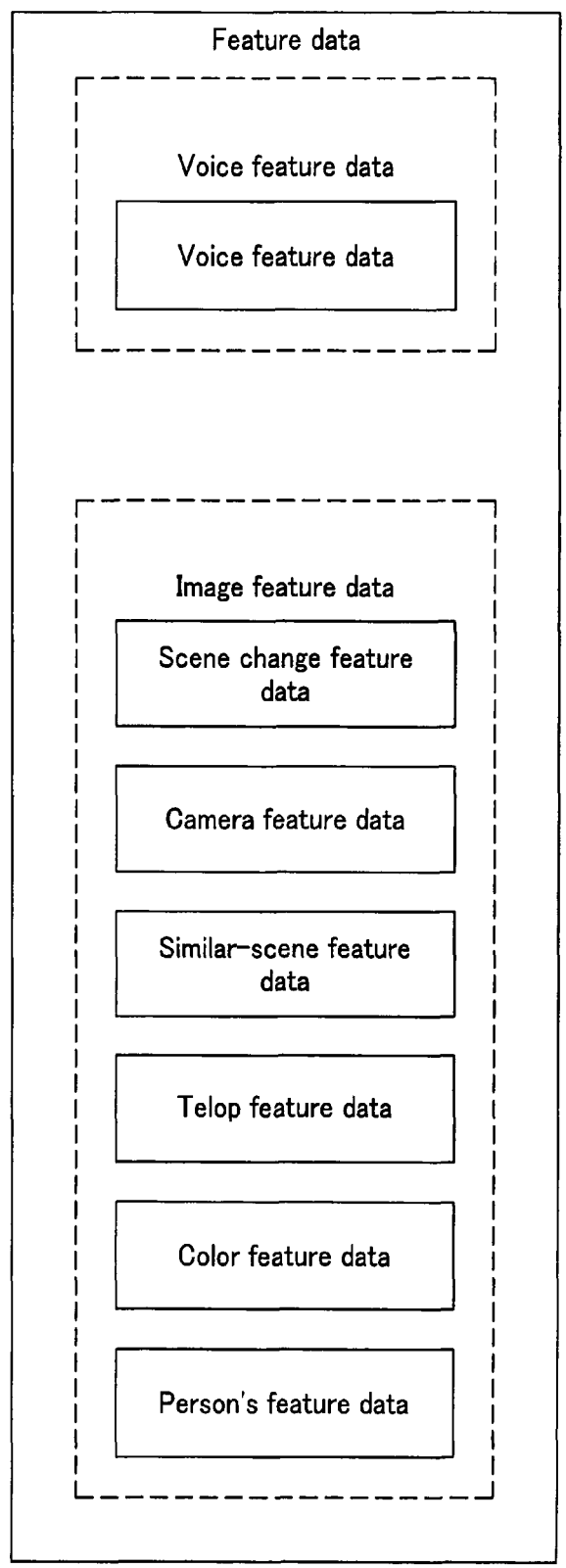
FIG. 40 explains the structure example of the feature data file in the recording/playback apparatus.

FIG. 40 shows a third example of the structure of the feature data file in which all the aforementioned voice feature data and all the aforementioned image feature data are arranged as one text- or binary-form file.

By arranging the plurality of feature data in one file as in the second and third examples, the data can be handled more easily than the first example as shown in FIG. 38. Further, the binary-form file is smaller in data size (file size or file capacity) and more efficient.

Here will be explained writing of feature data in the binary-form feature data file as in the third example shown in FIG. 40.

The third example shown in FIG. 40 is a version, of the second example shown in FIG. 39, in which all the voice feature data described in the binary form and all the image feature data described in the binary form are added together.

Thus, the method of processing (describing) the voice feature data in the feature data file as in the following explanation is applicable to the voice feature data shown in FIG. 39, and the method of processing (describing) the image feature data is applicable to the image feature data in the second example shown in FIG. 39.

5.2 Hierarchical Structure of Feature Data

Figure 41:
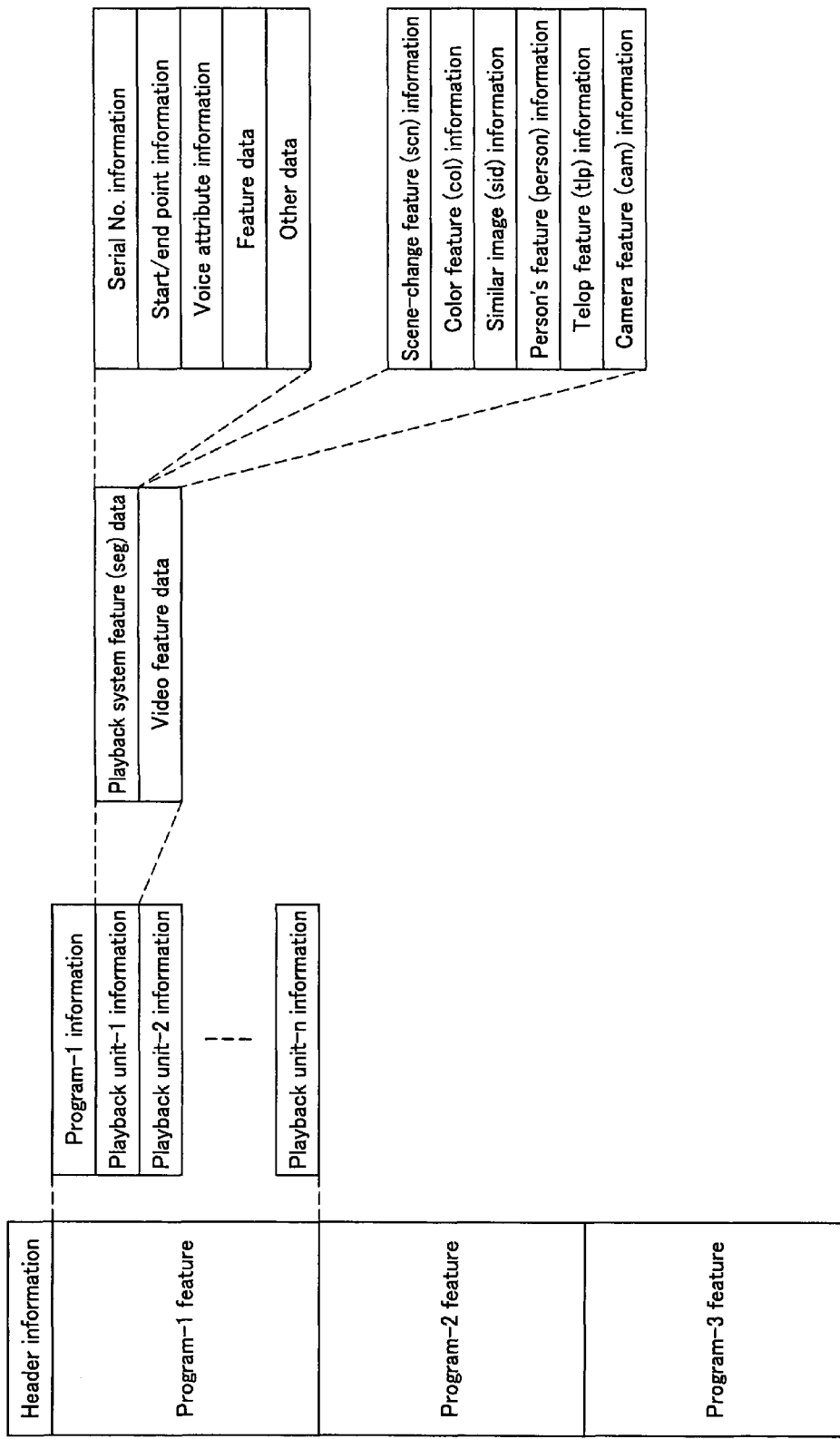
FIG. 41 shows an example of the hierarchical structure of the playback unit data in the recording/playback apparatus.

FIG. 41 shows an example of the hierarchical structure of the feature data in units of a playback unit.

Feature data is processed in a predetermined manner and in units of a predetermined playback unit as will be explained below.

The feature data include feature data header information, program-1 feature data, program-2 feature data, etc. as shown in FIG. 41.

Figure 42:
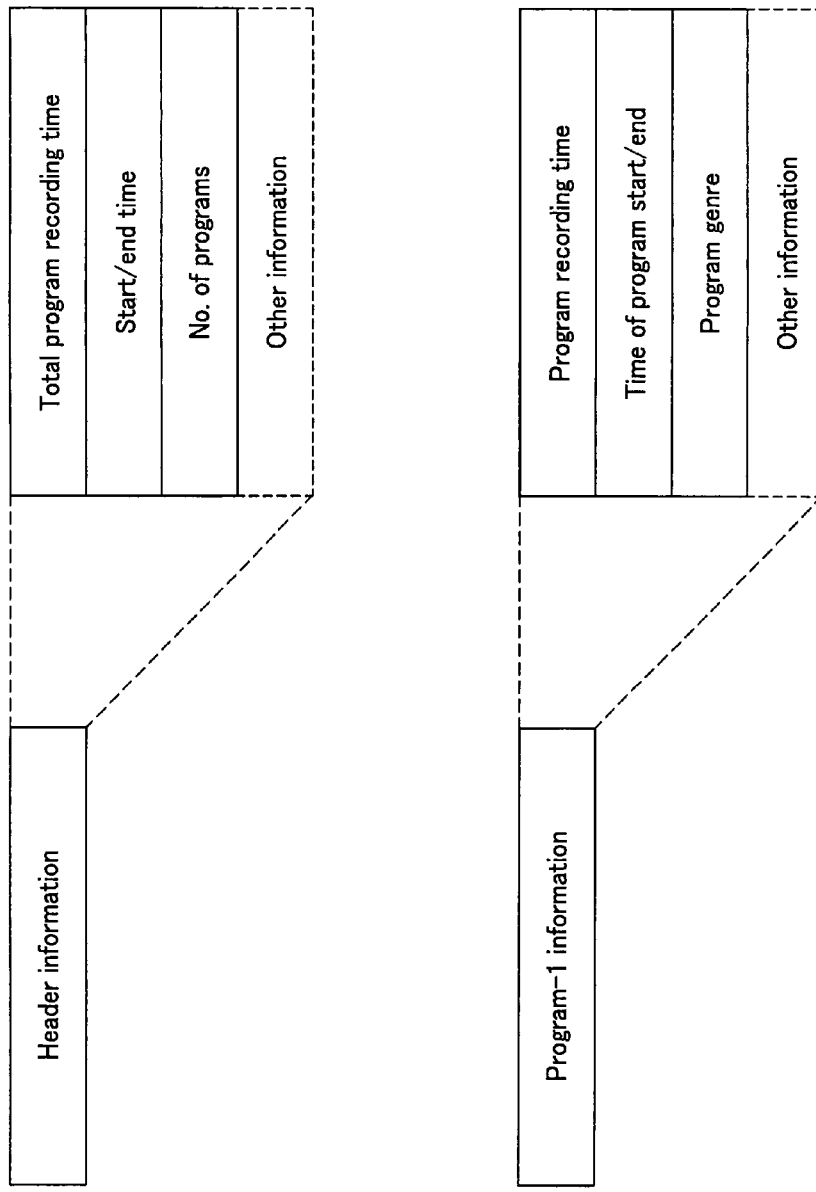
FIG. 42 shows another example of the hierarchical structure of the playback unit data in the recording/playback apparatus.

The feature data header information includes predetermined data such as a total recording time, recording start and end points in time, number of programs (broadcast programs) and other information of programs such as program 1, program 2, etc. as shown in FIG. 42.

Next, feature data in a program (broadcast program) will be explained below taking the program-1 feature data as an example.

As shown in FIG. 41, the program-1 feature data includes program-1 information, playback unit-1 information, playback unit-2 information, etc.

As shown in FIG. 42, the program-1 feature data includes predetermined data such as a program recording time, program start and end points in time, program genre (broadcast program genre), etc.

Next, the data structure of the playback unit will be explained taking the playback unit-1 information as an example. The playback unit-1 information includes voice feature data and image feature data as shown in FIG. 41.

Voice Feature Data Structure

The voice feature data includes serial number information, start/end point information, voice attribute information, feature data and other data as shown in FIG. 41.

Image Feature Data Structure

The image feature data includes predetermined feature data such as scene change feature, color feature, similar-image feature, person's feature, telop feature, camera feature, etc. as shown in FIG. 41.

In the following, the scene change feature, color feature, similar-image feature, person's feature, telop feature, camera feature, etc. will be explained. For each of all predetermined sections, each of these feature data is recorded into a predetermined recording medium. In addition, only when feature data larger in value than the predetermined threshold is detected, for example, it is subjected to a predetermined processing for recording into the predetermined recording medium.

In case the predetermined processing is made of only the detected feature data larger in value than the predetermined threshold, no predetermined feature data smaller in value than the predetermined threshold will be written into the recording medium. So, in case feature data larger in value than the threshold is detected and recorded in the predetermined manner, it is possible to know the order in which feature data have been detected, counted from the first detected feature data, from the serial number information which will be explained below.

Figure 43:
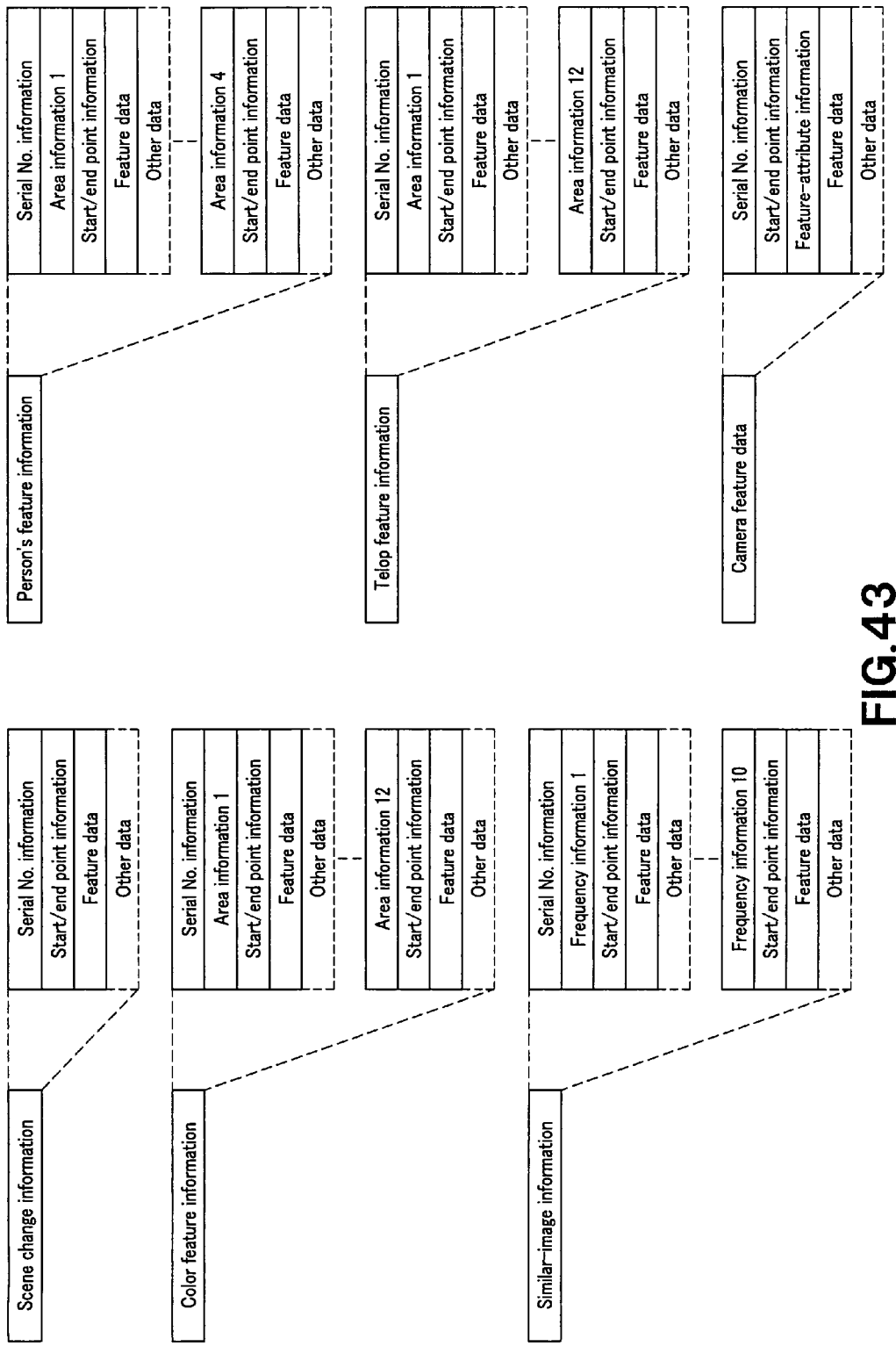
FIG. 43 shows an example of the structure of the playback unit image feature data in the recording/playback apparatus.

Scene Change Feature:

The scene change features include serial number information, start/end positional point information, feature data and other data as shown in FIG. 43.

The serial number information indicates the order counted from the beginning of a broadcast program, such as 0, 1, 2, 3, . . . , in which scene changes have occurred.

The start/end point information indicates a point where a scene change being in the above order starts or ends. It may be a frame (field) number, PTS, DTS, time or the like.

Color Feature:

As shown in FIG. 43, the color features include serial number information, data for identification of a detected area, start/end point information, feature data and other data.

The serial number information indicates the order counted from the beginning of a broadcast program, such as 0, 1, 2, 3, . . . , in which color features have been detected.

The start/end point information indicates a start/end point where a feature of each area has been detected in the detection of each feature in the above order. It may be a frame (field) number, PTS, DTS, time, etc.

The feature data include, for example, RGB, Y, Cb, Cr and the like.

Similar-Image Feature:

As shown in FIG. 43, the similar-image features include serial number information, appearance-frequency information start/end point information, feature data and other information.

The serial number information indicates the order counted from the beginning of a broadcast program, such as 0, 1, 2, 3, . . . , in which similar-image features have been detected.

The feature data include, for example, a mean DC coefficient of DCT in each of a predetermined number of subsections (25 pieces, for example) of the aforementioned valid screen.

Person's Feature:

As shown in FIG. 43, the person's features include serial number information, data for identification of a detected area, start/end point information, feature data and other data.

The serial number information indicates the order counted from the beginning of a broadcast program, such as 0, 1, 2, 3, . . . , in which similar-image features have been detected.

Telop Feature:

As shown in FIG. 43, the telop features include serial number information, data for identification of a detected area, start/end point information, feature data and other data.

The serial number information indicates the order counted from the beginning of a broadcast program, such as 0, 1, 2, 3, . . . , in which telop features have been detected.

Camera Feature:

As shown in FIG. 43, the camera features include serial number information, data for identification of a detected area, start/end point information, feature data and other data.

The serial number information indicates the order counted from the beginning of a broadcast program, such as 0, 1, 2, 3, . . . , in which camera features have been detected.

For recording a broadcast program, the feature extraction and feature data recording, which will be explained herebelow, can be made simultaneously with the predetermined operation to record the broadcast program. Also, features may be extracted from an already recorded broadcast program, other movie, drama or any other image/voice software in a predetermined manner to generate a feature data file.

In case PU and feature data are used as above to record the program 1, they may similarly be used to record the other programs 2 and 3.

6. Play List Processing (Summary Playback List Generation)

Next, there will be explained the summary data processing for summary (digest) playback from a PU file (PU feature data file) generated with the aforementioned feature extraction operation.

6.1 Summary Rule Processing

In the summary (digest) playback operation using the feature data referred to herein, a desired summary (digest) playback is effected by making skip playback of a predetermined playback section in units of the aforementioned PU.

6.2 Predetermined Time Point Setting (Play List File Processing)

Next, the play list file will be explained.

The play list file has described therein in a predetermined data as to which one is to be selected for playback of PUs or lump of PUs signified correspondingly to the aforementioned feature data.

Note that the data may provisionally be recorded in a predetermined recording medium having already recorded therein image/voice data from which the features have been detected or in a predetermined memory means.

Examples of the play list file are shown in FIGS. 44A and 44B.

In an example 1 in FIG. 44A, the vertical series of data (a) includes information on the start point of a playback section. The data includes predetermined information such as a frame number, time instant, PTS (presentation time stamp) from a stream (compressed image/voice data) or DTS (decode time stamp).

In an example 1 in FIG. 44A, the vertical series of data (b) includes information on the end point of a playback section. The data series (b) includes predetermined information such as a frame number, time instant, PTS (presentation time stamp) from a stream (compressed image/voice data) or DTS (decode time stamp) correspondingly to the data series (a) in the example 1.

In the example 1 in FIG. 44A, the vertical series of data (c) indicates an importance of PU (playback or play unit) or playback unit group (PU group).

In the example 1, in FIG. 44A, the vertical series of data (d) indicates character data having a meaning defined or set under the summary rule.

In an example 2 in FIG. 44B, there are provided identification data "0" and "1" for indicating a predetermined point in time of a playback section, chapter, etc. by describing meaning character and evaluation value (importance) of all PU sections.

In the example 2 in FIG. 44B, start and end points shown in columns (a) and (b) are continuous to data in a next line of the column (a) or (b) as will be explained below.

For example, in the example 2 in FIG. 44B, the first start and end points are 0 and 229, respectively, and the end point 229 is continuous to a next start point 230.

In the example 2 in FIG. 44B, the vertical series of data (e) indicates flag data as to whether summary playback is to be done or not. The number "1" indicates that the summary playback is to be done, and "0" indicates that no summary playback is to be done.

Also, the first point in time "1" and first point in time "0" may be regarded as predetermined points in time (chapter points).

7. Flow of Operations

Figure 45:
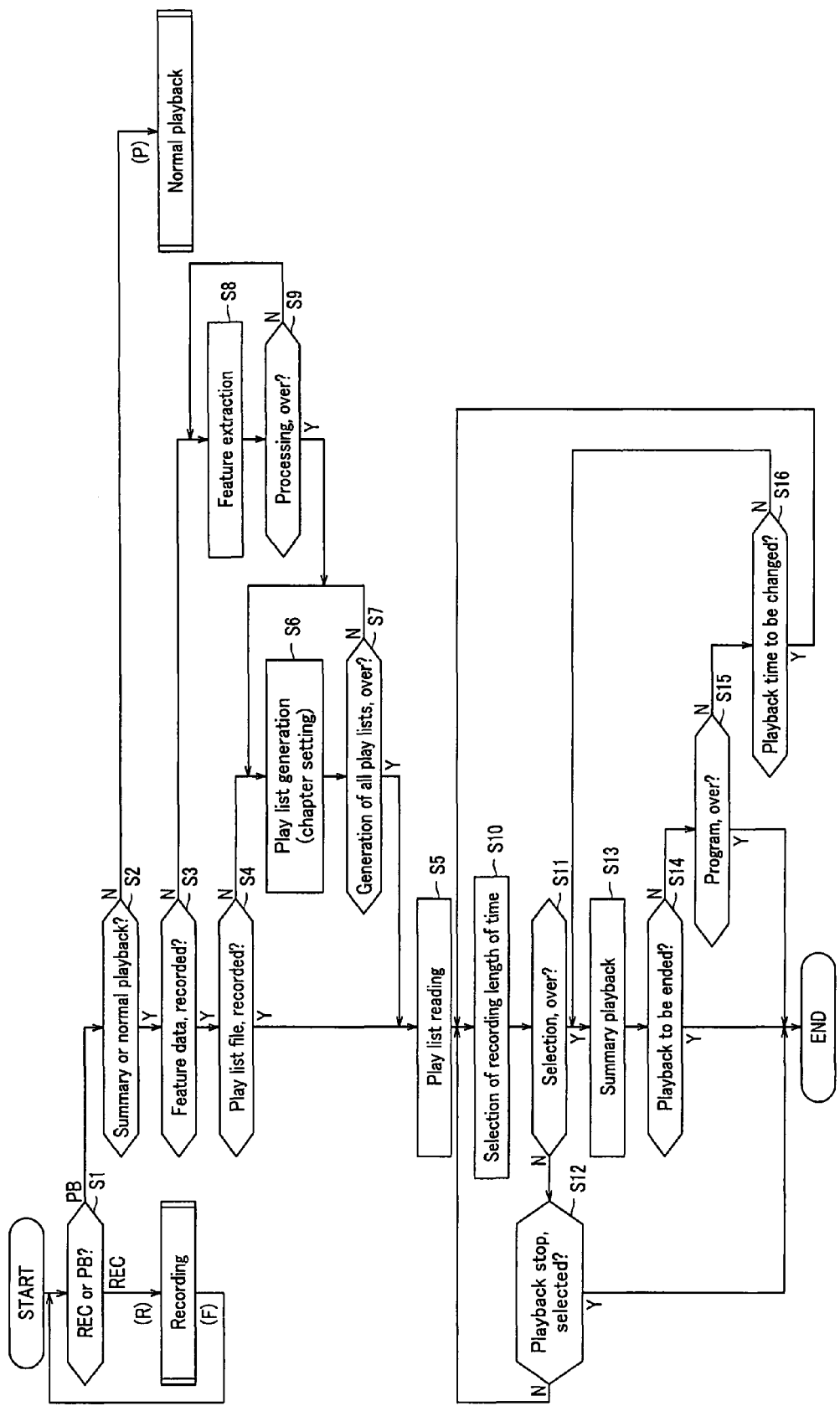
FIG. 45 shows an example of the flow of operations made in the recording/playback apparatus.

FIG. 45 shows an example of the flow of operations made in the recorder/player (will be referred to simply as "apparatus" hereunder) as an embodiment of the present invention.

First after the apparatus is put into operation, it is judged in step S1 whether the operation is in the recorder or playback mode. When the operation is determined to be the recording mode, the apparatus changes to the recording operation (R). If the operation is determined to be the playback mode, the apparatus goes to step S2.

7.1 Flow of Playback Operations

Example of Flow of Playback Operations:

In the playback mode of operation, it is judged in step S2 whether the playback operation is in the summary (digest) playback mode or in the normal playback mode. In case the playback operation is in the normal playback mode, the apparatus shifts to the normal playback operation (P).

If the playback operation is in the summary playback mode, it is judged in step S3 whether the predetermined feature data has been recorded in the predetermined recording medium or whether the predetermined feature data has been recorded as the predetermined file data in the predetermined recording area of the recording medium.

In case it is determined in step S3 that the predetermined feature data has been recorded in the predetermined recording medium, the apparatus goes to step S4 in which it will be judged whether the predetermined play list data (data file) has been recorded in the predetermined recording area of the recording medium. In case it is determined in step S4 that the predetermined play list data (play list file) has been recorded in the predetermined recording area of the recording medium, the apparatus goes to step S5 in which the predetermined play list data will be read.

If it is determined in step S3 that the predetermined data has not been recorded in the predetermined recording medium, the apparatus goes to step S8 in which the apparatus will read intended image/voice data (broadcast program) and makes predetermined feature extraction from the image/voice data. In step S9, it is judged whether the predetermined feature extraction is complete. If it is determined that the predetermined feature extraction is not over, the apparatus goes back to step S8 in which it will repeat the due operations until the predetermined feature extraction is complete.

In case it is determined in step S9 that the predetermined feature extraction is over, the apparatus goes to step S6 in which it will generate the predetermined play list data.

If it is determined in step S4 that the predetermined play list data (file) has not been detected, the apparatus goes to step S6 in which the apparatus will read the predetermined feature data recorded in the predetermined recording area of the predetermined recording medium, generate the predetermined list data (file) and write the generated data one after another or processed data into a predetermined area of the predetermined recording medium. Then, the apparatus goes to step S7 in which it will be judged whether all the play list generating operations are complete. If it is determined that all the play list generating operations are not over, the apparatus goes back to step S6 in which it will repeat the due operations. In case it is determined in step S7 that all the predetermined play list data have been generated, the apparatus will read the play list data having been written in step S5.

Note that in step S6, the sequentially generated play list data may be recorded one after another into a predetermined recording area of the recording medium in which the image/voice data such as the broadcast program has been recorded or information may be written into a recording medium other than that having the image/voice data recorded therein, such as a predetermined removable memory.

Also in this case, the predetermined play list data may be generated one after another and may be written, or all the play list data may be generated and processed before recorded.

Also, as explained below with reference to FIGS. 46 and 47, a plurality of play list data may be generated correspondingly to the recording time for the user to be able to select a plurality of summary-playback lengths of time.

Since a predetermined evaluation value is set for each of the predetermined PU sections or each predetermined section formed from a plurality of PU sections as above, the summary playback time can be manipulated correspondingly to the evaluation value.

In step S10, the apparatus shifts to the playback time selection mode. In step S11, it is judged whether the user has selected a playback time directly or the user has selected the summary playback mode and then a playback time within a predetermined time tmod from completion of the play list data detection. In case it is determined that no playback time has been selected, it is judged in step S12 whether the user has selected the playback stop.

If it is determined in step S12 that the user has selected the playback stop, the apparatus exits the playback operation. If it is determined that the user has not selected the playback stop, the apparatus goes back to step S10 in which it will repeat the due operations.

In case it is determined in step S11 that the user has directly selected a playback time or that the user has not selected any playback time within the predetermined time tmod, the apparatus goes to step S13 in which it will shift to the summary playback operation.

Note that in case the user has selected a playback time, the summary playback is started at the selected summary playback time. The summary playback will be started at a predetermined default set playback time (intended set playback time) tpb0 set when no playback time has been selected and the predetermined time tmod has elapsed.

Note that the user may freely select a summary playback time or a summery playback time may be selected from playback lengths of time preset on the basis of the recorded program recording time and play list data.

In case the playback lengths of time are, for example, 5, 10, 15, 20, 30 min or the like, the default supply playback time may be set correspondingly to a recording time, for example, as shown in FIG. 46.

In the example shown in FIG. 46, the summary playback mode can be set only when the summary playback time is longer than a predetermined recording time (Trecmin). In case the recording time Trec as the predetermined recording time Trecmin is less than 10 min, no summary playback mode is set but only the normal playback mode is set because the recording time is too short.

In case the recording time Trec is 60 min, for example, the user-selectable summary playback lengths of time will be 10, 15, 30 and 40 min and the default set time be 30 min as shown in FIG. 46.

As shown in the example shown in FIG. 46, the longer the recording time Trec, the larger the number of user-selectable summary playback lengths of time is. However, in case the recording time is short, the more the number of all sections to be skipped in the summary playback using the skip playback, the more the information be missing so that the content played back will not possibly be understandable. So, the number of selections is reduced for selection of an appropriate summary playback time. In case the recording time is longer than the summary playback time, the amount of information is large. In this case, the number of selections is increased for the user to be able to make an effective operation.

Information such as a list of such user-selectable summary playback lengths of time, default playback time, etc. may be displayed on a predetermined display accessory to the embodiment of the present invention, predetermined display connected to the apparatus or predetermined display screen such as a liquid crystal display on a remote controller accessory to the apparatus.

Note that the chapter setting may be done simultaneously with the play list generation. In this case, the predetermined chapter setting is made automatically correspondingly to the number of chapters, settable correspondingly to a recording time, as shown in FIG. 47.

For example, in case the recording time is one hour, a predetermined signal processing will be done for setting 5 to 40 chapters as shown in FIG. 47.

In step S13, the summary playback is made. Since an evaluation value is set for a predetermined PU section or for each section formed from a plurality of PU sections, skip playback is done based on a set time and evaluation value, to thereby make summary playback.

That is, the PU sections are selected one after another starting with a PU section whose evaluation value is largest, and PU sections whose evaluation value is smaller than the largest one are sequentially selected until the summary playback time is approximate to a selected one.

In step S14, it is judged whether the playback operation is to be ended. In case it is determined that the operation is to be ended, the apparatus exits the playback operation. If it is determined that the operation is not to be ended, the apparatus goes to step S15 in which it will be judged that whether the playback of the predetermined broadcast program is over. In case the playback is complete, the apparatus exits the playback operation. If the playback is not complete, the apparatus goes to step S16 in which it will be judged whether the playback time is to be changed.

In case it is determined in step S116 that the playback time is to be changed, the apparatus goes back to step S10 in which it will repeat the due operations. If it is determined that the playback time is not to be changed, the apparatus goes back to step S113 in which will repeat the due operations for the summary playback.

7.2 Flow of Recording Operations

Figure 48:
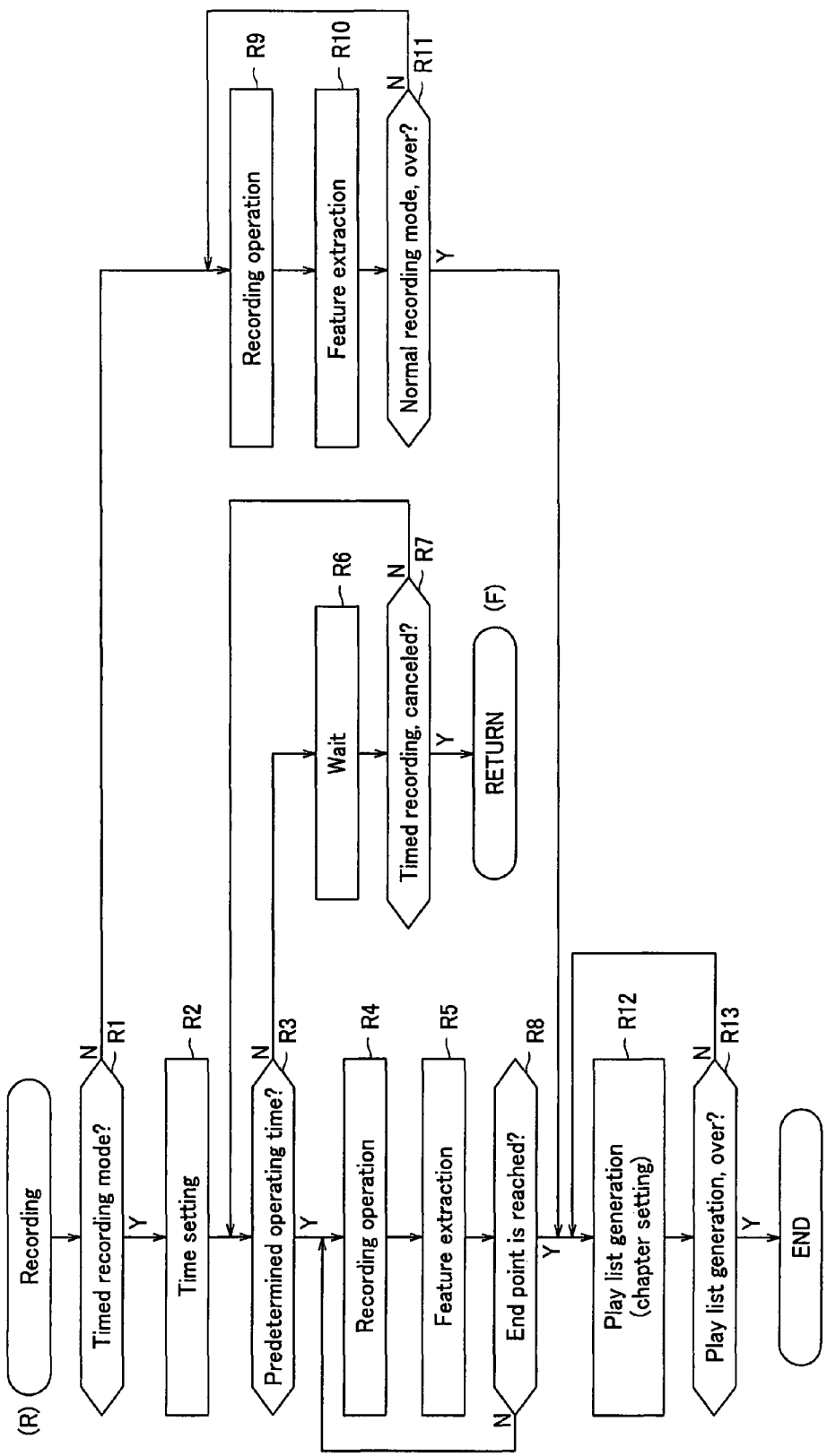
FIG. 48 shows an example of the flow of operations made for recording in the recording/playback apparatus.

Example of Flow of Recording Operations:

FIG. 48 shows an example of the flow of operations made for recording.

In case the recording mode has been selected in step S1 in the flow of operations shown in FIG. 45, it is judged in step R1 in FIG. 48 whether the recording operation is in the timed recording mode or normal recording mode. In case the recording operation is determined to be the normal recording mode, the apparatus goes to step R9 in which it will make the normal recording operation.

In the normal recording mode in step R9, the apparatus goes to an operation for the predetermined recording signal processing. In step R10, the predetermined feature extraction is made from image/voice data to be encoded in the predetermined manner defined in MPEG or the like or already encoded image/voice data.

Note that the recording signal processing and feature extraction operation can be done simultaneously.

The predetermined feature extraction is made from the image/voice data to be subjected to the predetermined encoding with the use of image/voice data in process of the predetermined encoding. For example, it is possible to extract DC coefficient data and AC coefficient data resulted from the DCT signal processing from the system for DCT processing of image data. These predetermined data are used to make the aforementioned predetermined feature-extraction signal processing such as detection of scene change data (detection of cut point feature), detection of telop feature, etc.

In the predetermined subband signal processing in the predetermined band-compression signal processing, the data in the predetermined subband can be used to process the voice data for judgment of the data to be a speaker's voice or music (musical sound).

The musical sound-judgment signal processing may be made by judging the continuity of the signal in the predetermined subband, for example.

Also, the image/voice data in the baseband may be used. For example, the baseband signal of image data may be used to effect scene change detection by the inter-frame (-field) difference signal processing, telop feature signal processing by the edge detection based on the difference signal, and other predetermined feature signal processing.

Note that the feature data having been subjected to the voice feature-extraction signal processing is recorded into a predetermined data storage (data recording means) such as a predetermined recording medium in which the image/voice data is also recorded or a predetermined buffer memory.

In step R11, it is judged whether the normal recording mode is to be ended. In case it is determined that the normal recording mode is not to be ended, the apparatus goes back to step R9 in which it will repeat the due operations. If it is determined that the normal recording mode is to be ended, the apparatus goes to step R12 in which it will make the play list data generation (or chapter data generation).

In case it is determined in step R1 that the recording operation is in the timed recording mode, the apparatus sets recording start and end points in time in step R2, goes to step R3 in which it will be judged whether the set time points are predetermined ones. In case it is determined that the set time points are not the predetermined ones, the apparatus goes to step R6 in which it will wait. In step R7, it is judged whether the interrupt for canceling the timed recording operation has been made. In case the timed operation is to be continued, the apparatus goes back to step R3 in which it will repeat the due operations.

In case it is determined in step S7 that the timed recording operation has been canceled, the apparatus goes back to S1 in FIG. 45 in which it will repeat the initial operation mode selection.

In case it is determined in step R3 that the set time points are predetermined ones, the apparatus starts the recording operation and repeat, in steps R4 to R6, the operations as in steps R9 to R11.

The feature data (feature extraction data) having been subjected to the image/voice-extraction signal processing is recorded into a predetermined data storage (data recording means) such as a predetermined recording medium having also the image/voice data recorded therein or a predetermined buffer memory. In case it is determined in step R8 that the predetermined end point is reached, the apparatus goes to step R12 in which it will make the play list data generation or chapter data generation.

In step R12, the feature data having been subjected to various predetermined feature-extraction processing (such as predetermined processing of the predetermined feature data having been subjected to the feature-extraction processing, data having been subjected to the predetermined signal processing, and data having been subjected to the predetermined judgment processing using these data), are read from the predetermined recording medium to make the predetermined play list data (file) generation and chapter data generation.

The play list data and chapter data thus generated are recorded into the predetermined recording medium. In step R13, it is judged whether the generation is complete. If it is determined that the generation is not over, the apparatus goes back to step R12 in which it will repeat the due operations. In case it is determined that the generation is over, the apparatus goes back to step R13 in which it will repeat the due operations.

Note that the play list data and chapter data may be recorded into the predetermined recording medium simultaneously with the generation of them or all the predetermined play list data and chapter data of a predetermined broadcast program, program or predetermined recording section, which are to be processed, may be recorded into the predetermined recording medium after they are all generated.

Processing of Play List Data (Chapter Data) in Parallel with Feature Extraction:

It has been described that the predetermined feature extraction is made simultaneously with he recording of the image/voice data such as predetermined broadcast program, program or the like, various feature data after extracted (including signals subjected to the predetermined processing and signal processing using the feature extraction data or feature data) are recorded into the predetermined recording medium, and the recorded feature data is read after completion of the predetermined broadcast program or program to generate the play list data (file), chapter data, etc. However, it should be noted that the play list data (file) and chapter data may be generated simultaneously or in parallel with the feature extraction.

7.3 Flow of Playback Unit Processing Operations

Figure 49:
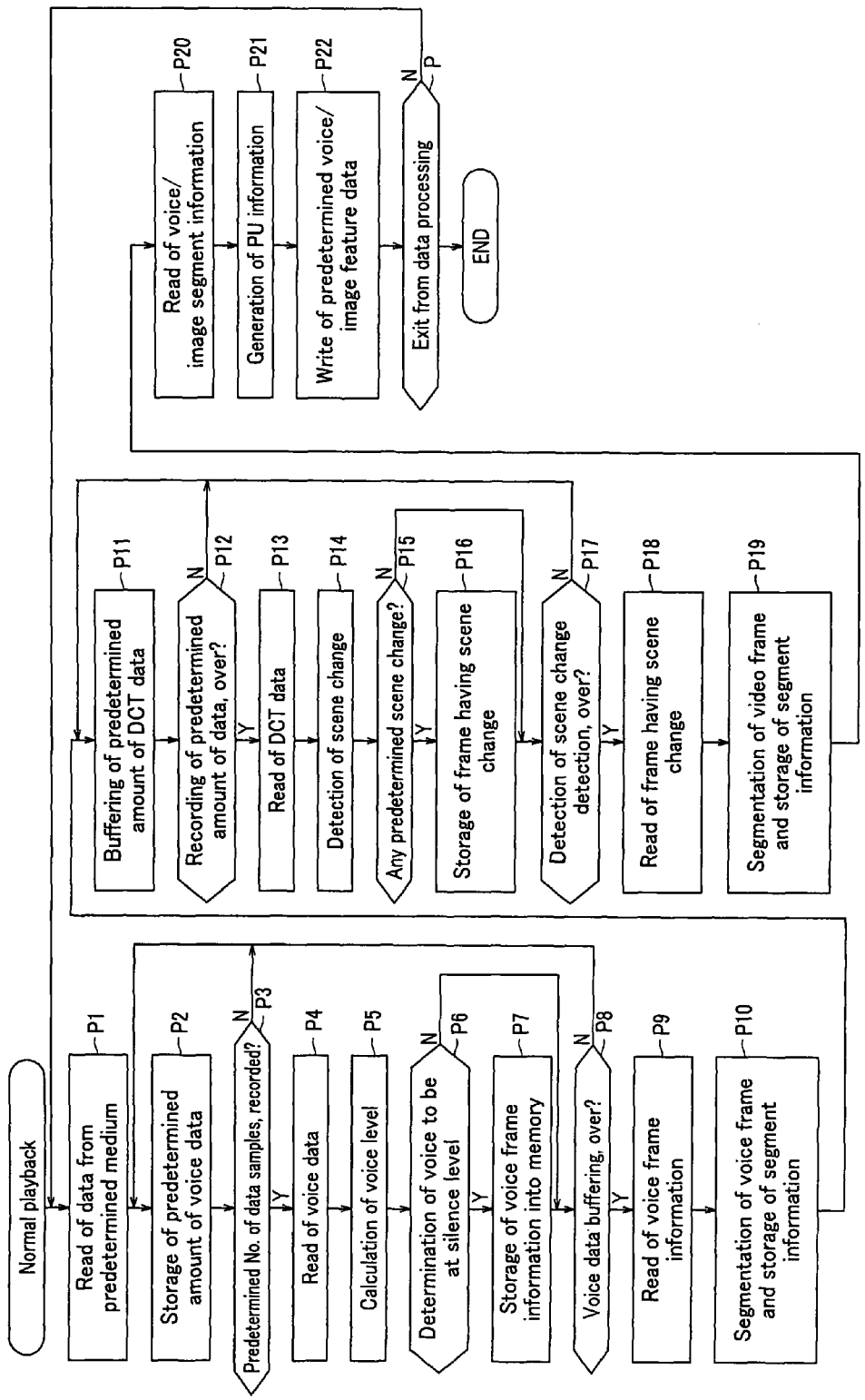
FIG. 49 shows an example of the flow of operations made for playback in the recording/playback apparatus.

Processing of Voice Segments and Scene Change at Each Predetermined Data Section by Processing PUs:

FIG. 49 shows an example of flow of operations in the predetermined signal processing stared at the voice segment detection point and scene change detection point in the aforementioned PU signal processing.

The apparatus put into operation goes to step P1 in which it will read the voice data and a predetermined number of sample image data for detection of a scene change (which will be explained in detail later) from the predetermined recording medium having the image/voice data recorded therein, and then goes to step P2 in which it will record the data thus read into a data buffer as a predetermined recording means, such as a memory.

In step P3, it is judged whether the predetermined number of sample data has been recorded into the buffer. In case it is determined that the predetermined number of sample data has been recorded, the apparatus goes to step P4. If it is determined that the predetermined number of sample data has not been recorded, the apparatus goes back to step P2 in which it will repeat the due operations.

Note that in steps P2 to P7, predetermined judgment of the voice signal to be a sounding one or silent one is made for the PU processing. In step P2, the predetermined number of sample data corresponding to a length of predetermined section of about 0.1 to 1 sec is stored in to the data buffer.

For example, in case the sampling frequency is 48 kHz, one second is equivalent to 48,000 sample data, and 0.1 sec is equivalent to 4,800 sample data. This amount of sample data is recorded into the data buffer.

In step P4, the voice data is read from the data buffer. In step P5, the voice level of the aforementioned predetermined section is calculated. In step P6, the voice level is compared with a predetermined one to judge whether it is higher or lower the predetermined level. Thus, silence detection (silence judgment) is made.

In case the section in consideration is determined in step P6 to be a silent one, the apparatus goes to step P7 in which it will record that information into the predetermined memory (buffer). If it is determined in step P6 that the section is not silent but a sounding one, the apparatus goes to step P8 in which it will judge whether buffering of the data read in step P1 is over. If it is determined that the buffering is not over, the apparatus goes to step P2 in which it will repeat the due operations. In case the buffering is complete, the apparatus will got to step P9.

In step P9, the voice segment information processed in step P8 is read. Then, the apparatus goes to step P10 in which it will make segment the aforementioned short silent section and sounding sections and long silent and sounding sections.

In step P11, data resulted from DCT processing of the predetermined number of sample image data are recorded into the buffer memory (predetermined data recording means). In step P12, it is judged whether recording of the predetermined amount of data is complete. If it is determined that the predetermined amount of data has not been recorded, the apparatus goes back to step P11 in which it will repeat the write into the buffer memory. In case it is determined in step P12 that the recording of the predetermined amount of data is complete, the apparatus goes to step P13.

In step P13, the predetermined DCT data is read from the predetermined buffer memory. In step P14, a predetermined signal processing of the inter-frame signal etc. is made to detect a predetermined scene change.

In step P15, it is judged whether the predetermined scene change is detected. In case the scene change has been detected, the apparatus goes to step P16 in which positional information on the point in time when the scene change has been detected is stored into a predetermined memory (data recording means, data buffer or the like). Then the apparatus goes to step P17. If it is determined in step P15 that no scene change has occurred, the apparatus goes to step P17.

In step P17, it is judged whether the scene change detection from a predetermined amount of data in the predetermined data buffer is complete. If the scene change detection is not over, the apparatus goes back to step P11 in which it will repeat the due operations. In case it is determined in step P17 that the scene change detection is complete, the apparatus goes to step P18.

In step P18, the scene change point information is read from the predetermined buffer memory. In step P19, the scene change detection section is corrected by connecting a section shorter than a predetermined section to a preceding section and making other operations.

In step P20, voice segment point information and scene change point information generated for the predetermined section are read to generate predetermined PU information such as predetermined PU point information, section information, etc. from predetermined information such as voice segment point, voice segment section length, scene change point, scene change section length, etc. in step P21.

In step P22, feature data derived from the PU information processed in step P21 and corresponding to the PU section (or signal resulted from predetermined signal processing of feature extraction data or feature data and the like) are written into the predetermined recording medium or predetermined data buffer.

The above feature data may be recorded in a predetermined recording area of the predetermined recording medium having recorded therein the image/voice data in the predetermined sections of a broadcast program, program or the like going to be processed as well as in another predetermined recording medium.

In step P23, it is judged whether a series of processing operations such as the voice segmentation, scene change processing, PU processing and the like of the predetermined mount of data is complete. In case it is determined that the series of processing operations is over, the apparatus exits the recording process If it is determined that the series of processing operations is not over, the apparatus goes back to step P1 in which it will repeat the aforementioned due operations.

Processing of Scene Change after Completion of all Voice Segmentation Operations in the PU Processing:

In the above example, voice data in each predetermined section of the image/voice data such as a recorded broadcast program, program or the like are segmented one after another and then a scene change is detected in an image. However, all the scene changes may be detected not after the processing of each predetermined section but after voice segmentation of all predetermined sections of a broadcast program or program going to be processed and the predetermined PU processing be done after all the scene changes are detected.

Figure 50:
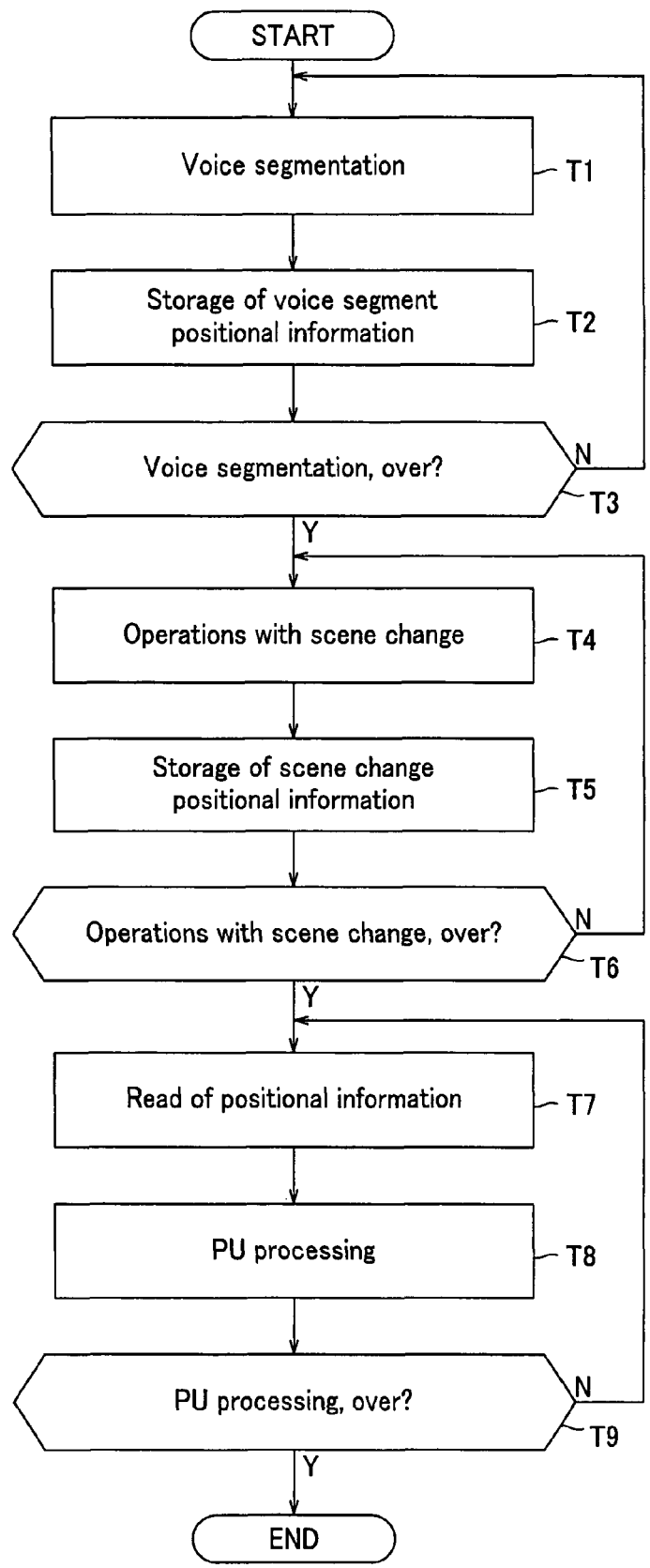
FIG. 50 shows another example of the flow of operations made for playback in the recording/playback apparatus.

FIG. 50 shows another example of flow of operations made in the predetermined signal processing starting at voice segment detection point and scene change detection point in the aforementioned PU signal processing.

The apparatus put into operation goes first to step T1. In step T1, there are made predetermined voice segmentation operations as in steps P1 to P9 in the flow diagram shown in FIG. 49.

A predetermined amount of sample voice data is read sequentially into the predetermined buffer memory.

In step T2, the segment position information subjected to the voice segmentation is recorded into a predetermined memory (data storage means). In step T3, it is judged whether the predetermined segmentation of all voice data in a predetermined section of a broadcast program or program going to be processed is complete. If it is determined that the predetermined segmentation is not complete, the apparatus goes back to step T1 in which it will repeat the due operations. In case it is determined that the predetermined segmentation is over, the apparatus goes to step T4.

In step T4, a predetermined scene change processing as in steps P11 to P18 in the flow diagram shown in FIG. 49 is effected. A predetermined amount of image DCT data is sequentially recorded into the predetermined buffer memory.

In step T5, the scene change point information subjected to the predetermined scene change processing are recorded one after another into a predetermined memory means (data storage means). In step T6, it is judged whether the predetermined scene change processing of all image DCT data in a predetermined of a broadcast program or program going to be processed is complete. If it is determined that the predetermined scene change processing is not over, the apparatus goes back to step T4 in which it will repeat the due operations. In case it is determined that the predetermined scene change processing is over, the apparatus goes to step T7.

In step T7, the predetermined voice segmentation point information and predetermined scene change point information are read from the predetermined memory means. In step T8, the predetermined PU processing is made, and in step T9, it is judged whether the predetermined PU processing of all predetermined sections of a broadcast program or program going to be processed is complete. In case it is determined that the predetermined PU processing is over, the apparatus exits the playback operation. If it is determined the predetermined PU processing is not complete, the apparatus goes back to step T7 in which the due operations.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the extra claims.

The invention claimed is:

1. An information signal processing method, comprising the steps of:
   detecting a predetermined voice feature of a vocal signal from an information signal of a recording having a recording time;
   obtaining image feature data indicative of at least one feature within an image signal of the information signal;
   identifying (i) one or more voice segments of the vocal signal based on the voice feature data and (ii) one or more image segments of the image signal based on the image feature data;
   dividing the signal into playback units each having a predetermined temporal length based on a predetermined comparison between the image and voice segments and a predetermined threshold;
   determining a meaning of each playback unit by utilizing both the voice signal and the image signal, the determining comprising:
      identifying a plurality of candidate meanings for each playback unit, the candidate meanings comprising corresponding candidate voice and image characteristics;
      determining, for the candidate meanings, values for the candidate voice and image characteristics based on the voice and image feature data;
      computing, for the candidate meanings of each playback unit, sums of corresponding ones of the candidate voice and image characteristic values; and
      for each playback unit, establishing the candidate meaning associated with a maximum sum as the corresponding meaning;
   calculating an evaluation value for each playback unit utilizing both the voice signal and the image signal, wherein different predetermined weighting factors are used to calculate the evaluation value for different predetermined broadcast programs;
   generating a summary playback list having a user-selected summary playback time that is less than the recording time;
   selecting playback units having the largest evaluation values for the summary playback list; and
   arranging the selected playback units to playback sequentially based on the time position of the playback units in the recording.

2. The information signal processing method of claim 1, further comprising recording the voice feature data extracted from the voice signal and the image feature data into a predetermined recording medium.

3. The information signal processing method of claim 1, wherein obtaining the image feature data comprises:
   extracting predetermined characteristic data from the image signal; and
   generating the image feature data based on the predetermined characteristic data.

4. An information signal processing method, comprising the steps of:
   obtaining voice feature data representative of a vocal signal within an information signal and image feature data representative of an image signal within the information signal;
   identifying (i) one or more voice segments of the vocal signal based on the voice feature data and (ii) one or more image segments of the image signal based on the image feature data, the voice and image segments having a predetermined temporal length;
   identifying one or more playback units of the information signal based on the voice and image segments and the voice and image feature data;
   establishing a meaning for the for each playback unit based on at least the voice feature data and image feature data, the establishing comprising:

identifying a plurality of candidate meanings for each playback unit, the candidate meanings comprising corresponding candidate voice and image characteristics;

determining, for the candidate meanings, values for the candidate voice and image characteristics based on the voice and image feature data;

compute, for the candidate meanings of each playback unit, sums of corresponding ones of the candidate voice and image characteristic values; and for each playback unit, establishing the candidate meaning associated with a maximum sum as the corresponding meaning;

calculating an evaluation value for each playback unit utilizing both the voice signal and the image signal, wherein different predetermined weighting factors are used to calculate the evaluation value for different predetermined broadcast programs; and generating summary playback of selected playback units that are approximate to a user-selected time position, the selected playback units having evaluation values greater than a predetermined threshold.

5. The method according to claim 4, wherein data indicative of a playback section or playback point in time of the information signal is generated on the basis of voice and image feature data put in correspondence to each other for each of the playback units.

6. The method according to claim 5, wherein the playback is controlled with the use of the data indicative of playback section or playback point in time of the image/voice information signal.

7. The method according to claim 4, wherein:
the voice feature data is attribute information;
an attribute is detected from a voice signal; and
the information signal is divided into playback units at a point where the voice attribute changes.

8. The method according to claim 4, wherein in case CM has been detected from the information signal, the information signal is divided into playback units at a point where the CM in the image/voice information signal has been detected.

9. The information signal processing method of claim 4, wherein obtaining the image feature data comprises:
extracting predetermined characteristic data from the image signal; and
generating the image feature data based on the predetermined characteristic data.

10. The information signal processing method of claim 4, wherein identifying the one or more playback units comprises:
comparing the voice and image segments with a first temporal value; and
dividing the information signal into playback units having a second value when at least one of the voice or image segments are shorter than the first value.

11. The method according to claim 10, wherein:
the information signal is divided into playback units each having a third value larger than the second value in case both the voice and image segments are larger than the first value.

12. The information signal processing method of claim 4, further comprising recording the voice feature data extracted from the voice signal and the image feature data into a predetermined recording medium on the basis of the playback units.

13. An information signal processing apparatus, comprising:
a voice signal processor for extracting voice feature data of a voice signal from an information signal of a recording having a recording time and separating the voice signal into voice segments on the basis of the result of extraction;

an image signal processing for generating image feature data representative of at least one feature of an image signal of the information signal and separating the image signal into image segments;

a controller for:
establishing a meaning for each playback unit based on at least the voice feature data and image feature data, the establishing comprising:
identifying a plurality of candidate meanings for each playback unit, the candidate meanings comprising corresponding candidate voice and image characteristics;
determine, for the candidate meanings, values for the candidate voice and image characteristics based on the voice and image feature data;
compute, for the candidate meanings of each playback unit, sums of corresponding ones of the candidate voice and image characteristics; and
for each playback unit, establishing the candidate meaning associated with a maximum sum as the corresponding meaning;

calculating an evaluation value for each playback unit utilizing both the voice signal and the image signal, wherein different predetermined weighting factors are used to calculate the evaluation value for different predetermined broadcast programs;

generating a summary playback list having a user-selected summary playback time that is less than the recording time;

selecting playback units having the largest evaluation values for the summary playback list; and arranging the selected playback units to playback sequentially based on the time position of the playback units in the recording; and a recorder for recording the voice feature data extracted from the voice signal and the image feature data into a predetermined recording medium on the basis of the playback units.

14. A non-transitory program recording medium having a control program recorded therein to be computer-readable, the control program comprising the steps of:
detecting a predetermined voice feature of a voice signal from an information signal of a recording having a recording time;

obtaining image feature data indicative of at least one feature within an image signal of the information signal;

identifying (i) one or more voice segments of the vocal signal based on the voice feature data and (ii) one or more image segments of the image signal based on the image feature data;

dividing the signal into playback units each having a predetermined temporal length based on a predetermined comparison between the image and voice segments and a predetermined threshold;

determining a meaning of each playback unit by utilizing both the voice signal and the image signal, the determining comprising:

identifying a plurality of candidate meanings for each playback unit, the candidate meanings comprising corresponding candidate voice and image characteristics;

determining, the candidate meanings, values for the candidate voice and image characteristics based on the voice and image feature data;

computing, for the candidate meanings of each playback unit, sums of corresponding ones of the candidate voice and image characteristics for the candidate meanings of each playback unit; and for each playback unit, establishing the candidate meaning associated with a maximum sum as the corresponding meaning;

calculating an evaluation value for each playback unit utilizing both the voice signal and the image signal, wherein different predetermined weighting factors are used to calculate the evaluation value for different predetermined broadcast programs; and generating summary playback of selected playback units that are approximate to a user-selected time position, the selected playback units having evaluation values greater than a predetermined threshold.

* * * * *